United States Patent [19]

Scarola et al.

[11] Patent Number: 5,267,277
[45] Date of Patent: Nov. 30, 1993

[54] INDICATOR SYSTEM FOR ADVANCED NUCLEAR PLANT CONTROL COMPLEX

[75] Inventors: Kenneth Scarola; David S. Jamison, both of Windsor; Richard M. Manazir, North Canton; Robert L. Rescorl, Vernon; Daryl L. Harmon, Enfield, all of Conn.

[73] Assignee: Combustion Engineering, Inc., Windsor, Conn.

[21] Appl. No.: 430,792

[22] Filed: Nov. 2, 1989

[51] Int. Cl.$^5$ .................... G21C 7/00; G21C 17/00
[52] U.S. Cl. .................................. 376/216; 376/259
[58] Field of Search ............... 376/216, 217, 259, 248; 364/527, 551.01

[56] References Cited

U.S. PATENT DOCUMENTS

| H289 | 6/1987 | Beltracchi | 376/245 |
|---|---|---|---|
| 4,330,843 | 5/1982 | Lawson, II | 364/900 |
| 4,421,716 | 12/1983 | Hench et al. | 376/216 |
| 4,675,147 | 6/1987 | Schafer et al. | 376/245 |
| 4,772,445 | 9/1988 | Nasrallah et al. | 376/217 |
| 4,853,175 | 8/1989 | Book, Sr. | 376/216 |
| 4,957,690 | 9/1990 | Fennern | 376/216 |

OTHER PUBLICATIONS

"Six CRT Touch Screens Simulate a Full-Scope Control Panel" by John Reason, Power, Jul. 1989, pp. 29-31.

F. Bevilacqua, "Evolution of Modern Reactor Monitoring . . . " Comb. Engrg., Inc., Tech. Paper TIS-7045 (1981).

C. H. Neuschaefer, "An Integrated Accident Monitoring System . . . ", Comb. Engrg. Inc., Tech. Paper TIS-7123 (1982).

Primary Examiner—Daniel D. Wasil
Attorney, Agent, or Firm—Chilton, Alix & Van Kirk

[57] ABSTRACT

An advanced control room complex for a nuclear power plant, including a discrete indicator and alarm system (72) which is nuclear qualified for rapid response to changes in plant parameters and a component control system (64) which together provide a discrete monitoring and control capability at a panel (14-22, 26, 28) in the control room (10). A separate data processing system (70), which need not be nuclear qualified, provides integrated and overview information to the control room and to each panel, through CRTs (84) and a large, overhead integrated process status overview board (24). The discrete indicator and alarm system (72) and the data processing system (70) receive inputs from common plant sensors and validate the sensor outputs to arrive at a representative value of the parameter for use by the operator during both normal and accident conditions, thereby avoiding the need for him to assimilate data from each sensor individually. The integrated process status board (24) is at the apex of an information hierarchy that extends through four levels and provides access at each panel to the full display hierarchy. The control room panels are preferably of a modular construction, permitting the definition of inputs and outputs, the man machine interface, and the plant specific algorithms, to proceed in parallel with the fabrication of the panels, the installation of the equipment and the generic testing thereof.

10 Claims, 42 Drawing Sheets

ACRONYMS AND ABBREVIATIONS

| | |
|---|---|
| ADS | AUTOMATIC DISPATCH SYSTEM |
| APC | AUXILIARY PROCESS CABINET |
| APS | AUXILIARY PROTECTION CABINET |
| CCS | COMPONENT CONTROL SYSTEM |
| CEA | CONTROL ELEMENT ASSEMBLY |
| CEAC | CONTROL ELEMENT ASSEMBLY CALCULATOR |
| CET | CORE EXIT THERMOCOUPLE |
| CPC | CORE PROTECTION CALCULATOR |
| DIAS | DISCRETE INDICATOR AND ALARM SYSTEM |
| DPS | DATA PROCESSING SYSTEM |
| EOF | EMERGENCY OPERATIONS FACILITY |
| ESF | ENGINEERED SAFETY FEATURES |
| EXCORE | EX-CORE NEUTRON FLUX MONITORING SYSTEM |
| FICD | FIXED INCORE DETECTOR SYSTEM |
| HJTC | HEATED JUNCTION THERMOCOUPLE |
| ICCMS | INADEQUATE CORE COOLING MONITORING SYSTEM |
| I/O MUX | INPUT/OUTPUT MULTIPLEXER |
| IPSO | INTEGRATED PROCESS STATUS OVERVIEW |
| MG | MOTOR GENERATOR |
| MDS | MEGAWATT DEMAND SETTER |
| NIMS | NSSS INTEGRATED MONITORING SYSTEM |
| PPS | PLANT PROTECTION SYSTEM |
| RCPSSS | REACTOR COOLANT PUMP SHAFT SPEED SENSING SYSTEM |
| RM | RADIATION MONITORING |
| RPCS | REACTOR POWER CUTBACK SYSTEM |
| RRS | REACTOR REGULATING SYSTEM |
| RTSG | REACTOR TRIP SWITCH GEAR |
| SOE | SEQUENCE OF EVENTS |

KEY:

——————————— HARDWIRED

– – – – – – – – – DATA LINK

FIG. 2(b)

CATEGORIZED ALARM LIST

TITE: 08:00:08

| DESCRIPTION/VALUE | VALUE/SET PIOT | POINT ID | TIME |
|---|---|---|---|
| PRIMARY — 142 | | | |
| RCS — 144 | | | |
| PZR PRESS HI — 146 | | | |
| PRESSURIZER PRESSURE HI | 2500 PSIG/2500 | VALID | 08:00:03 |
| PZR SAFETY OPEN | | | |
| PRESSURIZER SAFETY | OPEN/N/A | ALMS | 08:00:03 |
| PZR RELIEF TEMP HI | PZR RLF (RC-201) TO RDT TEMP HI | TI-106 | 08:00:05 |
| | PZR RLF (RC-202) TO RDT TEMP HI | TI-107 | 08:00:06 |
| OPERATOR ESTB | PRESSURIZER LEVEL HI | 58%/57 | VALID | 08:00:07 |
| PRIORITY 3 | | | |
| | PZR PROPORTIONAL HEATERS NO.1 | FAIL/N/A | GP1 | 08:00:01 |
| | PZR PROPORTIONAL HEATERS NO.2 | FAIL/N/A | GP2 | 08:00:02 |
| END OF PRIMARY ALARMS | | | |

| | | | | | | | | OP ESTB | CLR |
|---|---|---|---|---|---|---|---|---|---|
| LAST PAGE | DIR | ALRM TILE | ALRM LIST | IPSO | PRI | SEC | PWR | ELEC | AUX | CFM | OTHR |

Fig. 14

| TILE | STATUS | ALARM DESCRIPTION | POINT ID |
|---|---|---|---|
| RCP 1B SEAL/OIL | ☐ RCP 1B | OIL LIFT TANK LVL HI | RC-L-141 |
| | ☐ RCP 1B | SEAL #2 INLET PRESS HI | RC-P-162 |
| | RCP 1B | OIL LIFT PUMP FLOW LO | RC-Y-FRCP1B |
| | RCP 1B | OIL LIFT OUTLET PRESS LO | RC-Y-PRCP1B |

~78

| ALARM STATUS |
|---|

| ALARM LIST | CLEAR |
|---|---|

Fig. 17

| TILE | STATUS | ALARM DESCRIPTION | POINT ID |
|---|---|---|---|
| RCP IB SEAL/OIL | ☐ | RCP IB SEAL #1 INLET PRESS LO | RC-P-161 |
| | ☐ | RCP IB SEAL #2 INLET PRESS HI | RC-P-162 |
| | | RCP IB SEAL #3 INLET PRESS HI | RC-P-163 |
| | | RCP IB PP BRG OIL RSVR LVL LO | RC-L-117 |
| | | RCP IB MTR LWR OIL RSVR LVL HI | RC-L-118 |
| | | RCP IB MTR LWR OIL RSVR LVL LO | RC-L-118 |
| | | RCP IB MTR UPR OIL RSVR LVL HI | RC-L-119 |
| | | RCP IB MTR UPR OIL RSVR LVL LO | RC-L-119 |
| | ☐ | RCP IB OIL LIFT TANK LVL HI | RC-L-141 |
| | | RCP IB OIL LIFT TANK LVL LO | RC-L-141 |
| | | RCP IB OIL LIFT PUMP FLOW LO | RC-Y-FRCP1B |
| | | RCP IB OIL LIFT PUMP OUT PRESS LO | RC-Y-PRCP1B |

[ALARM STATUS] [ALARM LIST] [CLEAR]

USE OF VALIDATED SENSOR DATA FOR INFORMATION DISPLAYS AND CONTROL

KEY:

| | |
|---|---|
| — — — — | DATALINK OR NETWORK |
| ———— | BINARY |
| — ·· — | FIBEROPTIC DATALINK OR NETWORK |
| — ·· — | FIBEROPTIC BINARY |
| MCP | MAIN CONTROL PANEL |
| RSP | REMOTE SHUTDOWN PANEL |
| PPS | PLANT PROTECTION SYSTEM |
| DPS | DATA PROCESSING SYSTEM |
| DIAS | DISCRETE INDICATOR AND ALARM SYSTEM |
| OPS MODULE | OPERATORS MODULE |

NOTES:

(1) ESP-CCS TRAIN A ILLUSTRATED
ESP-CCS TRAIN B, C AND D ARE SIMILAR (2) FDR PPS INITIATION SIGNALS AA, BA, CA, ETC., FIRST CHARACTER REPRESENTS PPS ORIGINATING CHANNEL, SECOND CHARACTER REPRESENTS ESF-CCS DESTINATION TRAIN

FIG. 31(c)

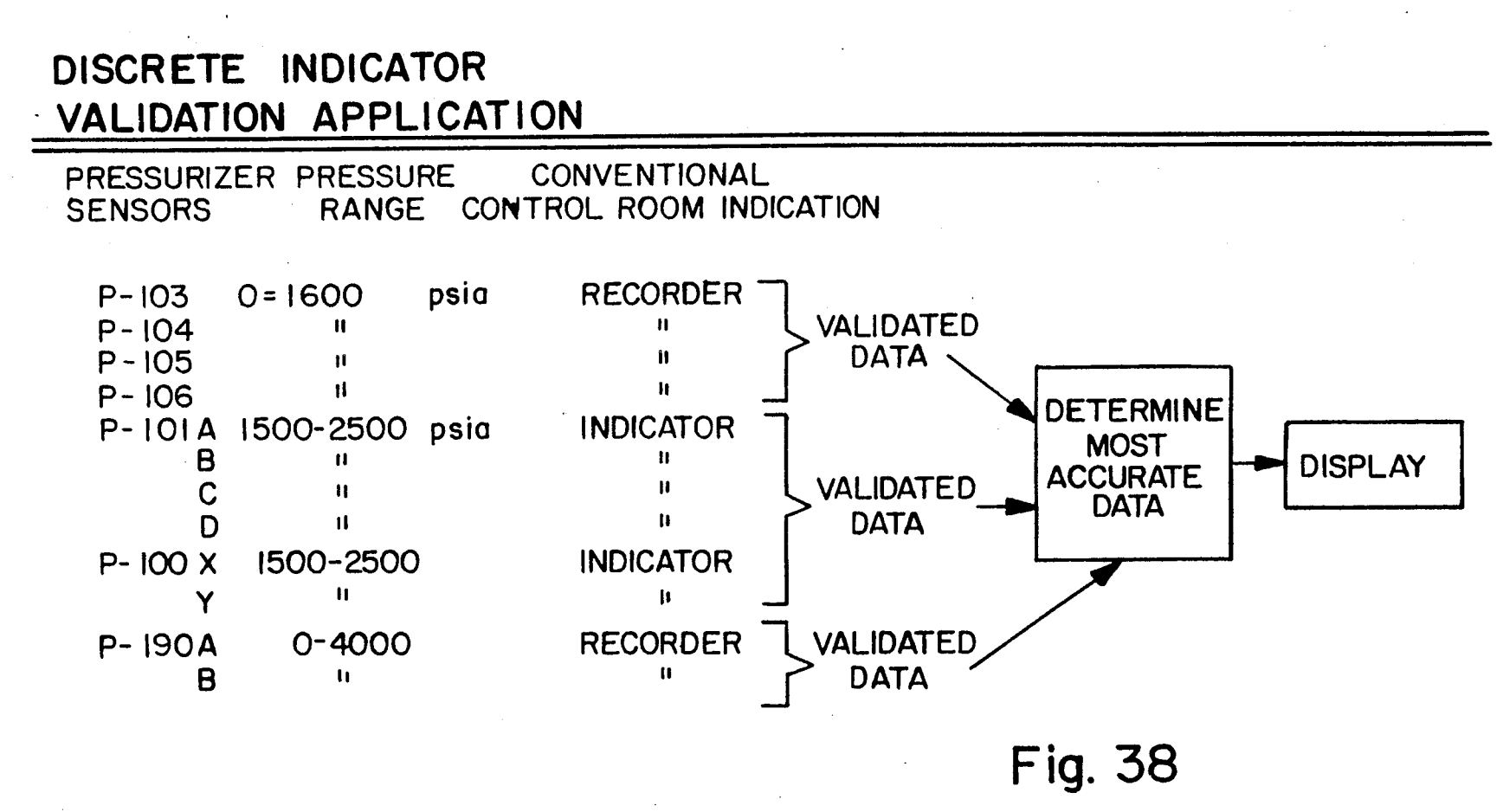

DISCRETE INDICATOR VALIDATION APPLICATION

| SENSORS | PRESSURIZER PRESSURE RANGE | CONVENTIONAL CONTROL ROOM INDICATION |
|---|---|---|
| P-103 | 0-1600 psia | RECORDER |
| P-104 | " | " |
| P-105 | " | " |
| P-106 | " | " |
| P-101 A | 1500-2500 psia | INDICATOR |
| B | " | " |
| C | " | " |
| D | " | " |
| P-100 X | 1500-2500 | INDICATOR |
| Y | " | " |
| P-190 A | 0-4000 | RECORDER |
| B | " | " |

P-103, P-104, P-105, P-106 → VALIDATED DATA →
P-101 A, B, C, D → VALIDATED DATA → DETERMINE MOST ACCURATE DATA → DISPLAY
P-100 X, Y, P-190 A, B → VALIDATED DATA →

Fig. 38

INDICATOR SYSTEM FOR ADVANCED NUCLEAR PLANT CONTROL COMPLEX

A portion of the disclosure of this patent document contains material which is subject to copyright protection. The copyright owner has no objection to the facsimile reproduction by anyone of the patent document or the patent disclosure, as it appears int he Patent and Trademark Office patent file or records, but otherwise reserves all copyright rights whatsoever.

BACKGROUND OF THE INVENTION

The present invention relates to apparatus and methods for monitoring and controlling the operation of commercial nuclear power plants.

Conventionally, commercial nuclear power plants have a central control room containing equipment by which the operator collects, detects, reads, compares, copies, computes, compiles, analyzes, confirms, monitors, and/or verifies many bits of information from multiple indicators and alarms. Conventionally, the major operational systems in the control room have been installed and operate somewhat independently. These include the monitoring function, by which the components and the various processes in the plant are monitored; control, by which the components and the processes are intentionally altered or adjusted, and protection, by which a threat to the safety of the plant is identified and corrective measures immediately taken.

The result of such conventional control room arrangement and functionality can sometimes be information overload or stimulus overload on the operator. That is, the amount of information and the variety and complexity of the equipment available to the operator for taking action based on such extensive information, can exceed the operator's cognitive limits, resulting in errors.

The most famous example of the inability of operators to assimilate and act correctly based on the tremendous volume of information stimuli in the control room, particularly during unexpected or unusual plant transients, is the accident that occurred in 1978 at the Three Mile Island nuclear power plant. Since that event, the industry has focused considerable attention to increasing plant operability through improving control room operator performance. A key aspect of that improvement process is the use of human engineering design principles.

Advances in computer technology since 1978 have enabled nuclear engineers and control room designers to display more information, in a greater variety of ways, but this can be counterproductive, because part of the problem is the overload of information. Improving "user friendliness" while maintaining the quantity and type of information at the operator's disposal has posed a formidable engineering challenge.

SUMMARY OF THE INVENTION

It is thus an object of the present invention to provide apparatus and method for nuclear power plant control and monitoring operations having the characteristics of concise information processing and display, reliable architecture and hardware, and easily maintainable components, while eliminating operator information overload. This objective should be accomplished while achieving enhanced reliability, ease of operation, and overall cost effectiveness of the control room complex.

The solution to the problem is accomplished with the present invention by providing a number of features which are novel both individually and as integrated together in a control complex.

The complex includes six major systems: (1) the control center panels, (2) the data processing system (DPS), (3) the discrete indication and alarm system (DIAS), (4) the component control system consisting of the engineered safeguard function component controls (ESFC) and the process component controls (PCC), (5) the plant protection system (PPS), and (6) the power control system (PCS). These six systems collect data from the plant, efficiently present the required information to the operator, perform all automatic functions and provide for direct manual control of the plant components.

The control complex in accordance with the invention provides a top-down integrated information display and alarm approach that supports rapid assessment of high level critical plant safety and power production functions; provides guidance to the operator regarding the location of information to further diagnose high level assessments; and significantly reduces the number of display devices relative to conventional nuclear control complexes. The complex also significantly reduces the amount of data the operator must process at any one time; significantly reduces the operational impact of display equipment failures; provides fixed locations for important information; and eliminates display system equipment used only for off normal plant conditions.

It is known that the nuclear steam supply system can be kept in a safe, stable state by maintaining a limited set of critical safety functions. The present invention extends the concept of the critical plant safety functions to include critical plant power production functions, in essence integrating the two functions so that the information presentation to the operator supports all high level critical plant functions necessary for power production as well as safety.

The information display hierarchy in accordance with the invention includes a "big board" integrated process status overview screen (IPSO) at the apex, which provides a single dedicated location for rapid assessment of key information indicative of critical plant power production and safety functions. Further detail on the sources and trends of normal or abnormal parameter changes are provided by the DIAS. Both IPSO and the DIAS provide direct access and guidance to additional system and component status information contained on a hierarchy of CRT display pages which are driven by the DPS.

The IPSO continually displays spatially dedicated information that provides the status of the plant's critical safety and power production functions. This information is presented using a small number of easily understood symbolic representations that are the results of highly processed data. This relieves the operator of the burden of correlating large quantities of individual parameter data, systems or component status, and alarms to ascertain the plant functional conditions. The IPSO presents the operator with high level effects of lower level component problems. The IPSO relies primarily on parameter trend direction, e.g., higher, lower, an alarm symbol color and shape, to convey key information. These are supplemented by values for selected parameters. The IPSO presents consolidated, simplified information to the operator in relatively small quantities of easily recognized and understood information.

Furthermore, the IPSO compensates for the disadvantage inherent in recent industry trends towards presenting all information serially on CRTs, by enabling the operator to obtain an overview, or "feel" of the plant condition. Display of plant level overview on a large-format dedicated display addresses two additional operational concerns. First, operator tasks often require detailed diagnostics in very limited process areas. However, maintaining concurrent awareness of plant-wide performance is also necessary. Rather than relying on multiple operators in the control room to monitor respective indicators and the like on spatially separated panels, the IPSO can be viewed from anywhere in the control room and thus provides an operator a continuous indication of plant performance regardless of the detailed nature of the task that may be requiring the majority of his attention.

In the preferred implementation, IPSO supports the assessment of the power and safety critical functions by providing for each function, key process parameters that indicate the functional status. For each function, key success paths are selected with the status of that success path displayed. The IPSO clearly relates functions to physical things in the plant. The critical functions are applied to power production, normal post trip actions, and optimal functional recovery procedures.

The second level in the display information hierarchy in accordance with the present invention is the presentation of plant alarms from the DIAS. A limited number of fixed, discrete tiles are used with three levels of alarm priorities. Dynamic alarm processing uses information about the plant state (e.g., reactor power, reactor trip, refueling, shut-down, etc.) and information about system and equipment status to eliminate unnecessary and redundant alarms that would otherwise contribute to operator information overload. The alarm system provides a supplementary level of easily understood cueing into further information in the discrete indicators, CRTs and controls. Alarms are based on validated data, so that the alarms identify real plant process problems, not instrumentation and control system failures.

The alarm features include providing a detailed message through a window to the operator upon the acknowledgment of an alarm and the ability to group the alarms without losing the individual messages. The tiles can dynamically display different priorities to the operator. The acknowledgment sequence insures that all alarms are acknowledged while at the same time reducing the operator task loading by providing momentary tones, then continuous alarm, followed by reminder tones to insure that the alarms are not forgotten. The operator has the ability to stop temporarily alarm flashing to avoid visual overload, and resume the flashing to insure that the alarm will eventually be acknowledged.

The discrete indicators in the DIAS provide the third level of display in the hierarchy of the present invention. The flat panel displays compress many signal sources into a limited set of read-outs for frequently monitored key plant data. Signal validation and automatic selection of sensors with the most accurate signal ranges are also employed to reduce the number of control panel indicators. Information read-outs are by touch-screen to enhance operator interaction and include numeric parameter values, a bar form of analog display, and a plot trend.

Various multi-range indicators are available on one display with automatic sensor selection and range display. The automatic calculation of a valid process representation parameter value, with the availability of individual sensor readings at the same display, avoids the need for separate backup displays, or different displays for normal operation versus accident or post-accident operation.

Moreover, in another preferred feature of the invention, the parameter verification automatically distinguishes failed or multiple failed sensors, while allowing continued operation and accident mitigation information to the operator even if the CRT display is not available. Furthermore, the normal display information can be correlated to a qualified sensor, such as that used for post-accident monitoring purposes.

At the information display level associated with control of specific components, dynamic "soft" controllers are provided with component status and control signal information necessary for operator control of these components. For the ESFC system, this information includes status lamp, on-off controls, modulation controls, open-closed controls, and logic controls. For the PCCS, the information includes confirm load, set points, operating range, process values, and control signal outputs.

In the fourth level of the information hierarchy, dynamic CRT display pages are complementary to all levels of spatially dedicated control and information and can be accessed from any CRT location in the control room, technical support center, or emergency operations facility. These displays are grouped into a three level hierarchy that includes general monitoring (level 1), plant component and systems control (level 2), and component/process diagnostics (level 3). Display implementation is driven by the DPS and duplicates and verifies all discrete alarm and indicator processing performed in the DIAS.

In the preferred implementation of the invention, the indicator, alarm, and control functions for a given major functional system of the plant are grouped together in a single, modularized panel. The panel can be made with cutouts that are spatially dedicated to each of the displays for the indicators, alarms, controls, and CRT, independent of the major plant functional system. This permits delivery, installation, and preliminary testing of the panels before finalization of the plant specific logic and algorithms, which can be software modified late in the plant construction schedule. This modularization is achievable because the space required on the panel is essentially independent of the major plant functional system to which the plant is dedicated.

Both the alarms and indicators can be easily modified in software. The number of indicators and alarm tiles that can be displayed to the operator are not significantly limited by the available area of the panel, so that standardization of panel size and output locations for the display windows is possible.

BRIEF DESCRIPTION OF THE DRAWINGS

These and other objects and advantages of the invention are described in connection with the preferred embodiment of the invention, with reference to the accompanying drawings, in which:

FIGS. 2(a) and 2(b) together define a schematic diagram of the intersystem communication associated with the invention;

FIG. 14 is an illustration of the categorized alarm listing available to the operator on the CRT;

FIG. 17 is an illustration of the alarm display after acknowledgement of the actuated alarm of FIG. 16;

FIG. 18 is an illustration of the alarm display available upon the operator's touching the alarm status area of the display shown in FIG. 17;

FIG. 20 is an illustration of the CRT display for a second level page based on the first level page shown in FIG. 19;

FIGS. 31(a), 31(b), and 31(c) together define a functional diagram of the engineered safety features system and the component control system with associated interfaces as preferably arranged in accordance with the present invention;

FIG. 38 is a summary of the types of pressurizer sensors used in determining pressurizer pressure, and the manner in which these are used to obtain the representative pressure value.

DESCRIPTION OF THE PREFERRED EMBODIMENT

Outline of Contents

I. Overview Description of Control Complex
II. Panel Overview
  A. Alarm and Messages
  B. Indicator
  C. CRT
  D. Controller
  E. Display Formats
  F. Display Integration
III. DIAS
  A. Discreet Indicators
  B. Validity Algorithm Summary
  C. Alarm Processing and Display
    1. Mode and Equipment Dependance
    2. Subfunction Grouping
    3. Shape and Color Coding
    4. Alarms on CRT
    5. Determining Alarm Conditions
    6. Acknowledging Alarms
IV. DPS
  A. CRT
  B. IPSO
V. Control Room Integration
VI. Panel Modularity
APPENDIX (Validity Algorithm)

I. Overview Description on of Control Complex

Figure 1:
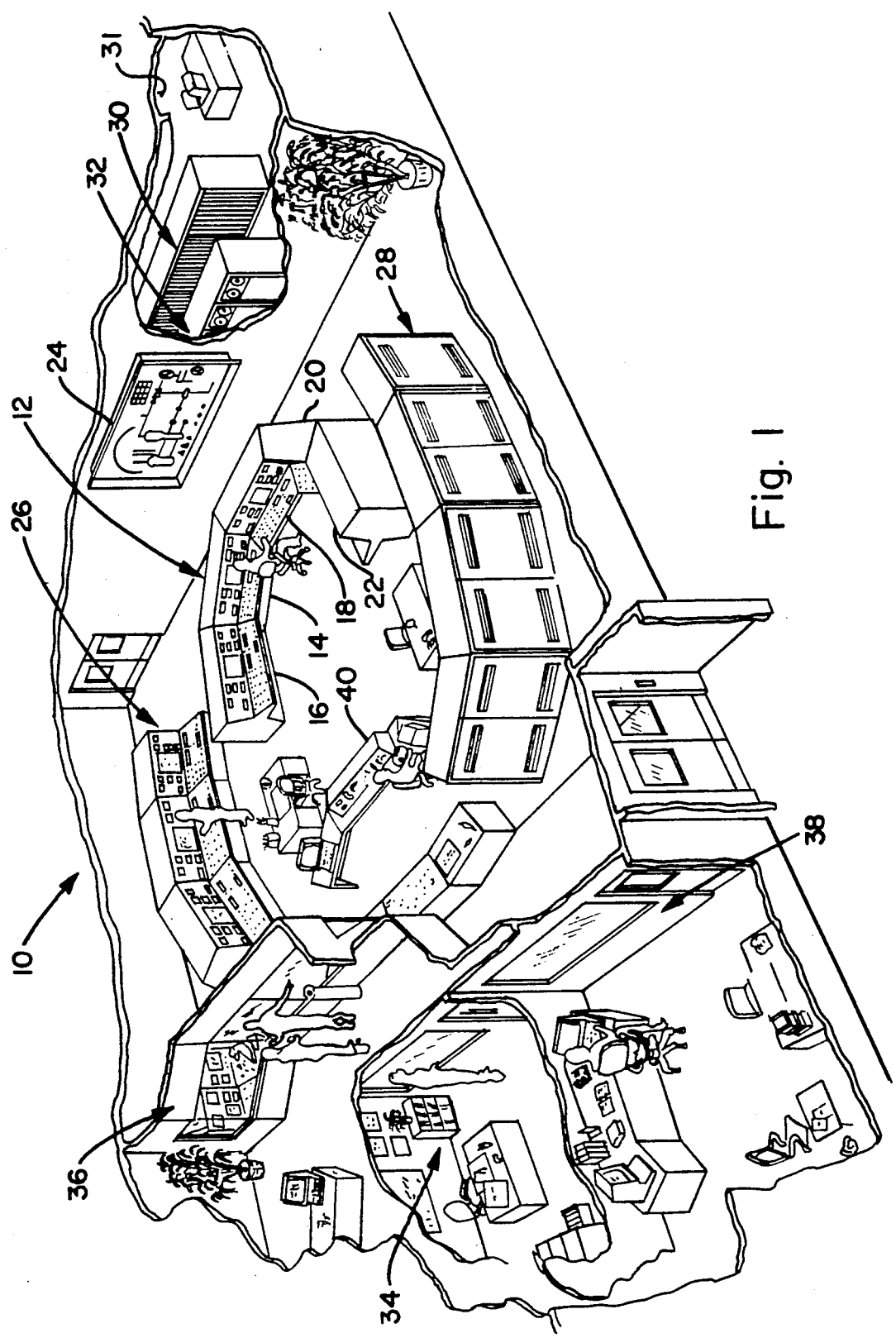
FIG. 1 is an illustration of a nuclear control room complex in accordance with the invention.

FIG. 1 shows a control room complex in accordance with the preferred embodiment of the present invention. The heart of the main control room 10 is a master control console 12 which allows one person to operate the nuclear steam supply system from the hot standby to the full power condition. It should be appreciated that the control room, equipment and methods described herein, may be advantageously used with light water reactors, heavy water reactors, high temperature gas cooled reactors, liquid metal reactors and advanced passive light water reactors, but for present purposes, the description will proceed on the basis that the plant has a pressurized water NSSS.

For such an NSSS, the master control console 12 typically has five panels, one each for the reactor coolant system (RCS) 14, the chemical volume and control system (CVCS) 16, the nuclear reactor core 18, the feed water and condenser system (FWCS) 20, and the turbine system 22. As will be described more fully below, the monitoring and control for each of these five plant systems, is accomplished at the respective panel in the master control console.

Immediately overhead behind the core monitoring and control panel 18, is a large board or screen 24 for displaying the integrated process status overview (IPSO). Thus, the operator has five panels and the overhead IPSO board within easy view while sitting or standing in the center of the master control console 12.

To the left of the master control console is the safety related console 26, typically including modules associated with the safety monitoring, engineered safeguard features, cooling water, and similar functions. To the right of the master control console is the auxiliary system console 28 containing modules associated with the secondary cycle, auxiliary power and diesel generator, the switch yard, and the heating and ventilation system.

Preferably, the plant computer 30 and mass data storage devices 32 associated with the control room are located in distributed equipment rooms 31 to improve fire safety and sabotage protection.

The control room complex 10 also has associated therewith, a shift supervisor's office 34, which has a complete view of the control room, an integrated technical support center (TSC) 36 and viewing gallery outside the control area, and other offices 38 in which paper work associated with the operation of the plant may be performed. Similarly, desk, tables, and the like 40 are located on the control room floor for convenient use by the operators. A remote shut-down room 42 (FIG. 2) is also available on site for post-accident monitoring purposes (PAM).

Figure 2A:
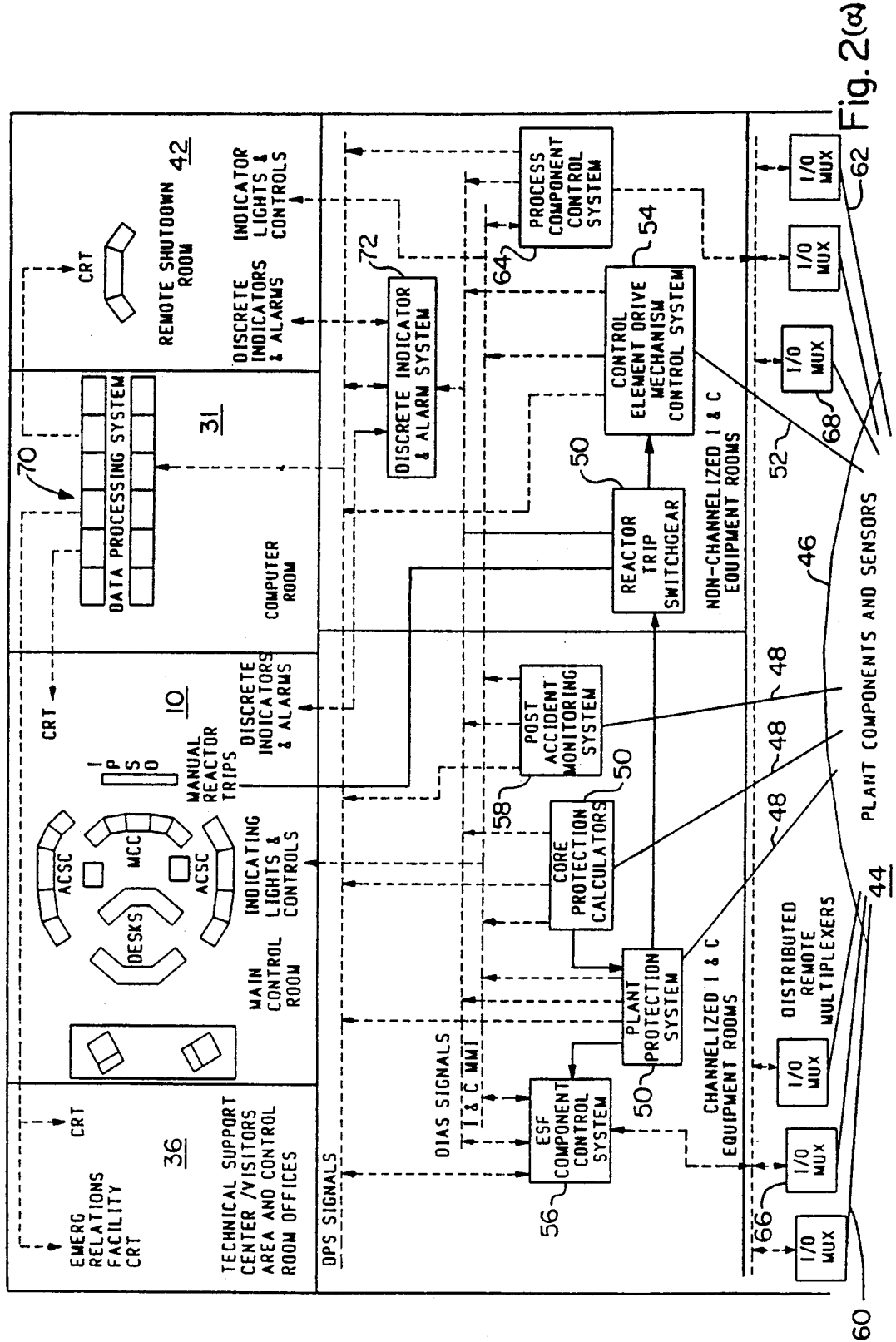

FIG. 2 is a schematic of the information links between the plant components and sensors, which for present purposes are considered conventional, and the various panels in the main control room. It is evident from FIG. 2 that information flows in both directions through the dashed line 46 representing the nuclear steam supply system and turbo generating system boundary. NSSS status and sensor information 48 that is used in the plant protection system 50 and the PAMS 58, passes directly through the NSSS boundary 46. Control signals 52 from the power control system pass directly through the NSSS boundary. Other control system signals 60,62 from the engineered safeguard function component control system 56 and the normal process component control system 64, are interfaced through the NSSS boundary via remote multiplexors 6. Each of the plant protection system, ESF component control system, process component control system, power control system and PAMs, is linked to the main control room 42, to each other, to the data processing system (DPS) 70 and to the discrete indication and alarm system (DIAS) 72.

FIG. 2 illustrates one significant aspect of the present invention, namely, the integration of monitoring, control and protection information, during both normal and accident conditions, so that the operator's task in determining an appropriate course of action is considerably simplified. The way in which this is accomplished will be described in the following sections.

II. Panel Overview

Figures 3A, 3B:
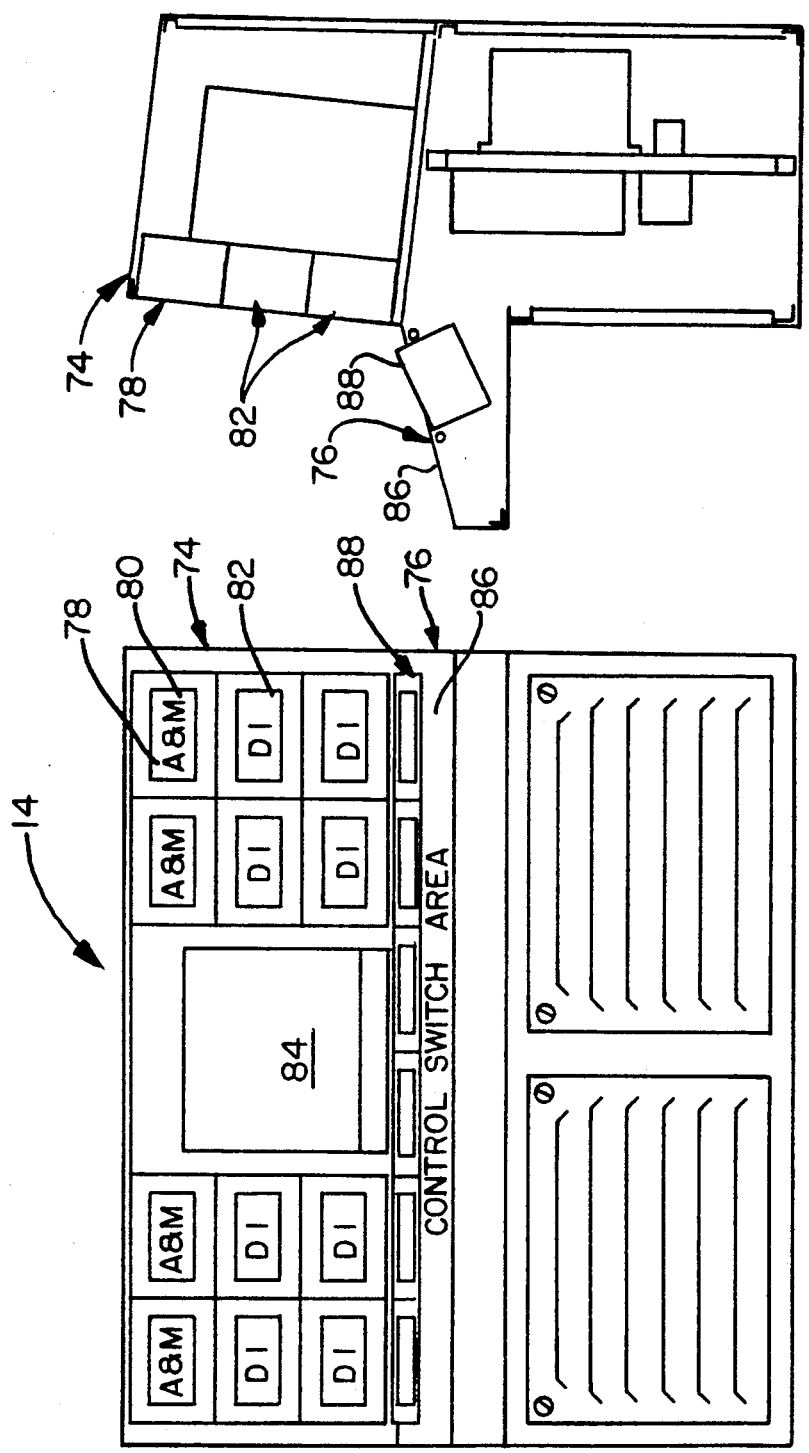
FIGS. 3(a) and 3(b) show a first type, and 3(c) and 3(d) a second type, of modular panel in accordance with one feature of the invention.
Figures 3C, 3D:
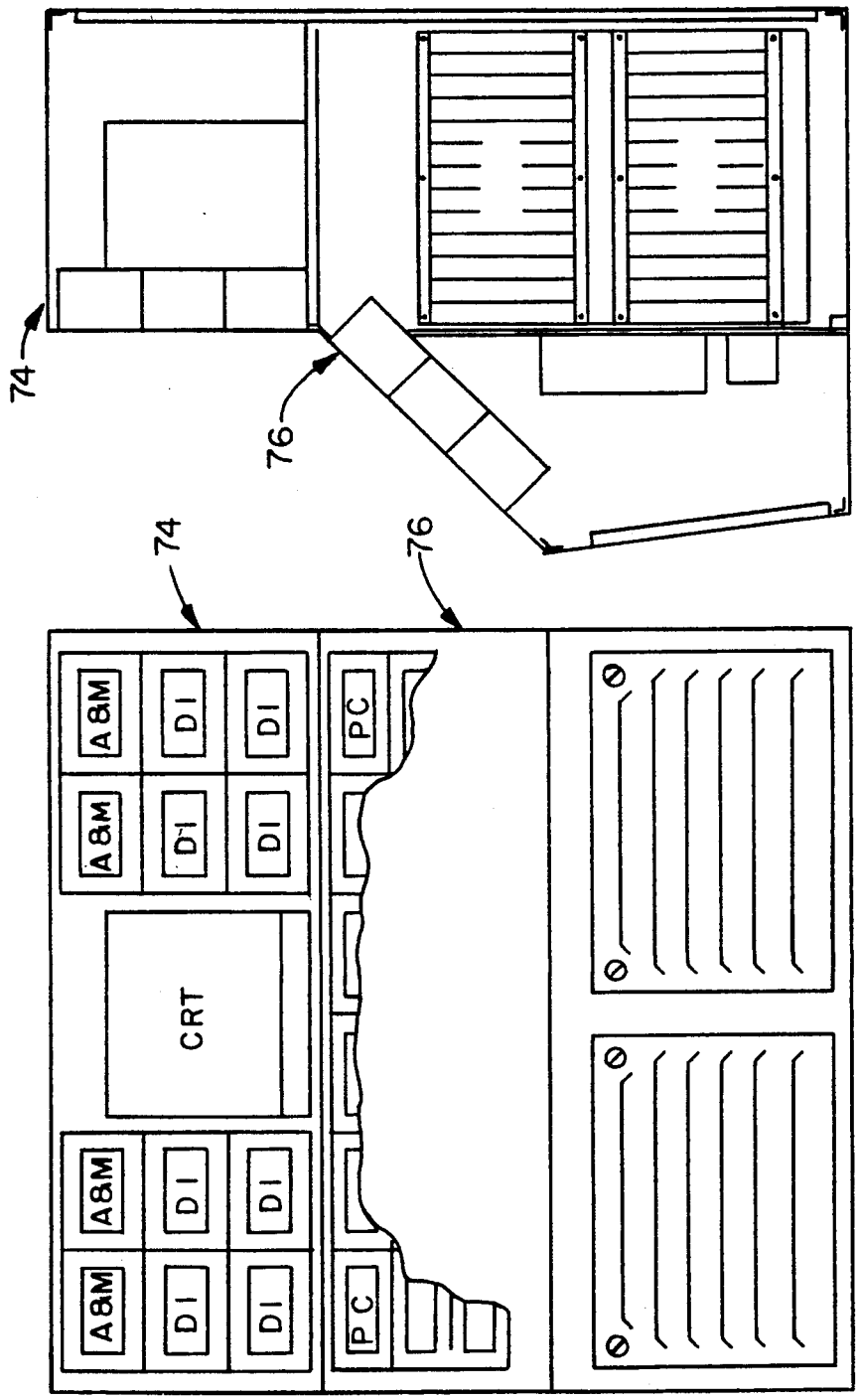

FIGS. 3(a) and 3(b) are schematics of a sit/stand panel such as the reactor coolant system panel 14 from the master control console 12 in accordance with one embodiment of the invention. FIGS. 3(c) and 3(d) show an alternative embodiment for stand up only. The substantially flat upper portion or wall 74 of the panel is vertically oriented and the substantially flat lower or desk portion 76 is substantially horizontal, with the monitoring and alarm interfaces carried by the upper portion, and the control interfaces carried on the lower potion.

A. Alarm and Messages

The alarm functionality (see FIGS. 9, 15-18) includes alarm and message (A&M) interface 78 having a multiplicity of tiles 80 each having a particular acronym or similar cue 81 associated therewith, whereby an alarm condition is indicated by the illumination of that tile and the generation of an accompanying audible signal. The operator is required to acknowledge the alarm by either pushing the tile or some other interface provided for that purpose. The number of tiles associated with a particular panel is dependent on the number of different alarm conditions that can arrive with respect to the monitored system, e.g, the reactor coolant system. Typically, hundreds of such tiles are associated with each panel. The alarms are prioritized into three (3) alarm classes (Priority 1, Priority 2, and Priority 3, prompting immediate action, prompt action and cautionary awareness). The RCS panel alarms are equipment status and mode dependent (Normal RCS, Heatup/Cooldown, Cold Shutdown/Refueling and Post Trip). When a high priority alarm actuates coincidentally with a low priority alarm on the same parameter, the lower priority alarm is automatically cleared. On improving conditions, the higher priority alarm will flash and sound a reset tone. The operator will acknowledge that the higher priority alarm has cleared. If the lower priority alarm still exists, its alarm window or indicator will turn on in the acknowledged state after the operator acknowledges that the higher priority alarm has cleared.

B. Indicator

The second monitoring interface are the process variable indicators, for example reactor coolant hot and cold leg temperatures, pressurizer level and pressure, and other RCS parameters. Discrete indicators 82 (see also FIGS. 7 and 8) provide an improved method of presenting the RCS panel parameters. Some RCS panel parameters require continuous validated display and trending on the master control console. Plant process and category 1 parameters like pressurizer level and RCS cold leg temperature fall into this category. Other RCS panel parameters are used less frequently. The discrete indicators 82 provide indication on parameters needed for operation when the Data Processing System (CRT information displays) is unavailable. These include Regulatory Guide 1.97 category 1 and 2 parameters, parameters associated with priority 1 or priority 2 alarms, other parameters needed for operation due to inaccessibility of local gages and parameters that the operator must view for surveillance when the Data Processing System is unavailable for a period of up to twenty-four (24) hours. These less frequently viewed parameters would be available on discrete indicators, with a menu available by operator selection. The menu would show alphanumeric listings of available data points. Lastly, parameters displayed on process controllers need not be available on discrete indicators.

C. CRT

Figure 4:
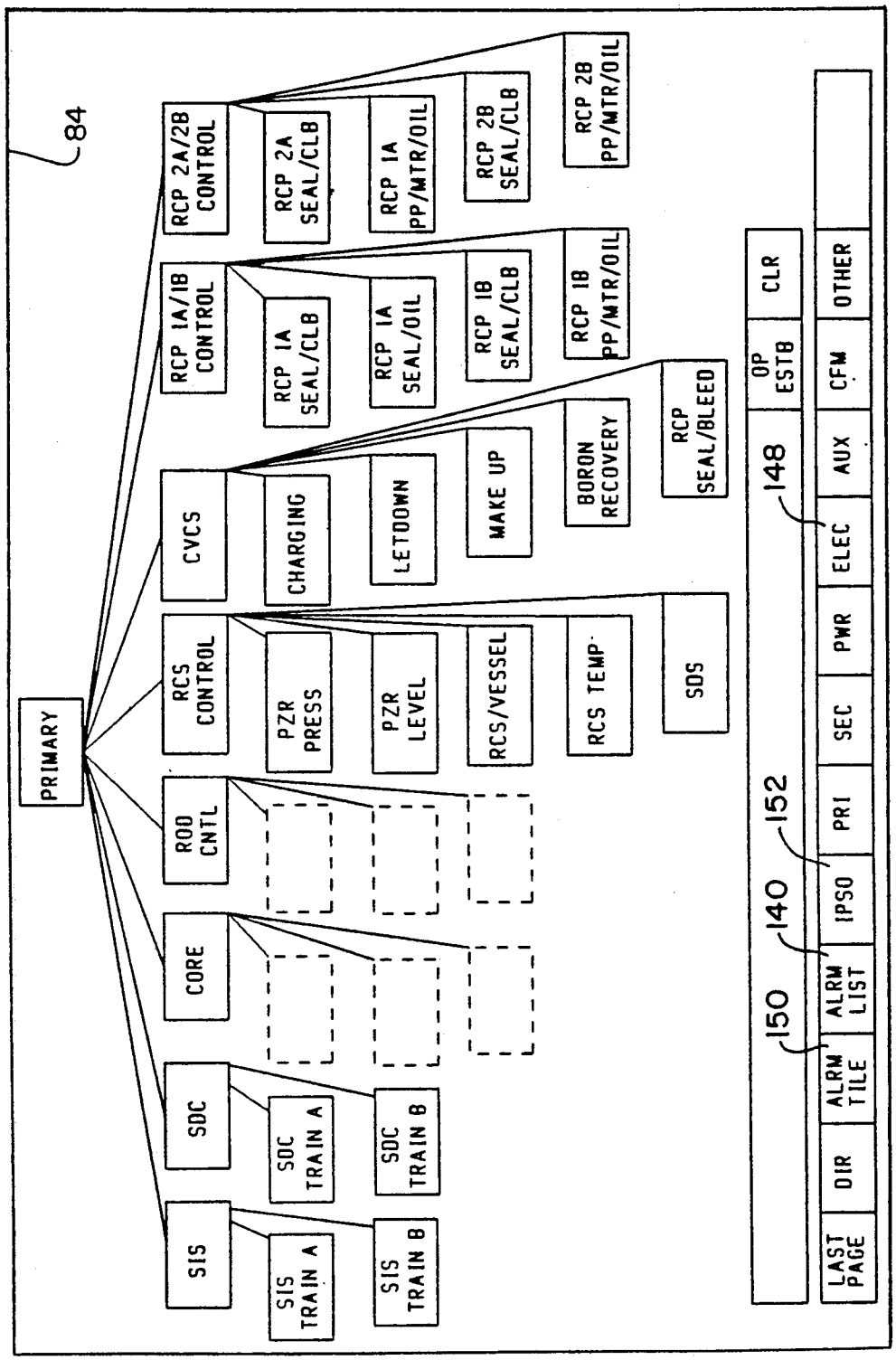
FIG. 4 is an illustration of the primary system display page directory available on the CRT screen in accordance with the invention.

Additionally, a CRT display 84 generates an image of the major vessels, pipes, pumps, valves and the like associated with, e.g., the reactor coolant system, and displays the alarms and values of the parameters which may be shown in bar, graph, trend line or other form on the other displays 78,82 (see FIGS. 4–6, 10, 12–14 and 19--23). From this CRT, the operator has access to all NSSS information. The information is presented in a three level structured hierarchy that is consistent with the operator's system visualization. FIG. 4 illustrates the NSSS primary side page directory 84, which all CRT pages related to the functions of the RCS panel.

D. Controller

In the control portion 76 of the panel 14, a plurality of discrete, on-off switches 86 are provided at the left, for example, each switch pattern being associated with a particular reactor cooling pump whose operating parameters are displayed immediately above it, and analog control interfaces which can be in the form of conventional dials or the like (not shown), or touch screen, discrete control as indicated at 88.

Process controllers are provided on the RCS panel to provide the operator with the ability to automatically or manually control process control loops. The process controllers allow control of throttling or variable position devices (such as electro-pneumatic valves) from a single control panel device. Process controllers are used for closed loop control of the following RCS panel process variables: pressure level, pressurizer pressure, RCP Seal Injection Flow and RCP Seal Injection Temperature. Process controllers are designed for each specific control loop utilizing a consistent set of display and control features.

In a conventional control room, each process control loop has its own control device, usually referred to as a MANUAL/AUTO Station. For example, the RCP Seal Injection Sub-System has five process control loops, a seal injection flow control loop for each of the four RCPs and a seal injection temperature control loop for the entire sub-system. These five control loops each have their own MANUAL/AUTO station which occupy a large amount of control panel space and make cross loop comparisons cumbersome. Although these five process loops are controlled independently, process variations in one controlled parameter affect the other four process parameters. Conventional MANUAL/AUTO stations make it difficult for the operator to simultaneously interact with the five MANUAL/AUTO stations.

The RCS panel process controllers for similar processes (related by function or system) are operated from a single control station, called a process controller. This single control station saves panel space, accommodates convenient cross channel checking and allows easier control loop interaction for multiple related controls.

Component control features (i.e., actuation of switches controls) provide the primary method by which the operator actuates equipment and systems on the RCS panel. The RCS panel has forty-three components controlled from momentary type switches. Each switch contains a red status indicator for active or open and a green status indicator for inactive or closed. Blue status indicator lights/switches are used to indicate and select automatic control or control via a process controller. In addition to color coding, the red switch is always located above the green switch to reinforce color distinction. Each switch generates an active control signal when depressed and is inactive when released. Each switch is backlit to indicate equipment status/position.

E. Display Formats

Process display formats use standard information placement for similar processes and equipment. Fluid system piping representations are where possible standardized, top to bottom, left to right, with avoidance of crossovers. Incoming and outgoing flow path connections are placed at the margins. Related data are grouped by task and analysis specifications for comparison, sequence of use, function, and frequency. Process representations/layout are based on the operator's process visualization to maximize the efficiency of his data gathering tasks. The operator's visualization of a system is often based on diagrams used with learning materials and plant design documentation associated with system descriptions.

Graphic information is presented on display page formats to aid in rapid operator comprehension of processes. Graphic information includes the use of bar graphs, flow charts, trends, and other plots, (e.g., Temp. vs. Press.).

Bar graphs are primarily used to represent flows, pressures and levels. Since level corresponds to a tank, the bar graph is placed with consistent spatial orientation with respect to the tank symbol. Level bar graphs are oriented vertically. Flow bar graphs when used are oriented horizontally. Bar graphs are also helpful for comparison of numeric quantities.

Flowcharts are used when they aid in the operator's process visualization. Flowcharts are helpful for understanding control system processes such as the Turbine Control System. Operator's learning materials for process control systems are frequently in a flowchart format, and thus a similar format on a display page is easy to comprehend.

Trends are used on display page formats when task analysis indicates that the operator should be informed about parameter changes over time. Additionally, the operator is able to establish trends of any data base points in the plant computers data base. In some situations, task analysis may indicate that more than one trend is important to monitor process comparisons. In other situations such as heatup/cooldown curves, two parameters may be placed on the different ordinate axis of a graph.

When more than one trend curve occupies the same coordinate axes, two ordinate vertical axes can be used for parameters that have different units. Scale labels are divisible by 1, 2, 5 or 10. Tick mark between scale labels are also divisible by 1, 2, 5 or 10. Trended information is typically presented on display pages with a scale of 30 minutes. However, the operator is able to adjust the scale to suit his needs. Logarithmic axes may be established using multiples of 10. If full range is less than 10, an intermediate range label is located to fall near the middle of the scale.

Different colors are used for trends occupying the same coordinates. When multiple curves use a common scale, the scale is gray and the curves are color coded. When multiple ordinate scales are used, they are color coded in correspondence to the curve. The colors used for trends will not include the alarm color or normal status color to avoid associating process parameter with normal or alarm conditions.

Color is used to aid the operator in rapidly discriminating between different types of information. Since the benefits of color coding are more pronounced with fewer colors, coding on informational displays (i.e., IPSO, CRTs, alarm tiles) is limited to seven colors. In addition, color coded information has other representational characteristics to aid in discrimination of data and discrimination by color deficient observers.

The following colors are used in the information display to represent the following types of information. The colors used have been carefully selected to yield satisfactory contrast for red-green deficient color observers.

| Color Representation Characteristics | |
|---|---|
| Black | Background color. |
| Green | Component Off/Inactive, Valve Closed and Operable. |
| Red | Component On/Activated, Valve Open and Operable. |
| Yellow | Alarm Status - Good attention-getting color. |
| Grey | Text, labels, dividing lines, menu options, piping, inoperable and non-instrumented valves, graph grids, and other applications not covered by other coding conventions. |
| Light Blue | Process parameter values. |
| White | System's response to operator touch, e.g., menu selection until appropriate system response occurs. |

Figure 5:
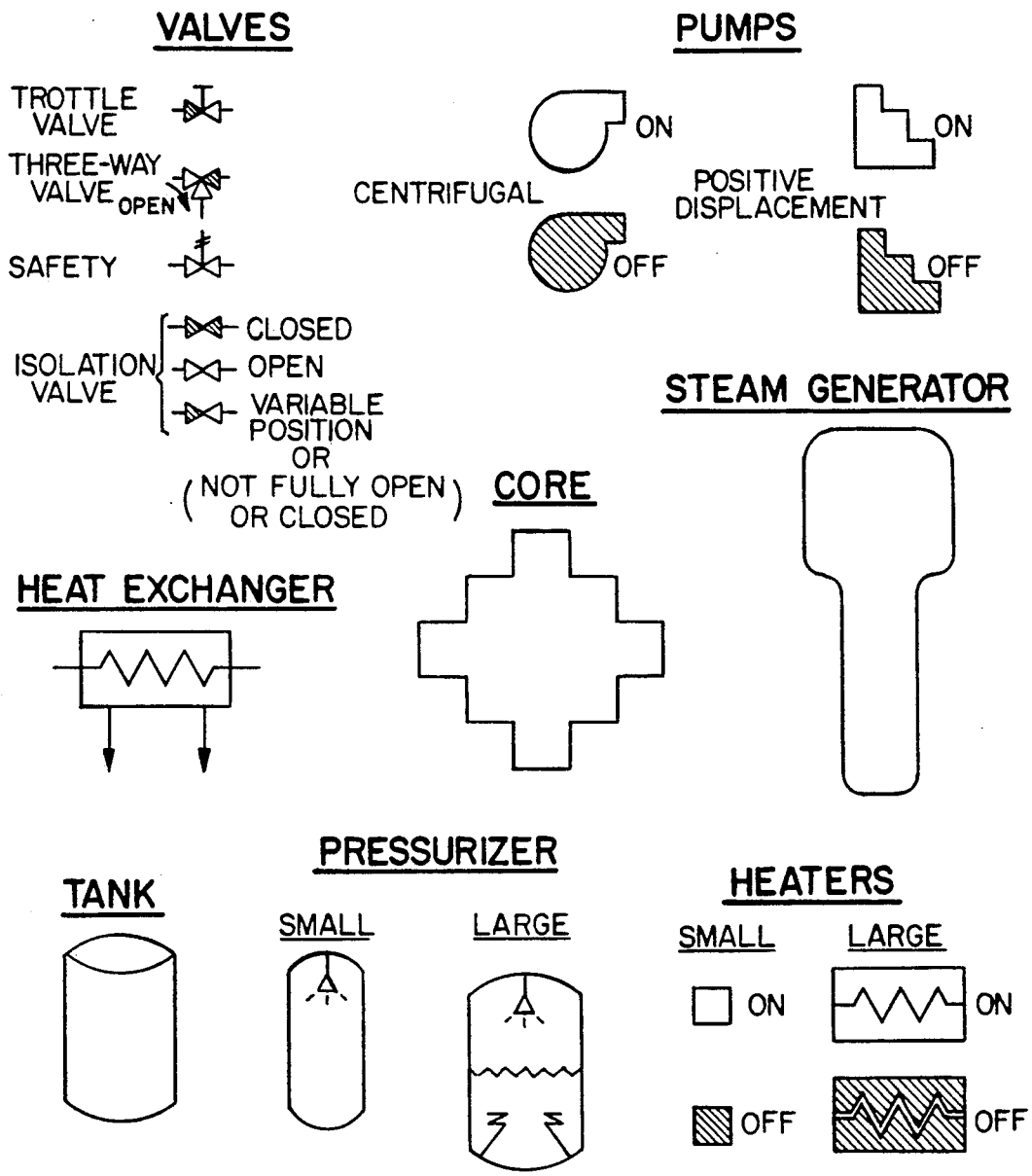
FIGS. 5 and 6 illustrate the preferred component symbols and shape coding used with the CRT and IPSO display in accordance with the invention.
Figure 6:
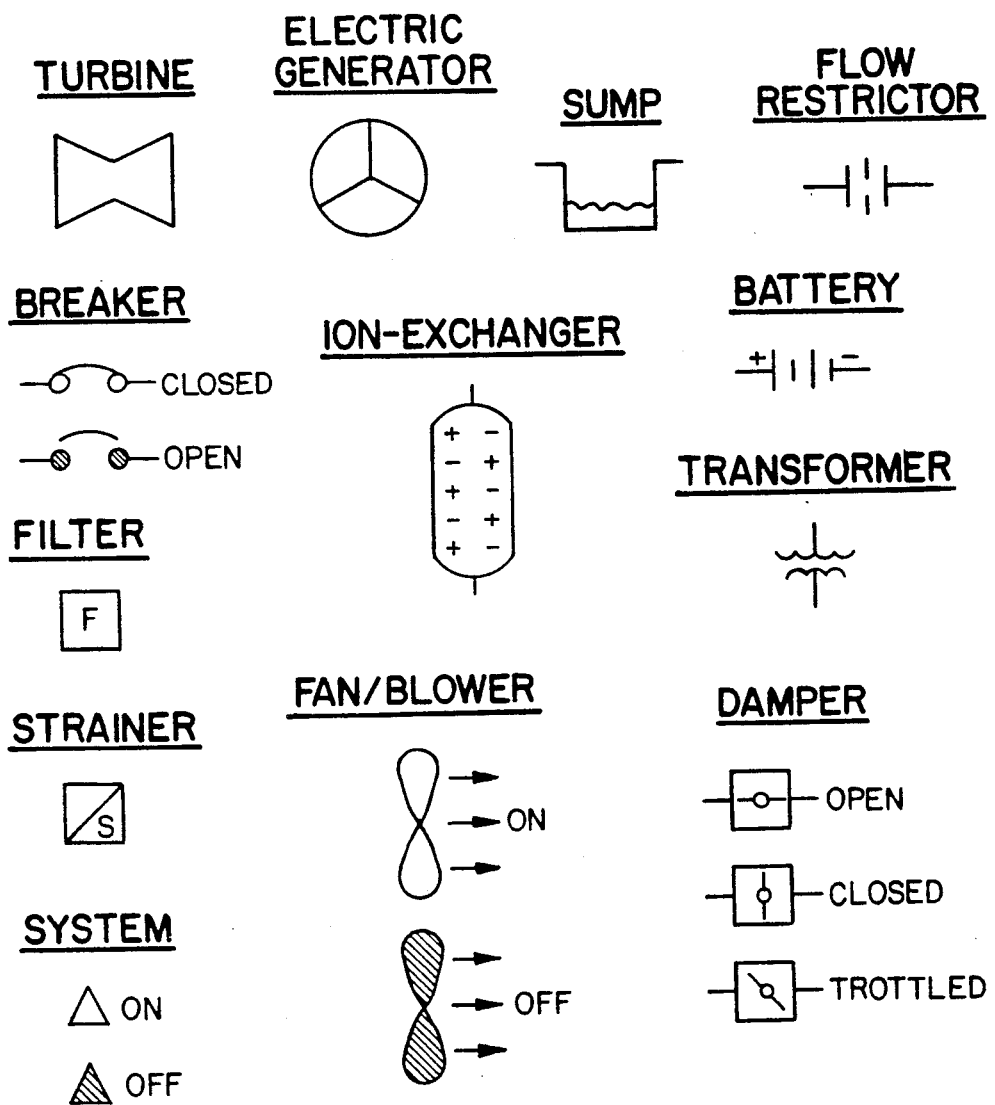

Shape coding is used in the information system to aid the operator to identifying component type, operational status, and alarm status. Component shape coding is based on symbology studies which included shape coding questionnaires given to nuclear power plant personnel. FIGS. 5 and 6 show the shapes used to represent components in the control room. An attribute of shape, hollow/solid, is reflective of the status of the component. Hollow shape coding indicates that the component is active, whereas solid shape coding is used to represent inactive components. An example of shape coding for a pump and valve is described as follows.

| Pump | A hollow pump indicates that the pump has been activated by the operator ot automatic control signal. A solid pump indicates that the pump has been deactivated by the operator or automatic control signal. |
|---|---|
| Valve | A hollow valve indicates that the valve is fully open and a solid valve indicates that the valve is fully closed. A valve not fully open or closed has a mixed solid/hollow shape, i.e., left side solid/right ride hollow. |

Information coding on valves is provided by these additional characteristics/representations:
Valve Open and Operable—Red Color Coding.
Valve Closed and Operable, Green Color Coding.
Non-Instrumented Valve—Grey Color Coding (Position is Operator Inputted).
Valve Not Operable—Grey Color Coding with Alarm Coding.
Loss of Indication—Grey Color Coding with Alarm Coding and mixed hollow/solid shape.

F. Display Integration

Information associated with safety related concerns is integrated as a part of the control room information to allow the operator to use safety related information, where possible, during normal operation. This is a better design from a human factors view than that of previous control rooms because in stressful situations, people tend to use information that they are most familiar with.

In many situations, safety related parameters are only a subset of the parameters that monitor a particular process variable. Operators of present control room designs typically use control or narrow range indications during process control and should use separate safety related indications when monitoring plant safety concerns. In this invention, the parameters typically used for monitoring and control are validated for accuracy against the safety related parameter(s), where available. If a parameter deviates beyond expected values from the associated safety related information, a validation alarm is presented to the operator. In response to an alarm condition, the operator can review the individual channels associated with the parameter on either a diagnostic CRT page or the discrete indicator displaying that parameter. At this time, he can select the most appropriate sensor for display. The operator is informed when the validation algorithm is able to validate the data. The resultant output of the validation algorithms are used on IPSO, the normally displayed format of a discrete indicator, and the higher level display pages on the CRT display system that contain the parameter. The Regulatory Guide 1.97 category 1 information is also displayed, by discrete indication display, at a single location on the safety monitoring panel.

Critical Function and Success Path (availability and performance) information is accessible throughout the information hierarchy (see FIGS. 10, 24, 25, 26, 27, 32–35). Alarms provide guidance to unexpected deviation in critical functions as well as success path unavailability or performance problems. Priority 1 alarms alert the operator to the inability to maintain a critical function as well as the inability of a success path to meet minimum functional requirements. Lower priority alarms provide subsystem/train and component unavailability or poor performance.

IPSO provides overview information that is most useful for operator assessment of the Critical Functions. Priority 1 alarms associated with the Critical Functions or Success Paths supporting the critical function are presented on IPSO critical function matrix. Supporting information relating to these alarm conditions is available by using the alarm tiles or the critical function section of the CRT display page hiearchy.

The critical function section of the display page hierarchy contains the following information: Level 1 Display Page—"Critical Functions: this page provides more detail on the critical function matrix presented on IPSO. Specifically, more detail on alarm conditions (descriptor, priority). This will help guide the operator to the appropriate level two critical function display page.

A 2nd level page exists for each of the 12 critical functions. Each page contains:

The critical function information provided on the 1st level display page that is associated with the critical function.

Information related to success path availability and performance of the success paths that can support that critical function.

High level information presented using a mimic format with the critical function/success path related information.

A time trend of the most representative critical function parameter.

The 3rd level display pages in the critical function hierarchy are a duplicate of display page existing elsewhere in the hierarchy. For example, a safety injection display page display page under Inventor Control also exists within the primary section of the display page hierarchy.

III. DISCRETE INDICATOR AND ALARM SYSTEM A. Discrete Indicators

The discrete indicators 82 provide an improved method of presenting safety related parameters. Major process parameter such as Regulatory Guide 1.97 Category 1, require continuous validated display and trending on the master control console. The discrete indicators also provide indication and alarms on parameters needed for operation when the Data Processing System (DPS) is unavailable. These include Regulatory Guide 1.97 Category 1, 2 and 3 parameters, parameters associated with priority 1 or priority 2 alarms, and other surveillance related parameters. Though the DPS is a highly reliable and redundant computer system, its unavailability is considered for a period of up to twenty-four hours. The less frequently viewed parameters are available on discrete indicators, with a menu available by operator selection.

Each discrete indicator has the capability to present a number of parameters associated with a component, system, or process. The discrete indicators present various display formats that are based on fulfilling certain operator information requirements.

Figure 7:
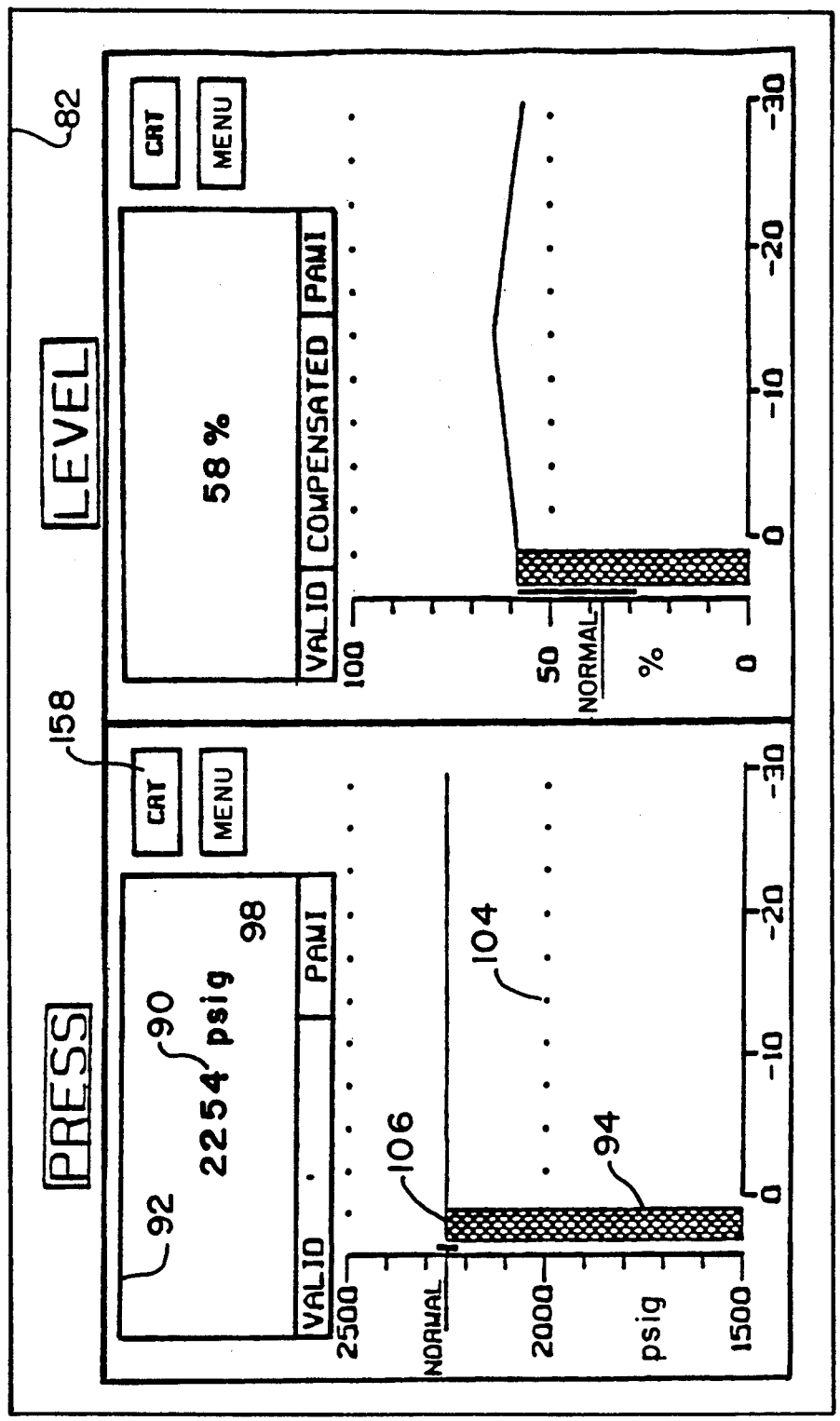
FIG. 7 is a typical discrete indicator display with trend format in accordance with the invention, for pressurizer pressure and level.
Figure 8:
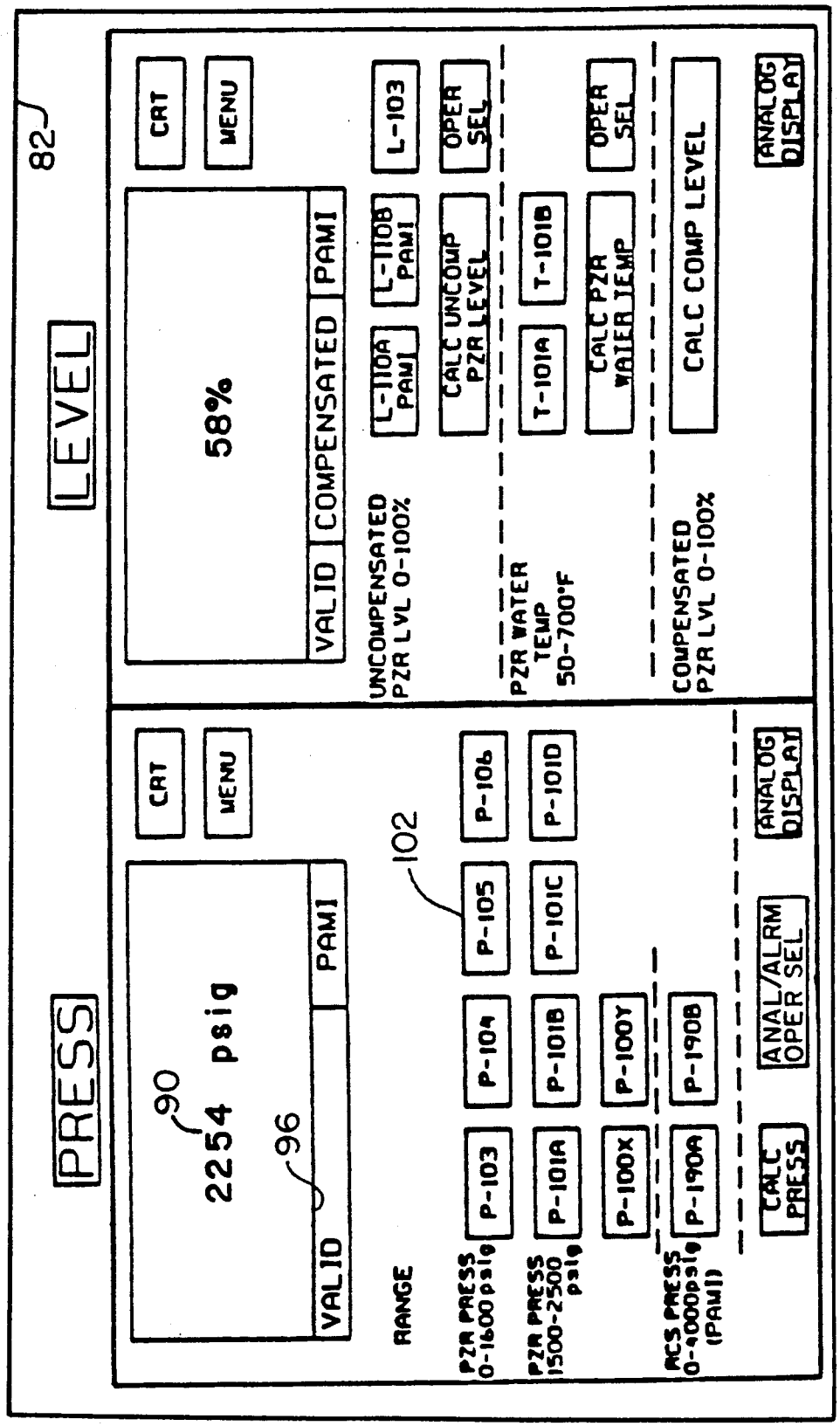
FIG. 8 is a indicator display for the system pressure and level menu pages associated with the indicator of FIG. 7.

When monitoring or controlling a process such as pressurizer pressure, it is desirable that the operator use a "process representation" value in the most accurate range. For this type of information, the discrete indicator 82, such as shown in FIGS. 7 and 8 presents a bold digital value in field 92 and an analog bar graph 94 of the validated average of the sensors in the most accurate range. The preferred validation technique is described in the Appendix, and validated status is indicated in field 96. This validated data is checked against post-accident monitoring indication (PAMI) sensor's when applicable. When in agreement with the PAMI, as shown at field 98 the indicator may be used for post-accident monitoring. This has the advantage of continuing to allow the operator to utilize the indicator he is most familiar with and uses on a day-to-day basis. The operator, upon demand can display any individual channel on the discrete indicator digital display, by touching a sensor identification such as 102. The use of validated parameters is a benefit to operators by reducing their stimulus overload and task loading resulting from presentation of multiple sensor channels representing a single parameter.

When the parameter cannot be validated, the discrete indicator displays the sensor reading that is closest to the last validated value. A validation alarm is generated for this condition. The discrete indicator continues to display this sensor's value until the operator selects, another value for indication. The field 96 on the discrete indicator that usually read "VALID" displays "FAULT SEL" in reverse image. This indicates that the value is not validated and has been selected by the computer. In this circumstances the operator should review the available sensors that can be used for the "process representation". If the operator makes a sensor selection (which is enabled by a validation fault or failure of the "VALID" signal to agree with PAMI), the field 96 with "FAULT SEL" will be replaced by the message "OPERATOR SELECT", which is displayed in reverse image. When the validation algorithm can validate the data and all faults have cleared, the validation fault alarm will clear and the algorithm a will replace the "FAULT SELECT" or "OPERATOR SELECT" "Process representation" in field 92 with the "VALID" "calculated signal".

Parameters that are required for monitoring the overall performance of plant processes or responding to priority 1 or 2 alarms are provided on discrete indicators. The most representative process parameter is the normally displayed value. Through menu options, the operator can view the other process related parameters.

There are ten discrete indicators provided for the RCS panel. The indicators are:
1. RCP 1A
2. RCP 1B
3. RCP 2A
4. RCP 2B
5. RCP SealBleed
6. RCS
7. $T_{hot}$
8. $T_{cold}$
9. Pressurizer Pressure
10. Pressurizer Level, FIG. 7 illustrates that two related discrete indicators can be shown on a single display 82. On the left side of the display 82 validated pressurizer pressure is shown whereas at the right pressurizer level is shown. The pressure display includes the following: digital "process representation" value 90 with units of measurement (2254 psig), quality 96 of the display (VALID), indication 98 that the display is acceptable for post accident monitoring (PAMI), bar chart 94, with the process value, a 30 minute trend, 104 normal operating range (NORMAL) 106, instrument range (1500–2500) and units of measurement for the bar chart (psig).

In the upper right hand corner of the PRESS display, there are two buttons, "CRT" and "MENU". When touched, the selected button backlights, indicating selection. When the operator removes his hand, the actual selection i's processed. The "CRT" button changes the CRR 84 menu options on the CRT located at the same panel as the discrete indicator where the button is pushed, e.g., RCS panel 14 as shown in FIG. 3. This "CRT" option identifies the CRT pages most closely associated the parameters on the discrete indicator.

The "MENU" button selects the discrete indicator menu (FIG. 8). The upper section of the menu page is nearly identical to the normal display. It contains the digital "process representation" value 90 with units of measurement (2254 psig), quality of display (valid), indication that the display is acceptable for post accident monitoring (PAMI), CRT and MENU buttons.

The lower section of the menu page contains selector buttons, such as 102, for all sensor inputs and "calculated signals" of this discrete indicator. The selector buttons 102 backlight when touched, indicating selection. When the operator removes his finger, the actual processing of the selection takes place. There are 13 buttons for pressure: four for 0–1600 psig pressurizer pressure: P-103, P-104, P-105 and P-106; six for 1500–2500 psig pressure: P-101A, P-101B, P-101C, P-101D, P-101X and P-100Y; two for 0–4000 psig RCS pressure: P-190A and P-190B; and one for the "calculated signal" pressure: CALC PRESS. When selected, the "CALC PRESS" button displays the "calculated signal" (i.e., the output of the algorithm). The "calculated signal" of the algorithm can be a "valid" signal. If the algorithm were to fail and select an individual sensor for the "calculated signal", the "VALID" message would be replaced by the message "fault select". This message "fault select" would be displayed in reverse image on the discrete indicator. This message would be displayed on the discrete indicator any time "CALC PRESS" is selected until the algorithm outputs a "VALID" signal to replace the "FAULT SELECT" sensor.

To change the display, the operator would touch the button containing the sensor he wished to view. For example: by touching the button marked "P-103", the digital display would display the output from the 0–1600 psig range sensor P-103. The message "VALID" below the digital value would be replaced by the message "P-103". Additionally, the "PAMI" message would be removed because P-103 is not a PAMI sensor.

The button "ANAL/ALARM OPER SEL" selects the signal used for the "process representation" in DIAS. It selects whatever sensor is displayed on the digital display. The signal select button gives the operator the option to "operator select" any of the sensors for analog display and alarm processing when a fault exists, such as:

1. When validation fails and a "FAULT SELECT" sensor is selected for the "process representation".

2. When the "Valid" output does not correlate to the PAMI sensor(s).

If a fault were present and the operator elected to select P-103 for the "process representation", he would select the menu, select P-103 for display and then touch the "ANAL/ALARM OPER SEL" button. The message in field 96 below the digital display would read "P-103 OP SEL" in reverse image. Any time P-103 was selected for display, it would have the message "OP SEL" displayed in reverse image, indicating that the output from P-103 is being used for the "process representation". After selecting an "operator select" sensor for the "process representation", it is expected that the operator will depress the button marked "ANALOG DISPLAY". This would return to the analog 94 and trend display 104 (FIG. 7) for the operator selected sensor with the message "OP SEL" in reverse image.

The "ANAL/ALARM OPER SEL" button is not normally displayed on the discrete indicator menu page; it automatically displays when the "operator select permissive" is enabled after a fault. The "ANAL/ALARM OPER SEL" button is removed from the menu page when the "operator select permissive" is disabled after all faults are corrected.

The button "ANALOG DISPLAY" removes the menu page and replaces it with the bar graph (analog) and trend display for whatever sensor or "calculated signal" is currently selected as the "process representation" (normally the "valid""calculated signal" output).

Other validated process parameter discrete indicators operate in an identical manner.

Menu driven discrete indicators contain all level 1 and 2 displays for functional group of indication.

B. Validation Algorithm Summary

To reduce an operator's task loading and to reduce his stimulus overload, a generic validation algorithm is used. This algorithm takes the outputs of all sensors measuring the same parameter and generates a single output representative of that parameter, called the "Process Representation". A generic validation approach is used to ensure that it is well understood by operators. This avoids an operator questioning the origin of each valid parameter.

This generic algorithm averages all sensors [(A,B,C and D) (sensor quantity may be parameter specific)] and deviation checks all sensors against the average. If the deviation checks are satisfactory, the average is used as the "Process Representation" and is output as a "valid" signal. If any sensors do not successfully pass the deviation check against the average, the sensor with the greatest deviation from the average is taken out and the average is recalculated with the remaining sensors. When all sensors used to generate the average deviation check satisfactorily against the average, this average is used as the "valid process representation". This "valid process representation" is then deviation checked against the post-accident monitoring system sensors (if present). If this second deviation check is satisfactory, the "process representation" is displayed with the message "Valid PAMI" (Post-Accident Monitoring Indication), indicating that this signal is suitable for monitoring during emergency conditions, since it is in agreement with the value as determined by the PAMI sensors. As long as agreement exists, this indicator may then be utilized for post-accident monitoring rather than utilizing the dedicated PAMI indicator. This provides a Human Factors Engineering advantage of allowing the operator to use the indicator he normally uses for any day-to-day work and which he is most familiar with.

The validation process, as described, reduces the time an operator takes to perform the tasks related to key process related parameters. To insure timely information, all validated outputs are recalculated at least once every two seconds. Additionally, redundancy and hardware diversity are provided in the calculating devices insuring reliability.

The following section describes the algorithm and display processing on the DIAS and CRT displays.

1. The "process representation" is always displayed on the applicable DIAS display and/or CRT page(s) where a single "process representation" is needed as opposed to multiple sensor values. Each plant process parameter is evaluated individually to determine the type of display required and location (DIAS and CRT or CRT only).

2. The "process representation" is always a "valid" value unless there is a:
   a. "Fault Select" value or
   b. "Operator Select" value.
   Both of these are explained below.

3. The "process representation" is always used for alarm calculations and trending (where a single value is normally trended). This can be "valid", "fault select" or "operator select" data, depending on the results of the algorithm calculations as described below.

4. Using a menu on DIAS or the CRT, the operator may view any of the values (A,B,C,D or calculated output) without changing the "process representation".

5. A "Fault Select" value will be displayed automatically as the "process representation" when the validation algorithm is unable to yield "valid" data. The "fault select" value is the output of the sensor closest to the last "valid" signal at the time validation initially failed. On DIAS (if applicable), this information will be labeled "fault select". On the CRT(s) graphic pages, this information is preceded by an asterisk(*) to indicate suspect data. The "fault select" "process representation" is automatically returned to a "valid" process representation" when the validation algorithm is able to calculate "valid" data.

6. An "operator select" sensor may be selected for the "process representation" only when there is a:
   a. "Validation Fault" or
   b. "PAMI Fault".

The "operator select" process representation" will replace the "valid" or "fault select" "process representation". On DIAS (if applicable), this information will be labeled "operator select". On the CRT(s), this information will be preceded by an asterisk(*) on graphic displays and labelled "operator select" in the data base. The "operator select" "process representation" is automatically replaced by the calculated "valid" signal when both the "Validation Fault" and the "PAMI Fault" clear.

It should be appreciated that the discrete validation is accomplished using a generic algorithm that is applicable to different parameters. In this manner, the operators understand how the validated reading has been determined for every parameter and, again, this reinforces their confidence. This algorithm always has an output and allows the operator selection for display when validation is not possible. The discrete indicators continuously display all vital information yet allow easy access via a function or organized menu system to enable the operator to access less frequently needed information. There is no need for separate backup displays, since the backups are integrated in the subsidiary levels of retrieval. Such displays vastly reduce the amount of indicator locations required on the panel and yet provide all vital indication in a easy to use format, thereby reducing stimulus overload.

Figure 37:
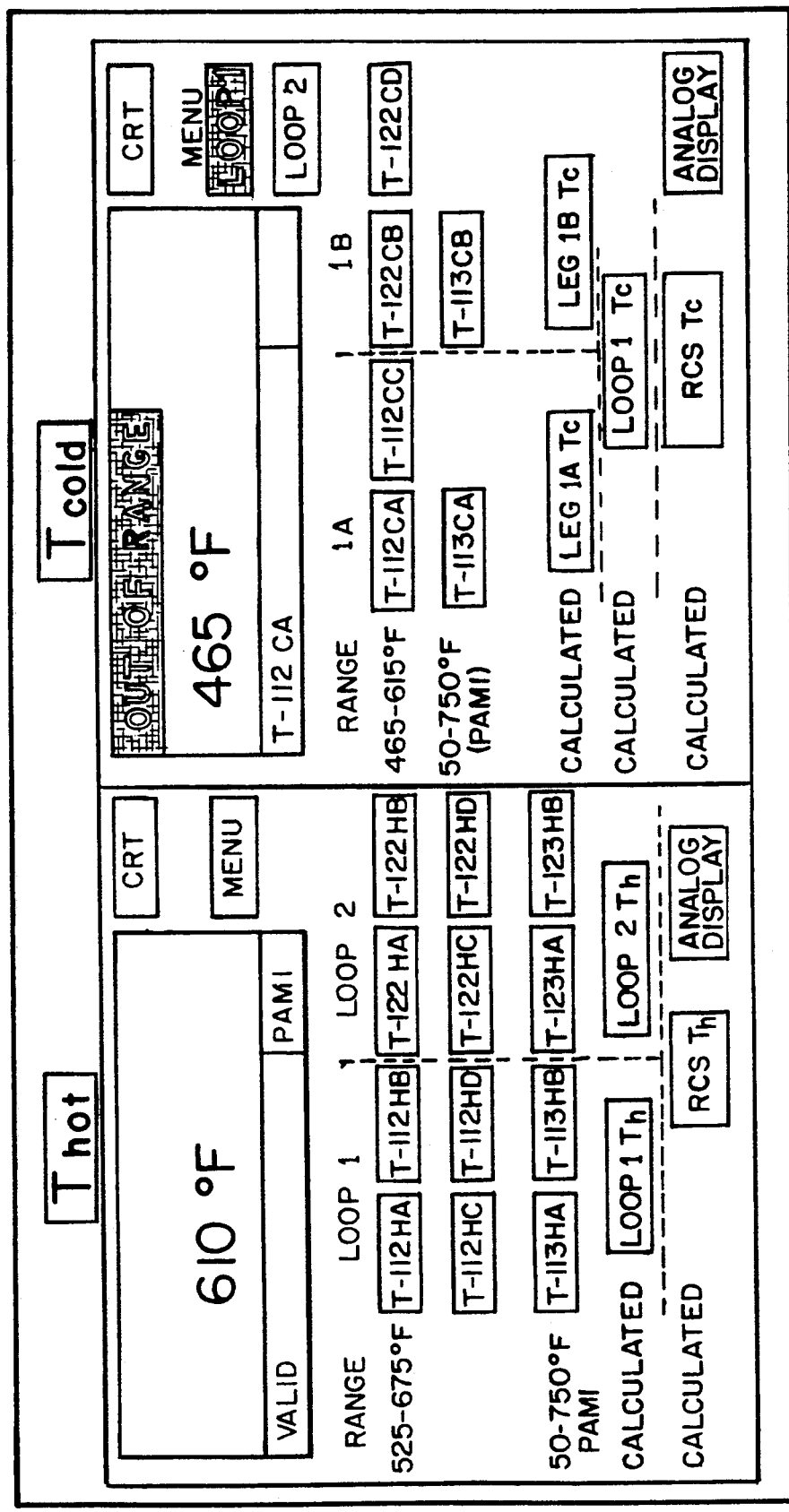
FIG. 37 is an illustration of a discrete indicator display for the hot and cold leg primary loop temperatures, showing each sensor used in the validation algorithm.

The Appendix in conjunction with FIGS. 37 and 38 provide additional details on the preferred implementation of the algorithm.

C. Alarm Processing and Display

Another feature of the monitoring associated with each panel, is the reduction of the number of alarms that are generated, in order to minimize the operator information overload. Cross channel signal validation is accomplished prior to alarm generation, and the alarm logic and set points are contingent on the applicable plant mode.

The alarms are displayed with distinct visual cueing in accordance with the priority of the required operator response. For example, priority 1 dictates immediate action, priority 2 dictates prompt action, priority 3 is cautionary, and priority 4, or operator aid, is merely status information.

The types of alarm conditions that exist within each category are described below:

Priority 1

1. Conditions that may cause a trip in less than 10 minutes.
2. Conditions that may cause major equipment damage.
3. Personnel/Radiation hazard.
4. Critical Safety Function violation.
5. Immediate Technical Specification Action Required.
6. First-Out Reactor/Turbine Trip.

Priority 2

1. Conditions that may cause a trip in greater than 10 minutes.
2. Technical specification action items that are not Priority 1.
b 3. Possible equipment damage.

Priority 3

1. Sensor deviations.
2. Equipment status deviations.
3. Equipment/process deviations not critical to operation.

The alarms are displayed using techniques that help the operator quickly correlate the impact of the alarm on plant safety or performance. These techniques include grouping of displays which highlight the nature of the problem rather than the symptom denoted by the specific alarm condition. Another is the fixed spatial dedication of alarm displays allowing pattern recognition. Another is the plant level pictorial overview display on the IPSO board which shows success paths and critical functions impacted by the priority 1 alarm.

To insure that all alarms are recognized by the operator without task overload, all alarms can be either individually acknowledged, or acknowledged in small functionally related groups. All alarms can be acknowledged at any control panel. Momentary audible alerts for alarm state changes require no operator action to silence. Periodic momentary audible reminders are provided for unacknowledged conditions. The operator can affectuate a global alarm stop flash which will automatically resume in time, to allow for deferred acknowledgement.

In addition to alarms, an information notification category "Operator Aids" has been established for information that may be helpful for operations but is not representative of deviations from abnormal conditions. Conditions classified as "Operator Aids" include: channel bypass conditions, approach to interlocks and equipment status change permissive.

Some parameters have more than one alarm on the same parameter (i.e., Seal Inlet Temperature Hi Hi and Hi). To limit the operator's required response, the lower priority is automatically cleared without a reset tone or slow flash rate when the higher priority alarm actuates after actuation of the lower priority alarm. The Hi Hi alarm will be acknowledged by the operator; therefore, the operator acknowledgement of the cleared lower priority alarm is unnecessary. When the condition improves to the point where the higher priority alarm clears, the condition will sound a reset tone and the alarm window will flash slowly. The operator will acknowledge that the higher priority alarm has cleared. If the lower priority alarm condition still exists, its alarm tile or indicator will turn on in the acknowledged state after the operator acknowledges that the higher priority alarm has cleared. If the condition improves such that it clears both the high and low priority alarms before operator acknowledgement, then operator acknowledgement of the cleared high priority alarm will also clear the lower priority condition.

1. Mode and Equipment Depending

A key feature of the alarm system is its mode dependent and equipment status dependent logic. These features combine to greatly reduce the number of alarms received during significant events and limit those alarms to conditions that actually represent process or conditions that actually represent process or component deviations pertinent to the current plant state. Mode and equipment dependency is implemented both through alarm logic changes and setpoint changes. An alarm of mode dependency is the reduction in the low pressurizer alarm setpoint to avoid a nuisance alarm on a normal reactor ring. Equipment dependent logic is used to actuate a low flow alarm only when an upstream pump is supposed to be operating.

Four modes have been selected which correspond to significant changes in the alarm logic based on the plant state. These modes are:
1. Normal operation
2. Heatup/cooldown.
3. Cold shutdown/refueling.
4. Post-trip.

The alarm modes are manually entered by the operator with the exception of the post-trip mode. Upon a reactor trip, the alarm logic automatically switches to the post-trip mode with no operator action required. All equipment dependent alarm features are actuated automatically without operator action.

2. Subfunction Grouping

Figure 15:
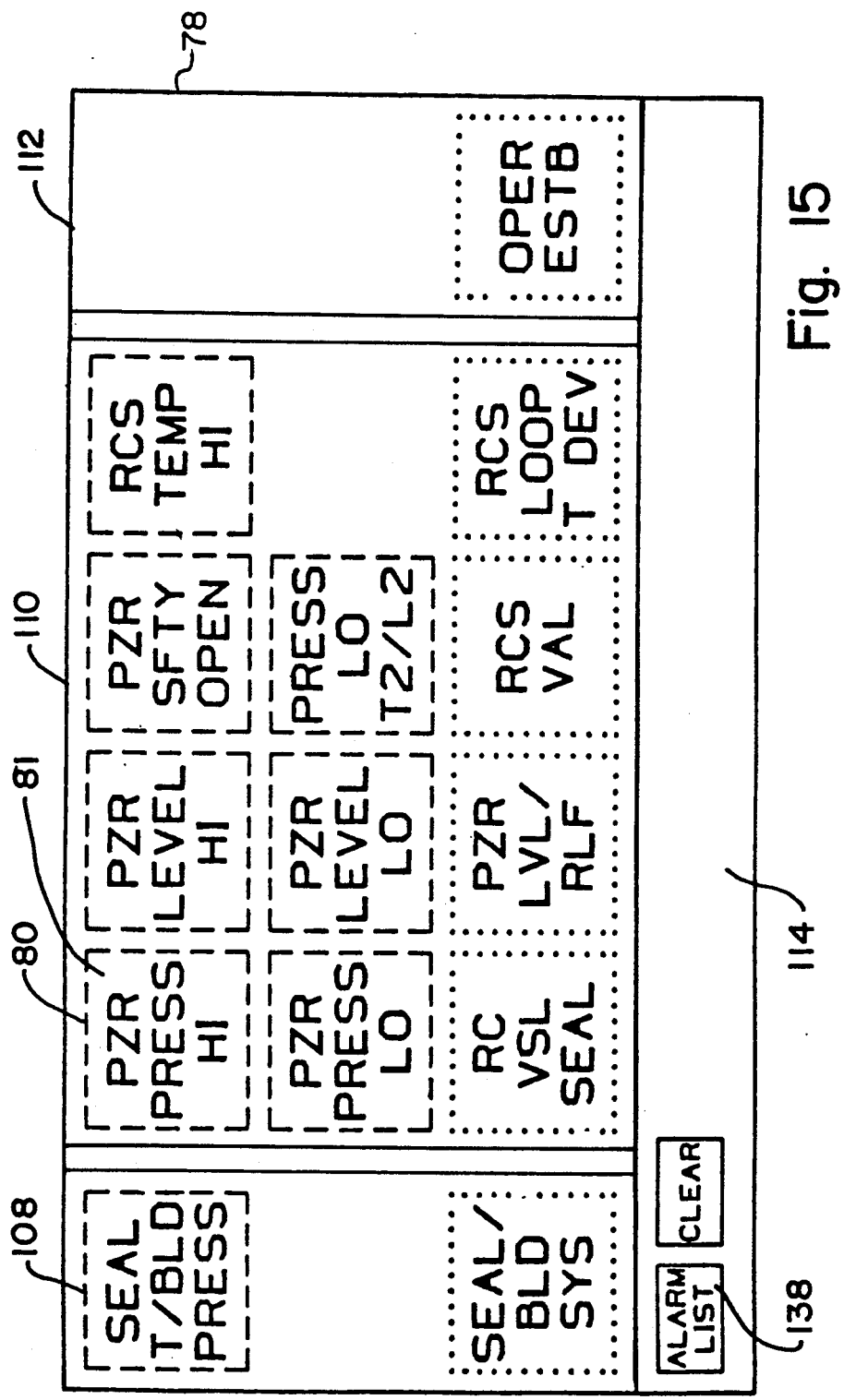
FIG. 15 is a typical alarm tile grouping for the reactor coolant system/seal alarm tiles associated with the discrete indication and alarm system.

The RCS panel has over 200 conditions that can cause an alarm. To reduce the operator's stimulus overload due to the quantity of alarms and improve his alarm comprehension, many alarms are grouped into subfunctional groups 108, 110, 112 (FIG. 15). The subfunctional group alarm tiles have a variety of related subfunctional group alarm messages that are read on the panel alarm message window 114 adjacent to the alarm tile) or CRT. In cases where key process related parameters are alarmed, there is a single alarm message for each alarm tile (i.e., RCS Pressure Low). This single alarm message allows the operator to quickly identify the specific process related problem.

Figure 16:
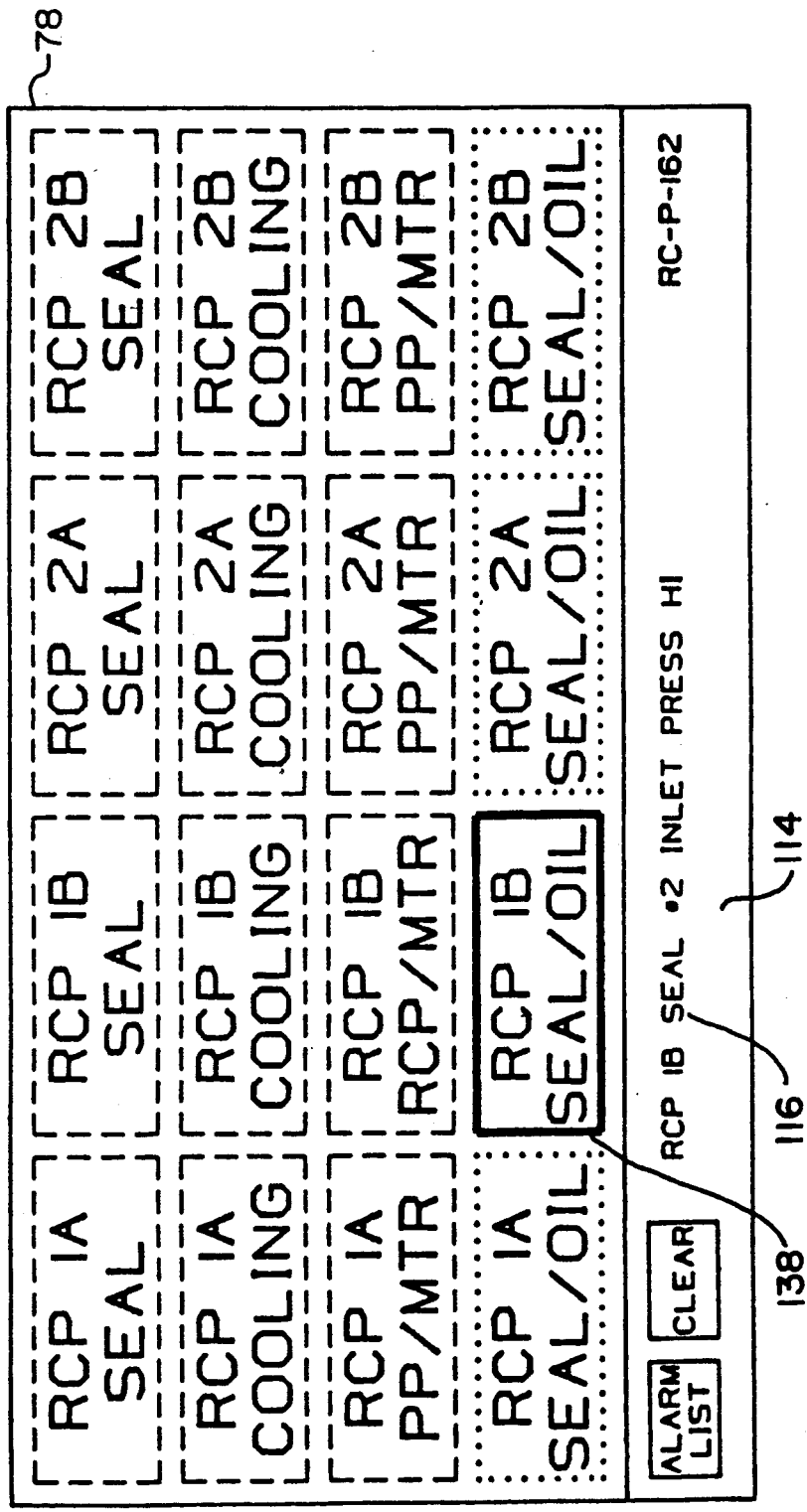
FIG. 16 is an illustration of the alarm tile display for the reactor coolant pumps, in which one tile has been actuated.
Figure 19:
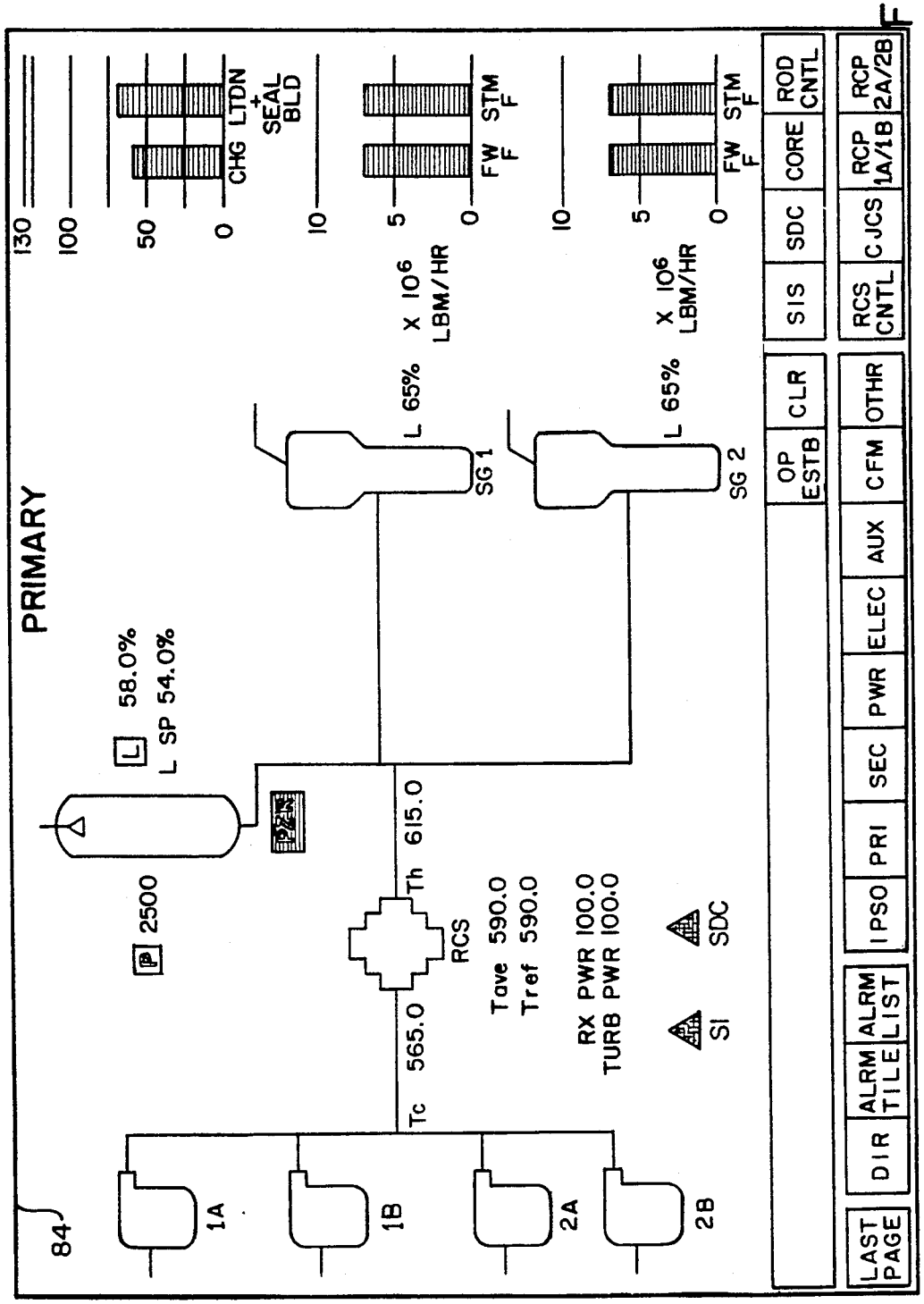
FIG. 19 is an illustration of the CRT display for the primary system.

As shown in FIG. 16, some alarms are grouped by similar component rather tan process function, and are augmented by a message such as 116.

Figure 9:
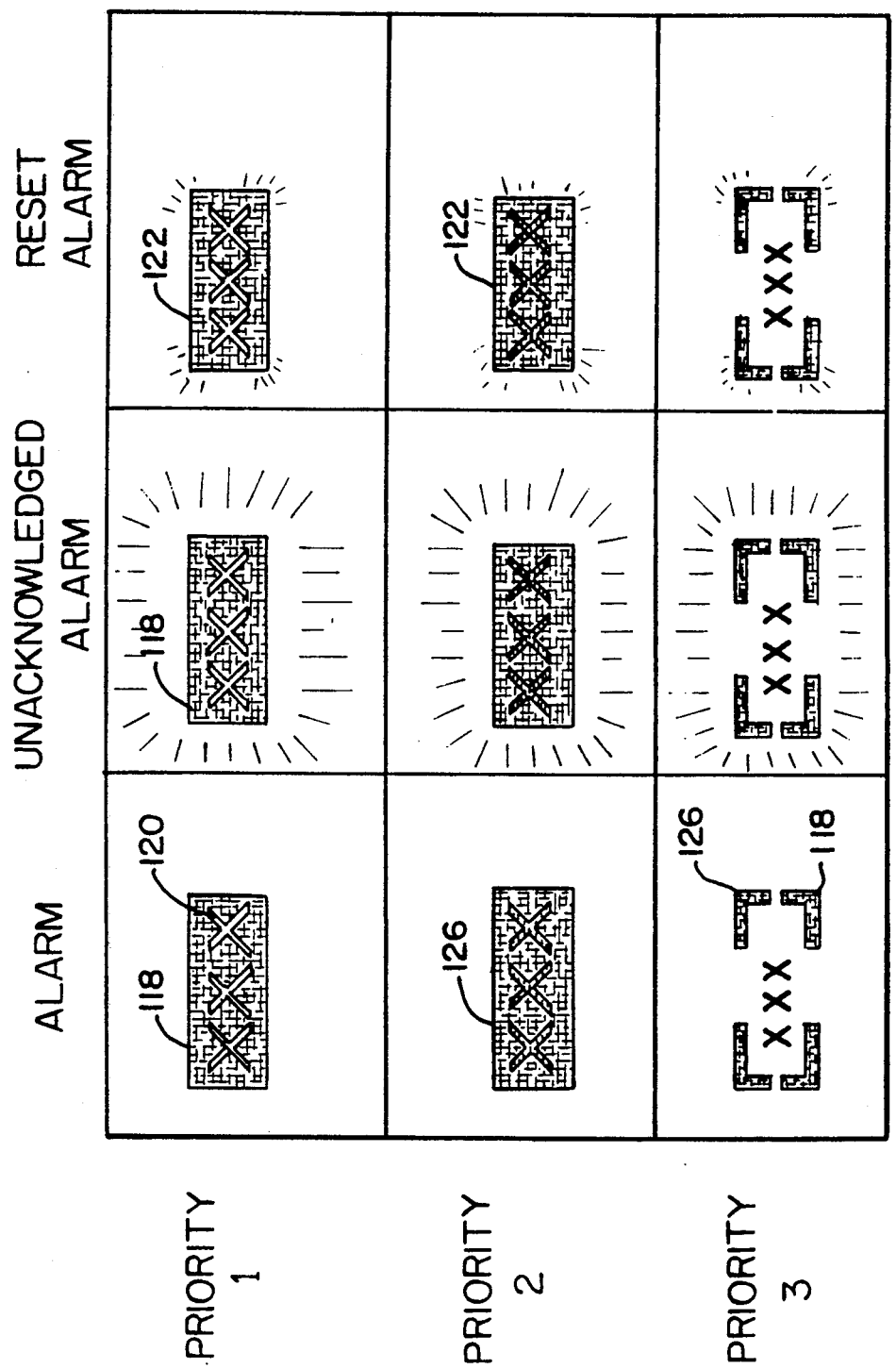
FIG. 9 is a schematic representation of the alarm presentation in accordance with the present invention.

As shown in FIG. 9, alarm tile can be in one of the following states:

1. Unacknowledged Alarm—If there is an unacknowledged alarm associated with an alarm tile, the alarm tile will flash at a fast rate (i.e., 4 times/sec using a 50/50 duty cycle as depicted by the long rays in FIG. 9). This condition takes precedence over all other alarm tile states for group alarms.

2. Cleared Alarm/Return to Normal (Reset Alarm)—When an alarm condition clears, the corresponding alarm tile flashes at a slow rate (i.e., 1 time/sec using flashes at a slow rate (i.e., 1 time/sec using a 50/50 duty cycle as depicted by the short range in FIG. 9) until this condition has been acknowledged. This condition takes precedence over the remaining two states for grouped alarms.

3. Alarm—If an alarm condition exists and alarm states 1 and 2 above do not exist, then the alarm tile is lit without flashing (as depicted by the absence of rays in FIG. 9).

4. No Alarm—If there is no alarm condition associated with an annuniciator tile, then the alarm tile is not lit (not depicted in FIG. 9). To indicate that the alarm tile's bulb is functioning, a lamp test feature is provided.

3. Shape and Color Coding

Alarm information is identified by a unique tile color, preferably yellow 118. The parameter/component descriptor or concise message 120 within the tube is shown in blue. Grey color coding is used for the tile color 122 for Return to Normal conditions. Shape coding is used to identify alarm priority, i.e., 1, 2 or 3. A single bright color is used for alarm information to maximize the attention-getting quality of this information. The shape coding used for identifying alarm priorities uses representational features of decreasing levels of salience. Shape coding of alarm priorities also allows retention of priority information for Return to Normal conditions.

For priority 1 alarms, the alarm tiles, mimic diagram components, symbols, process parameters, and menu option fields have their descriptor presented in reverse image (i.e., blue letters 12 on a yellow 118 solid rectangular background 124) using the alarm color coding. The descriptor is presented in blue to provide good contrast for readability. In addition, the alarm tiles and menu option fields on the CRT use the same representation.

For priority 2 alarms, the alarm tiles, mimic diagram parameters, components, menu options, and symbols have a thin (1 line) box 126 using the yellow alarm color code 118 around their descriptor, which is blue.

For priority 3 alarms, the alarm tiles, mimic diagram parameters, components, menu options, and symbols have brackets 128 around their descriptors 120. For all alarms, English Descriptors on the CRT's message line are also represented with the alarm representation formats when they are in alarm.

4. Alarms On CRT

Each CRT page in the data processing system provides the operator with an overview of the existence of any unacknowledged alarm conditions and a general overview of where they exist within the plant. The standard menu provided with each display page contains the IPSO and all first level display pages as menu options (see FIG. 10 menu region 130). These menu option fields provide the existence of unacknowledged alarms in their sector of the display page hierarchy and their alarm status/priority by using the alarm highlighting, features as described above. If an alarm tile is in (i.e. in the DIAS) alarm, a first level display page menu option field, such as 132, in the menu options 130 shows that an alarm condition exists in an associated area of the display page hierarchy. The alarm tiles in menu 130 are categorized into the first level display page set corresponding to the console groupings or by critical function, as shown in FIG. 11.

In addition to alarm information represented on the first level display page menu options, the following display page features are also used to represent the existence of alarms.

Display page menu options 134 that provide access to levels 2 and 3 display pages are lit with the above described alarm representation if information on the corresponding page is in alarm (e.g., if an unacknowledged alarm exists, the display page menu option is highlighted to show the highest priority unacknowledged condition).

Figure 12:
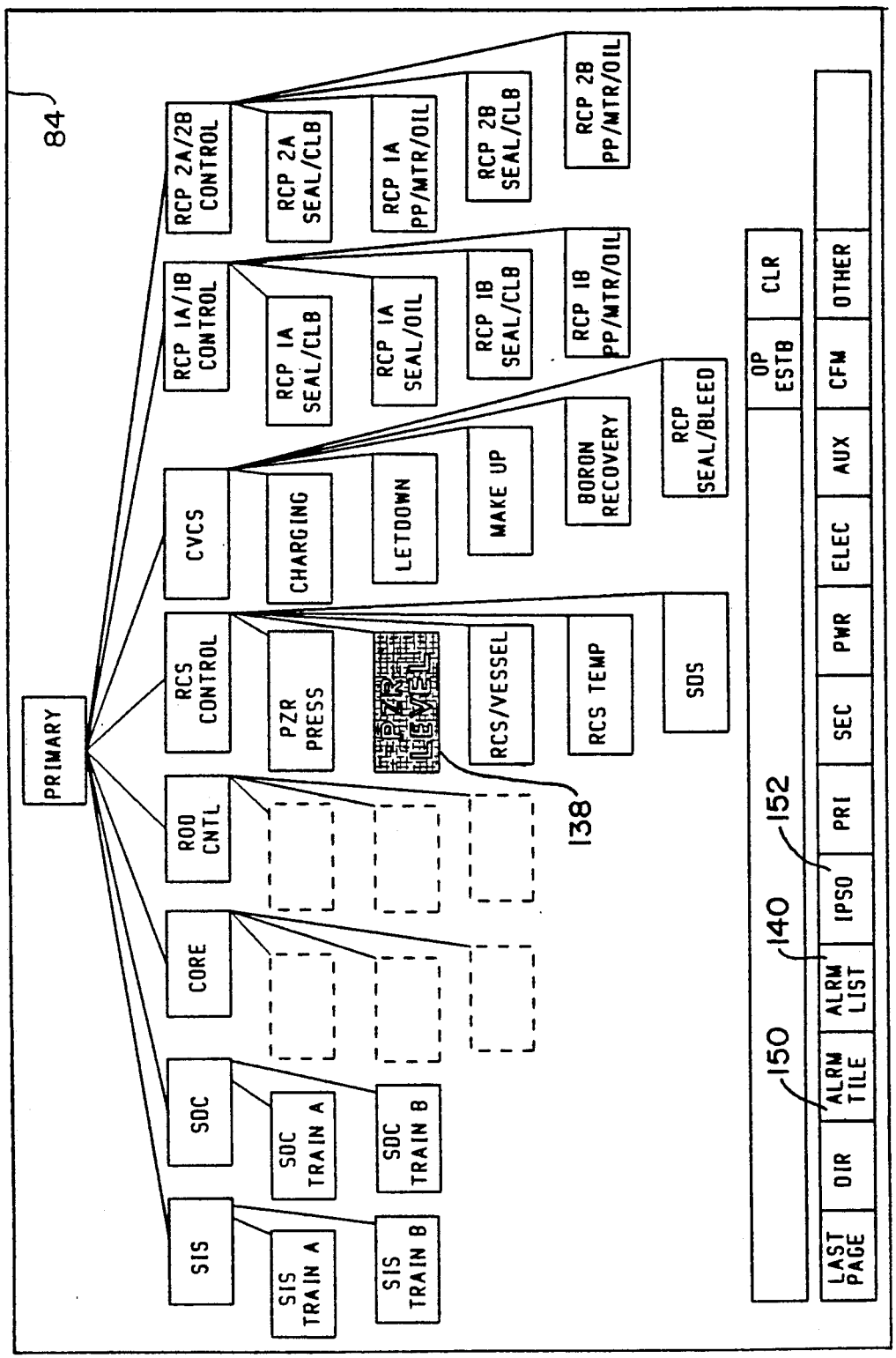
FIG. 12 is an illustration of the typical display page directory depicting display pages containing alarm information.

The operator can by selecting option 136, call up a level 2 display page directory containing a pictorial diagram of the level 3 display pages in a hierarchical format associated with a first level display page (see FIGS. 12 and 15). Each of the level 2 and 3 display pages represented on this diagram provide alarm notification if information on that display page is in an unacknowledged alarm state. This alarm information is most useful for determining where alarms exist within an area of the display page hierarchy. For example, the operator would be notified by the display page menu 130 (FIG. 1-0) that an unacknowledged alarm (s) exists in the auxiliary systems by grey alarm shape coding (return to normal) and slow flashing of alarm coding on the "PRT" menu option field. He can then access that directory/hierarchy to see what page(s) contains alarm information by touching the menu option "DIRECTORY" 136 followed by "PRT". When the Primary display directory comes up, (FIG. 12) the field(s) representing the display page(s) that contains the alarm condition(s) (such as PZR LEVEL 138) will be highlighted. The desired page that contains the alarm information (similar to FIG. 15) is accessed by touching the flashing field.

The descriptors of components and plant data on the process display pages of the CRT (FIG. 13) are alarm coded and flashed to provide indication of alarms and their acknowledgement status. A component's descriptor can provide this alarm information if a parameter associated with the component is in alarm. This is true even if the parameter in alarm is not represented on the display pages, e.g., low pump lube oil pressure is represented by alarm coding of the associated component's symbol. To view the exact information that is in alarm, the operator can access a lower level display page, or use the alarm system features that are described later.

5. Determining Alarm Conditions and Acknowledging Alarms

With reference again to FIG. 16, each category 1 and 2 alarm annunciator tile in the DIAS may notify the operator of more than one possible alarm condition. To quickly determine the actual alarm condition, a message window 114 is provided in the display area 78 on the panel. By depressing an unacknowledged alarming annunciator tile, such as 134 an English description 116 of the specific alarm condition is provided on the message window 114. The alarm tile 134 remains flashing until all alarm conditions associated with the alarm tile have been acknowledged. The English descriptors of additional alarms can be accessed by redepressing the alarm tile 134.

Figure 13:
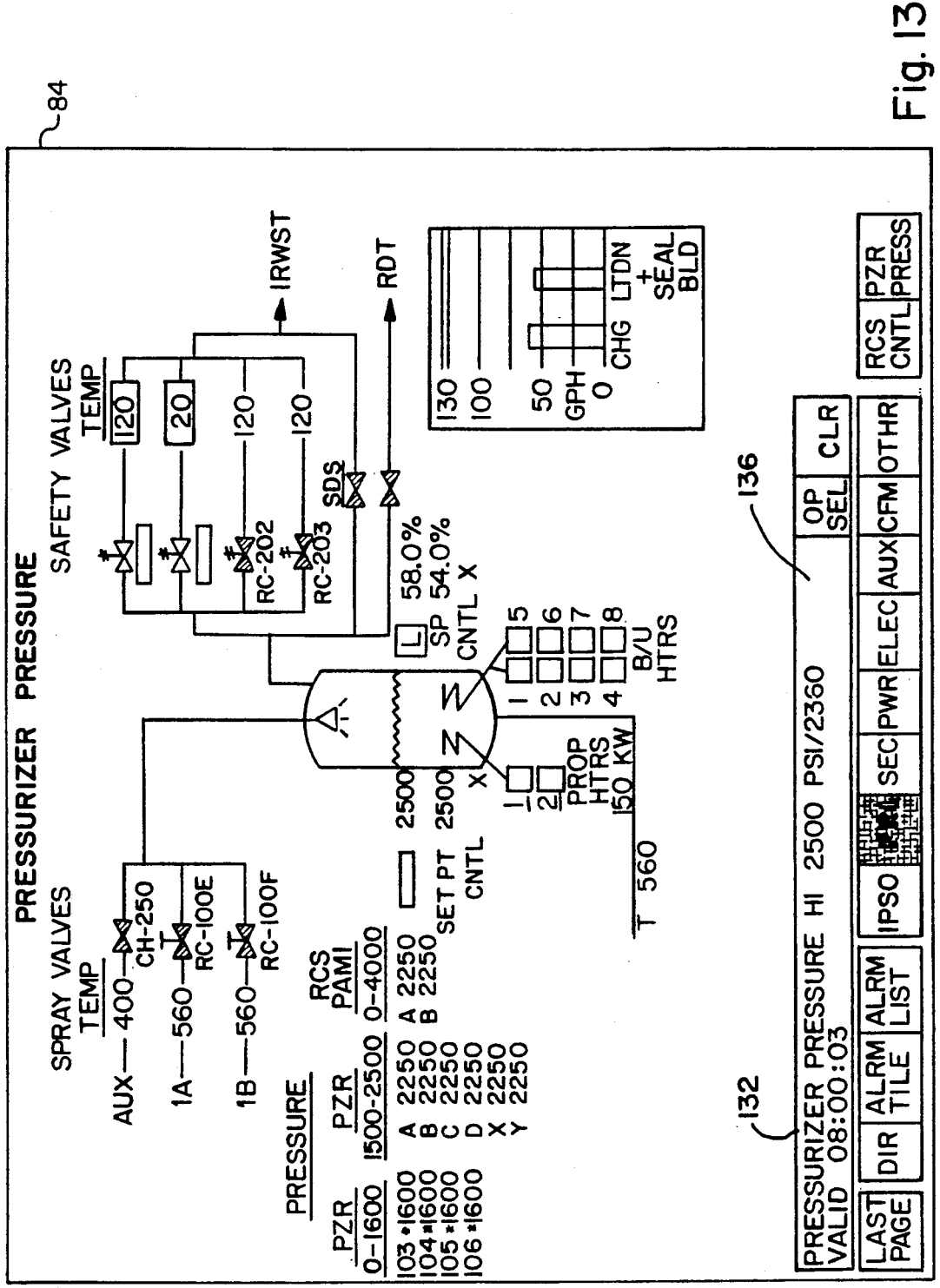
FIG. 13 is an illustration of the type of information provided on the CRT as alarm support after alarm acknowledgement.

At the same time that a message appears on the message window of a DIAS alarm display 78 an alarm message is presented on another field 132 at the bottom of the display page 84 on the panel CRT (see FIG. 13). The CRT alarm message contaings the following information: Time, Priority, Severity (e.g., Hi, Hi-Hi), Descriptor, Setpoint, and real time process value (coded as described to show the alarm priority and alarm condition). If additional unacknowledged alarms exist that are associated with the tile, the number of additional unacknowledged alarms is specified within a circle 136 at the right hand side of the message area (see FIG. 13).

Figure 22:
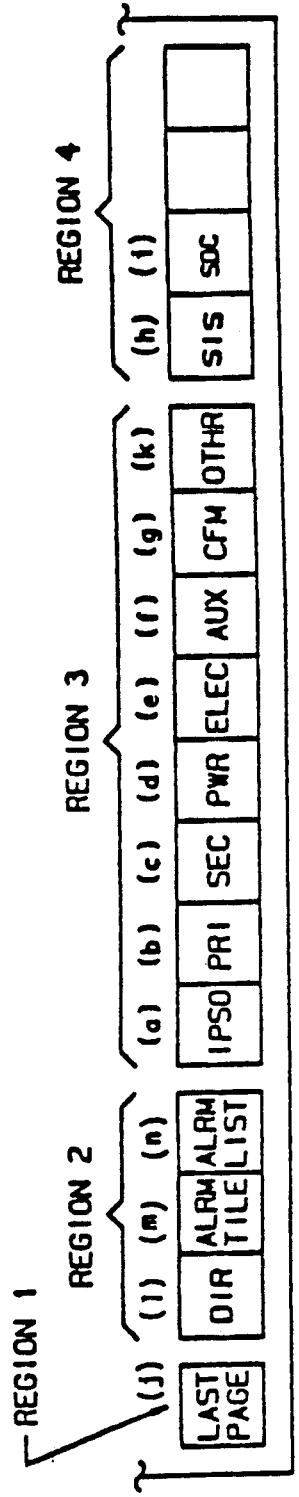
FIG. 22 is an illustration and explanation of the display page menu option regions on the CRT displays.

In addition to this alarm message, menu options/fields appear on the display page menu (Region 4) and provide direct access to the display pages that can be used to obtain supporting or diagnostic information of the alarm condition. The display regions are shown in FIG. 22. The alarm tiles that are in alarm on the DIAS display 78 of a given panel can be accessed and acknowledged on any CRT panel by procedure similar to accessing and acknowledging the alarms via the alarm tiles. By selecting the "Alarm Tiles" menu option followed by an alarming display page menu option, i.e., first level display page set (region 3), the alarm tiles that are in alarm, that are associated with the display page, are provided in region 4 of the display page menu. One (1) tile is depicted and is a touch target that provides access to other tiles. The operator acknowledges and reviews these CRT alarm tiles by touch and obtains alarm messages and supporting display page touch targets in the same format as described above. This means of responding to alarming alarm tiles is most useful for responding to alarms at workstations that are remote to the operator's location.

All alarm conditions associated with an annunciator tile are held in a buffer. The buffer containing alarm conditions is arranged in the following format:

| | |
|---|---|
| 1. | First-In Unacknowledged |
| 2. | . |
| . | . |
| N | Last-In Unacknowledged |
| N+1 | First-In Cleared/Return to Normal |
| N+2 | . |
| . | . |
| . | . |
| n | Last-In Cleared/Return to Normal |
| n+1 | Acknowledged Alarms |
| n+2 | . |
| . | . |

Depressing an alarm tile provides access to the alarm condition that is at the top of the buffer.

Acknowledging unacknowledged alarms moves these alarm conditions to the bottom of the buffer. Acknowledging cleared alarms drops them from the buffer. Previously acknowledged alarm(s) (n+1,n+2, . .) can be reviewed when there are no unacknowledged or cleared unacknowledged alarm conditions present. Upon reviewing these alarms, they move to the bottom of the buffer.

Alarm messages for priority 3 alarms and operator aids are only generated by the computer and only appear on the message line 132 of the CRT page (FIG. 3); there will be no English descriptor provided on the message window on the DIAS display 98. One annunciator tile is provided at each annunciator workstation for all priority 3 alarms and 1 alarm tile is provided on the workstation for operator aids that are associated with these workstation.

When an alarm condition changes priority, the following changes occur in the alarm handling system. When a higher priority alarm comes in on the same parameter, the previous alarm is automatically cleared (i.e., no operator acknowledgement necessary since he will need to acknowledge the higher priority condition) without a reset tone or slow flash rate. When an alarm condition improves to the point where the high priority alarm clears, the operator will need to acknowledge that the higher priority alarm has cleared; however, if the lower priority alarm still exists, it will turn on (upon operator acknowledgement of the higher priority cleared condition) and automatically go to the acknowledged state (i.e., no operator action required). The new lower priority alarm condition will be observed by the operator when reading the alarm message in response to clearing the highest priority alarm.

The invention provides a means of listing and categorizing alarms, and accessing supporting display pages. In this system, alarms are provided on alarm listing display pages accessible from the fields 138 of the DIAS display 78 and 140 of the CRT display 84 shown in FIGS. 15 and 13, respectively. The categories of alarms in this listing are as follows (see FIG. 14):

A) First Level Display Page Set.(Major Plant System/Function Groupings) 142
B) Control Room Workstation 144
C) Alarm tiles 146

A workstation's alarm tiles in alarm are listed by priority. Alarms associated with the alarm tiles are listed as they are contained in the alarm tile's alarm buffer.

These alarm categories provide alarm data consistent with operator's information needs in response to alarm conditions. When accessing the Categorized Alarm Listing, 78 mid page 84 (FIGS. 4 and 12) the operator can easily select the data in the category he wishes to see. Using the "Alarm List" menu option 14—(FIG. 4) followed by a display page feature that represents alarm condition(s), (FIG. 12) the operator can view the specific alarm conditions that he is interested in (FIG. 14).

Three examples of accessing alarm data in the categorized list from page 84 (FIG. 4) follow.

1) The operator selects the "Alarm List" menu option 140 (FIG. 4) followed by the "Elec." menu option 148 (FIG. 12). This accesses the categorized alarm listing of the type shown in FIG. 14 beginning with the electrical alarms.

2) If the operator wishes to view alarms associated with a specific alarm, e.g., RCDIA, he selects the following menu options from page 84 (FIGS. 4 and 12):
Alarm Tiles 150
"Primary" 152

The display page's menu changes to a representation of the alarm tiles that are in alarm and are associated with the Primary Systems (see FIG. 14). At this time, the operator can request one of two different types of information formats associated with the displayed alarm tiles:

A. Categorized Alarm List—The operator selects "Alarm List" followed by the tile, e.g., "RCPIA", menu option. The categorized alarm list is accessed with RCPIA alarms at the top of the page.

B. Alarm Messages—The operator can use the alarm tile menu options in the same method that the control panel alarm tiles are used. The selection of an alarm tile menu option provides the alarm message and a menu with display pages that can provide supporting information about the alarm condition.

Alarm information is also provided on all process display mimic diagrams which contain a component or parameter which is in an alarm condition. Color, and shape coding is used to indicate alarm conditions, as described earlier. Parameters in alarms that are associated with a component can cause the represented component's descriptor to be highlighted to indicate an alarm condition if the parameter is not visible on the display page, e.g., pump lube oil pressure may not be listed on a level two display page, so the pump's descriptor may be alarm coded. If the operator desires to see the exact alarm condition associated with a component, he would access the appropriate lower level display page. Alternatively, he could touch the "Alarm Tiles" menu option followed by touching the component's descriptor and respond to the alarm using alarm tile representations. This action also accesses menu options associated with display pages that provide more detail about the component.

The following means of alarm acknowledgement is provided with the invention.

1) Alarm acknowledgement via the annunciator tiles—Alarms can be acknowledged by depressing alarming/unacknowledged annunciator tiles or a CRT annunciator tile representation. This action changes the annunciator tile from a flashing condition to a solid condition when all alarm conditions associated with the tile have been acknowledged and silences any audible sound (described later) associated with the alarm condition. Alarm messages are viewed on the message window (when using the physical tile) and the workstation's CRT message line (see FIG. 16).

2) Alarm acknowledgement using alarm listing pages—Alarms can be acknowledged on the categorized listing by touching alarm tile touch targets associated with the alarm tile categories (see FIG. 14). Upon touching the alarm tile's representation, all alarms associated with that tile are acknowledged. This means of alarm acknowledgement may be the most useful for acknowledging multiple alarms remote to the operator's location.

Each of these methods of alarm acknowledgement unacknowledged alarm indicators in the other alarm formats.

When an alarm condition clears, the operator needs o be notified. Notification is accomplished by flashing the annunciator tiles and associated process display page information at a slow rate. Acknowledging or resetting the cleared alarm indications takes place in a mechanism similar to acknowledgement of new alarms, i.e., touching an alarm tile or CRT alarm representation/feature.

Distinct sounds/tones are provided in the control room to indicate the following alarm information:

1. Unacknowledged Priority 1 or 2 Alarms.
2. An Alarm Reminder Tone for Priority I or 2 Unacknowledged or Cleared Conditions.
3. Cleared Priority 1 Alarms, or Cleared Priority 2 Alarms.

An audible alarm, tone 1 or 3, is only present for 1 second and tone 2 will repeat periodically, once every minute, until all new or cleared alarms are acknowledged.

In situations where multiple unacknowledged alarms exist, the operator needs to direct his attention at the highest priority new alarm conditions. In this situation, all other unacknowledged alarms, i.e., new priority 2, 3 and all cleared alarm conditions, are added noise that distracts the operator from most important alarm conditions. In the control room, a "STOP FLASH" and "RESUME" button exists at the MCC, ACC and ASC. When the "STOP FLASH" button is depressed, the alarm system's behavior exhibits the following characteristics:

All new/unacknowledged priority 2, 3 and operator aid features change from a fast flash rate to a steady highlighted condition, i.e., tiles and CRT alarm representations.

Any cleared alarm conditions, i.e., slow flash rate, are not presented as alarm information.

Any new alarm condition or cleared alarm condition coming in after the "STOP FLASH" button has been activated, is normally displayed to the operator (i.e., flashing). However, the operator may redepress the alarm "STOP FLASH" button to suppress these conditions.

The alarm reminder tone informs the operator about any unacknowledged new or cleared alarm conditions that exist. To identify these conditions for acknowledgment, the operator selects a "resume" button which returns all unacknowledged and cleared conditions to their normal representational alarm status.

The alarm suppression button is backlit after selection to show that the alarm suppression feature is active.

So that the operator can provide quick, direct access to supporting information thereby enhancing the operator response to alarm conditions, a single operator action provides alarm acknowledgement, display of alarm parameters, and selection options for CRT display pages appropriate for the alarm condition.

The invention provides redundancy and diversity in alarm processing and display such that the operators have confidence in intelligent alarm processing techniques and such that plant safety and availability are not impacted by equipment failures. Priority 1 and 2 alarms are processed and displayed by two independent systems. Two-system redundancy is invisible to the operators through continuous cross-checking and integrated operator interfaces.

FIGS. 16-18 show a schematic alarm response using the tiles in accordance with the invention. The illustrated group of tiles is associated with the reactor coolant pump seal monitoring in the reactor cooling system panel shown in FIG. 3. The priority 2 seal/bleed system trouble alarm is illuminated to alert the operator, who then can read a more complete message in the message window, which indicates a high control bleed-off pressure. Such a message is provided for priority 1 and 2 alarms. The same message in more complete form is displayed on the panel CRT. The CRT also identifies menu options that indicate useful supporting display pages. Alternatively, the operator may directly access a listing of all the alarms in a particular group.

Thus, overview of the alarm conditions is provided with the tiles, and the detail is provided with the associated messages. A given alarm is rendered more or less important at a particular point in time, depending on the equipment status and the mode of operation of the NSSS. Alarm handling is reduced by validation of the parameter signals, and clearing automatically lower priority alarms when one of the higher priority alarms is actuated on the same condition.

IV. DATA PROCESSING SYSTEM

A. The CRT Display

The CRT shown 84 in the center of the panel in FIG. 3 is part of the data processing system which processes and displays all plant operational data. Thus, it is linked to all other instrumentation and control systems in the control room.

Figure 28:
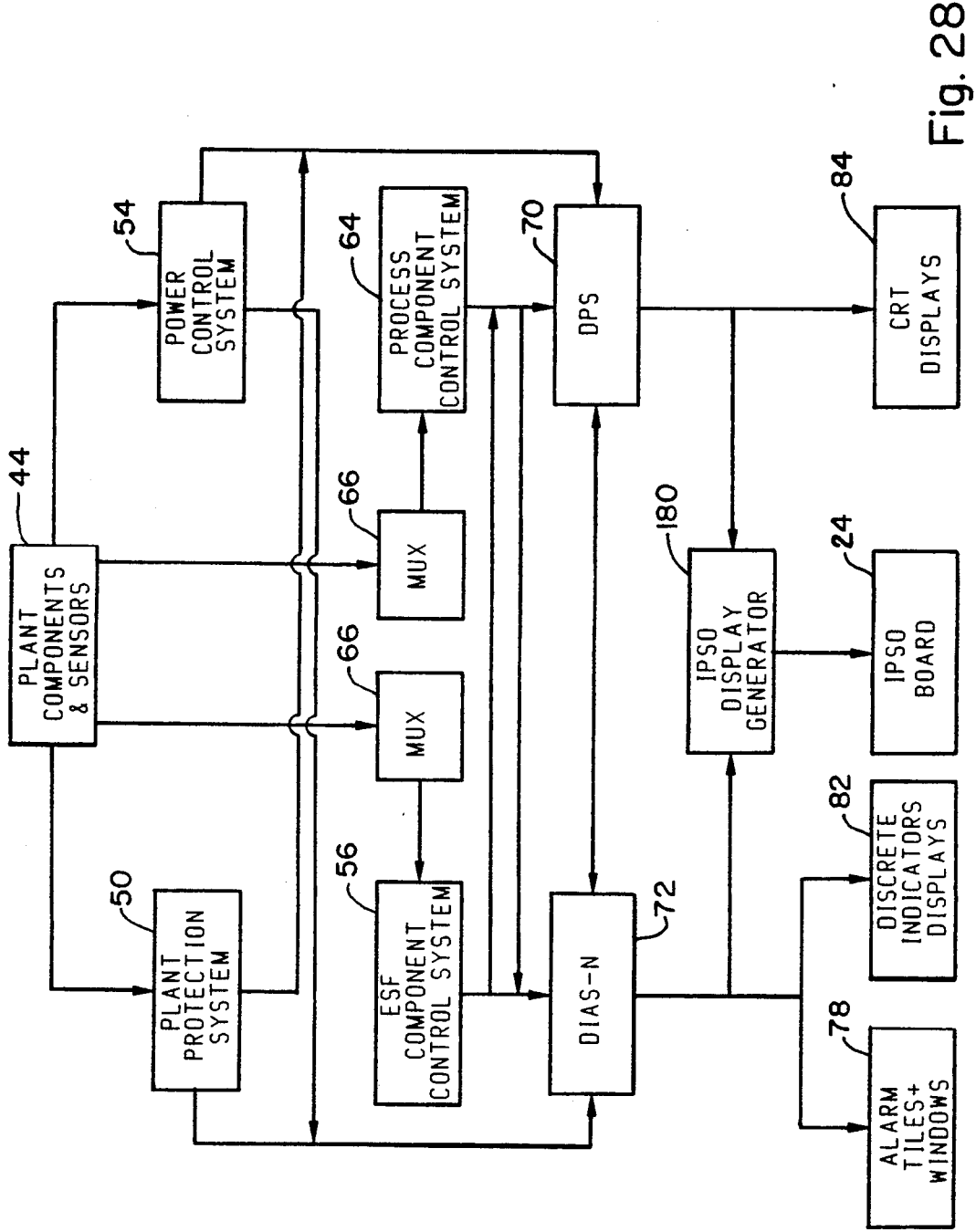
FIG. 28 is a block diagram related to FIG. 2, showing the relationships of the major systems constituting the control room complex of the present invention.
Figure 30:
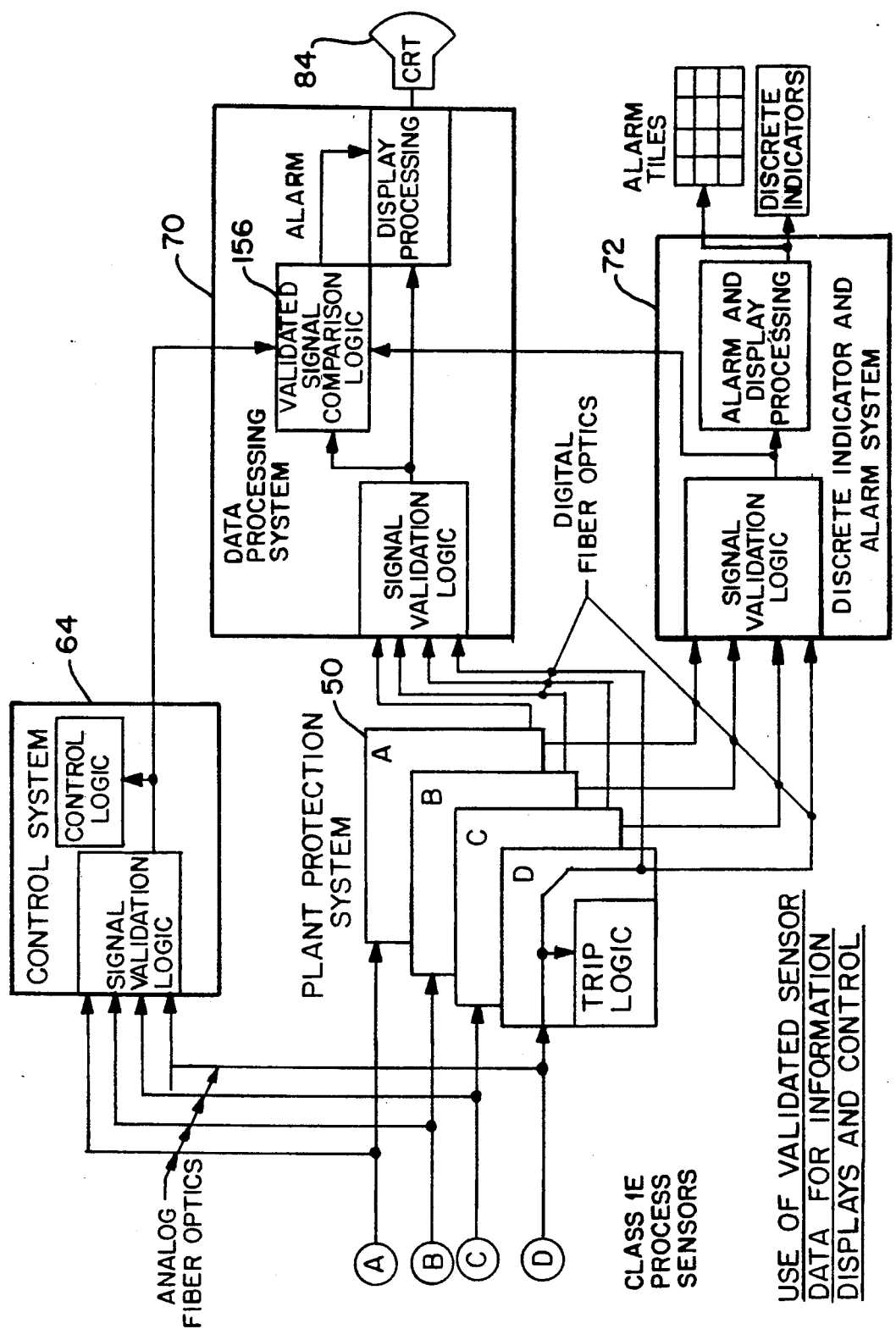
FIG. 30 is a schematic representation of the use of validated sensor data for monitoring and control in accordance with the invention.

FIGS. 2, 28 and 30 schematically show the relationship of the data processing system with the control system, plant protection system, and discrete indication and alarm system. The data processing system 70 receiving from the control system 64, the same sensor data that is used by the control system for executing the control logic. Likewise, it receives from the discrete indication and alarm system 72 the validated sensor data that is used by the discrete indication and alarm system for generating the discrete alarms and displays. The plant protection system 50 does not use internally validated data for its trip logic, and this "raw" signal is for each channel passed along to the data processing system 70 which performs its own signal validation logic 154 on the plant protection system signals, and passes on the internally validated signal to the validated signal comparison logic 156. In that functional area, the validated signals from the control system 64, the plant protection system 50 and the discrete indication and alarm system 72 are compared and displayed on the CRT 84. It should be appreciated that both the validated signal from the comparison logic 156 and the validated signal from the plant protection system are available for display on the CRT 84.

Thus, the CRT display within each panel includes signal validation and all CRTs in the plant are capable of accessing any information available to the other CRTs in the plant. Moreover, on any given CRT, the alarm tile images from any other panel may be generated and the alarms acknowledged. Detailed display indicator windows may be accessed as well. The CRTs have a substantially real time response, with at most a two-second delay.

The CRT display pages contain all the power plant information that is available to the operator, in a structured, hierarchic format. The CRT pages are very useful for information presentation because they allow graphical layouts of power plant processes in formats that are consistent with operator visualization. In addition, CRT formats can aid operational activities, where appropriate, by providing trends, categorized listing, messages, operational prompts, as well as alert the operator to abnormal processes.

The primary method the operator obtains information formats on the CRTs is through a touch screen interface which operates in a known manner. The touch screens are based on infrared beam technology. Horizontal and vertical beams exist in a bezel mounted around the face of each color monitor. When the beams are obstructed by the user, the coordinates are cross-referenced with the display page data base to determine the selected information.

Messages and Supporting Display page option touch targets can be accessed onto panel CRTs by touching other panel features, e.g., discrete indicators and alarm tiles. IPSO is available as a display page and forms the apex of the display page hierarchy (See FIGS. 10, 22 and 24). Three levels exist below IPSO, where each level of the hierarchy provides consistent information content to satisfy particular operational needs. The structure of the hierarchical format is based on assisting the operator in the performance of his tasks as well as providing quick and easy access to all information displayed via the CRTs. The display formats on the top level provide information for general monitoring activities, while the lowest level formats contain information that is most useful for supporting diagnostic activities.

Figure 20:
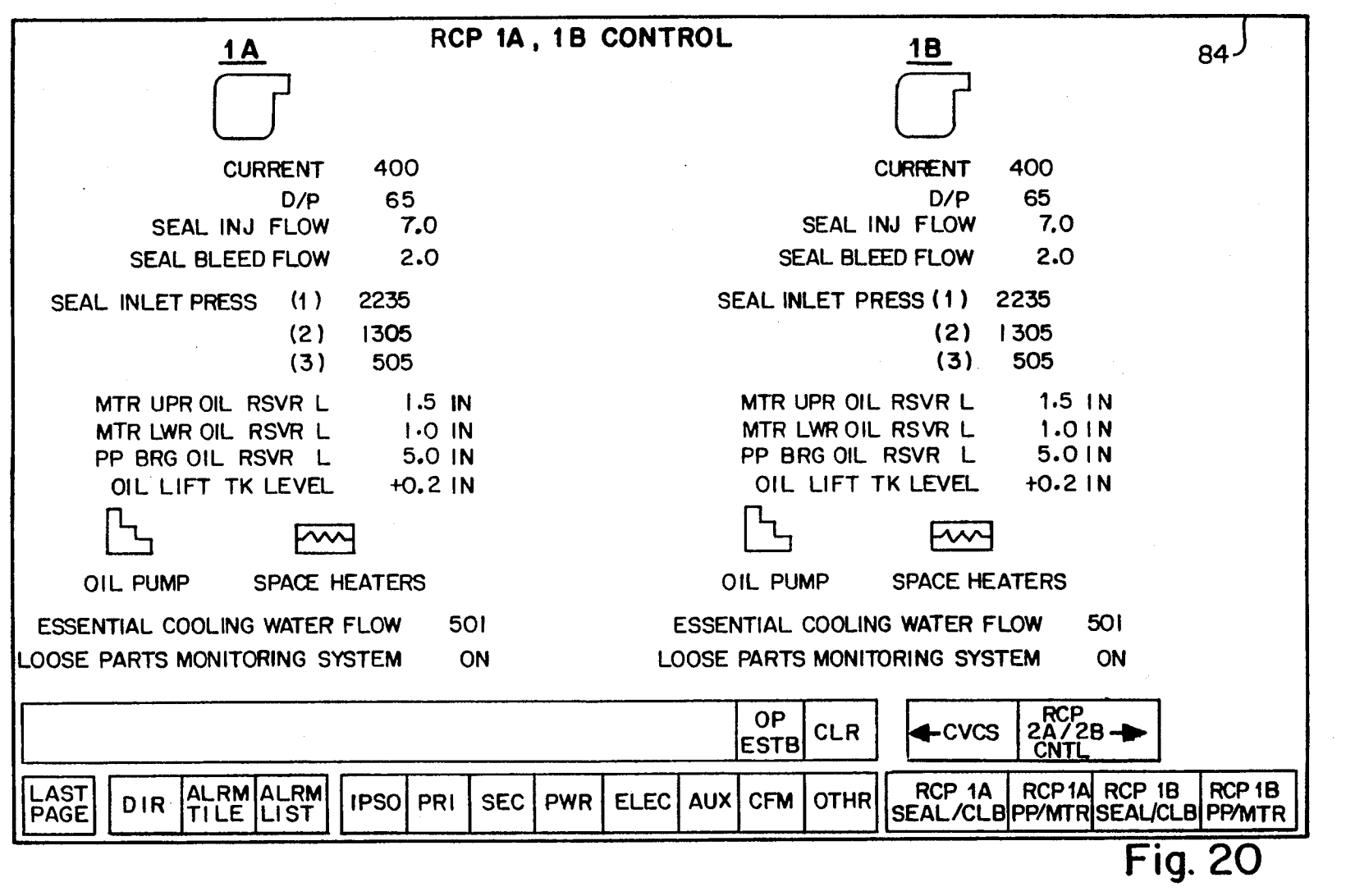

Level 1 display pages provide information that is most useful for general monitoring activities associated with a major plant process. These display pages inform the operator of major system performance and major equipment status and provide direction to lower level display pages for supportive or diagnostic information. The level 1 display pages are as follows:
1) Primary Systems (example, see FIG. 19)
2) Secondary Systems
3) Power Conversion
4) Electrical Systems
5) Auxiliary Systems
6) Critical Functions Level 2 display pages provide information that is most useful for controlling plant components and systems. These pages contain all information necessary to control the system's processes and functions. Parameters which must be observed during controlling tasks appear on the same display, even though they may be parts of other systems. Proposed operating procedures or guides for controlling components are utilized for determining which parameters to display. FIG. 20 is a sample display for Reactor Coolant Pump 1A and 1B Control. The operator would normally monitor the "Primary System" display page to assess RCS performance. If the operator wishes to operate or adjust RCP 1A or 1B, the operator would access the control display page. All information for Reactor Coolant Pump Control is on the control display to preclude unnecessary jumping between display pages.

Figure 21:
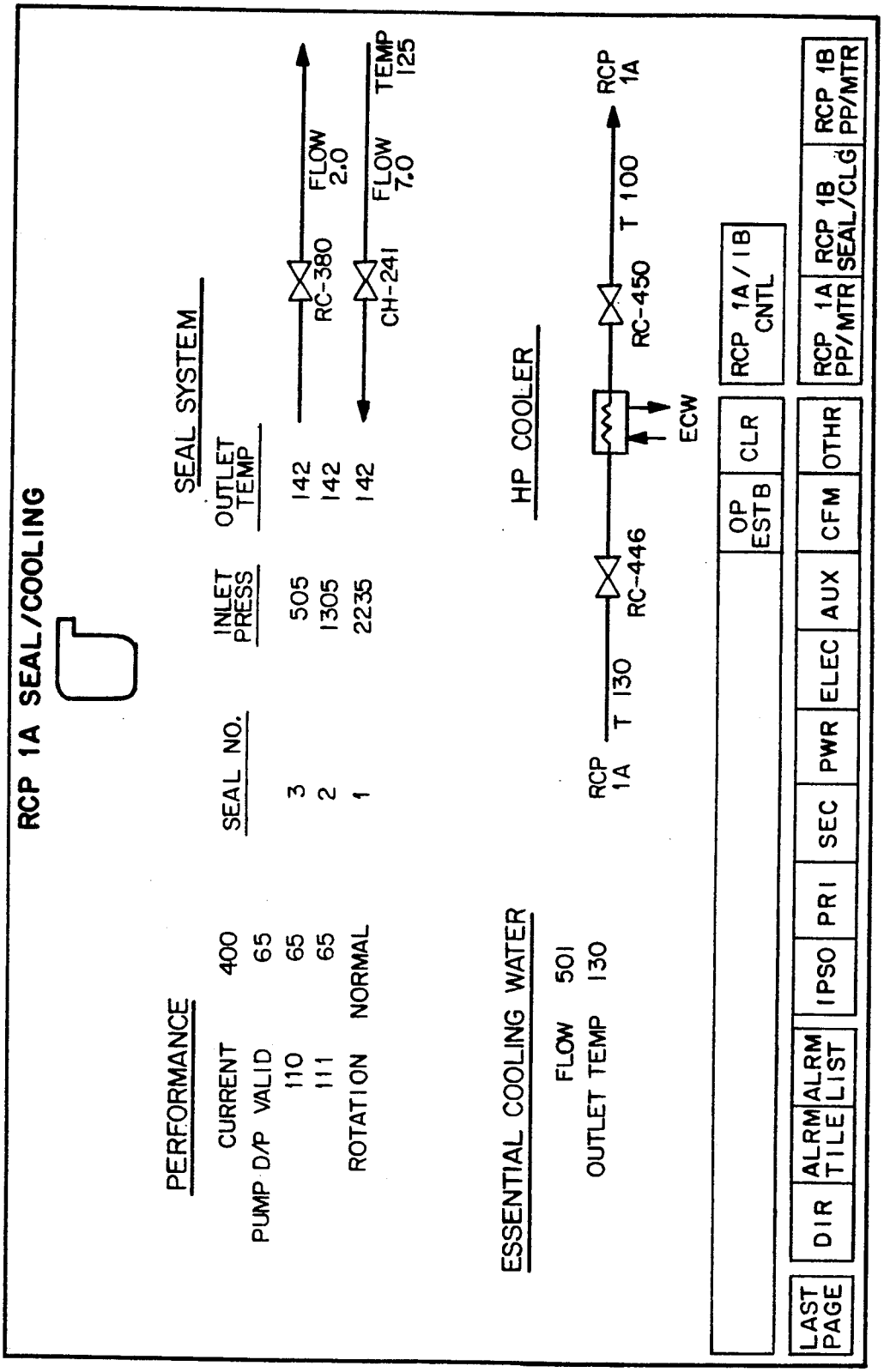
FIG. 21 is an illustration of a third level display page obtainable from the second level page shown in FIG. 20.

Level 3 display pages provide information that is most useful for diagnostic activities of the component and processes represented in level 2 display pages. Level 3 display pages provide data useful for instrument cross-channel comparisons, detailed information for diagnosing equipment or system malfunctions, and trending information useful for determining direction of system performance changes, degradation or improvement. FIG. 21 shows a diagnostic display of the Seal and Cooling section of RCPIA; the pump portion, the supporting oil system, and the motor section are presented on a separate display page due to display page information density limits.

Display page access is accomplished through the use of menus placed on the bottom of the display pages. Each display page contains one standard menu format that provides direct, i.e., single touch, access to all related display pages in the information hierarchy. The menu has fields (see FIG. 10) where display page title are listed. By selecting a field (a thru j), the specified display page is accessed. The menu option fields associated with a display page includes the following (see FIG. 22).

1) The next higher level (when applicable) display page in the hierarchy, item (c). This feature is more meaningful on a 3rd level display page since the next higher level page is a level 2 display page which is not normally on the menu.

2) Display pages of systems that are connected to or support the process of the presently displayed page (h,i).
3) All six first level display pages (b,c,d,e,f,g).
4) The IPSO display page (a).
5) The last page viewed on the monitor (j).

Figure 23:
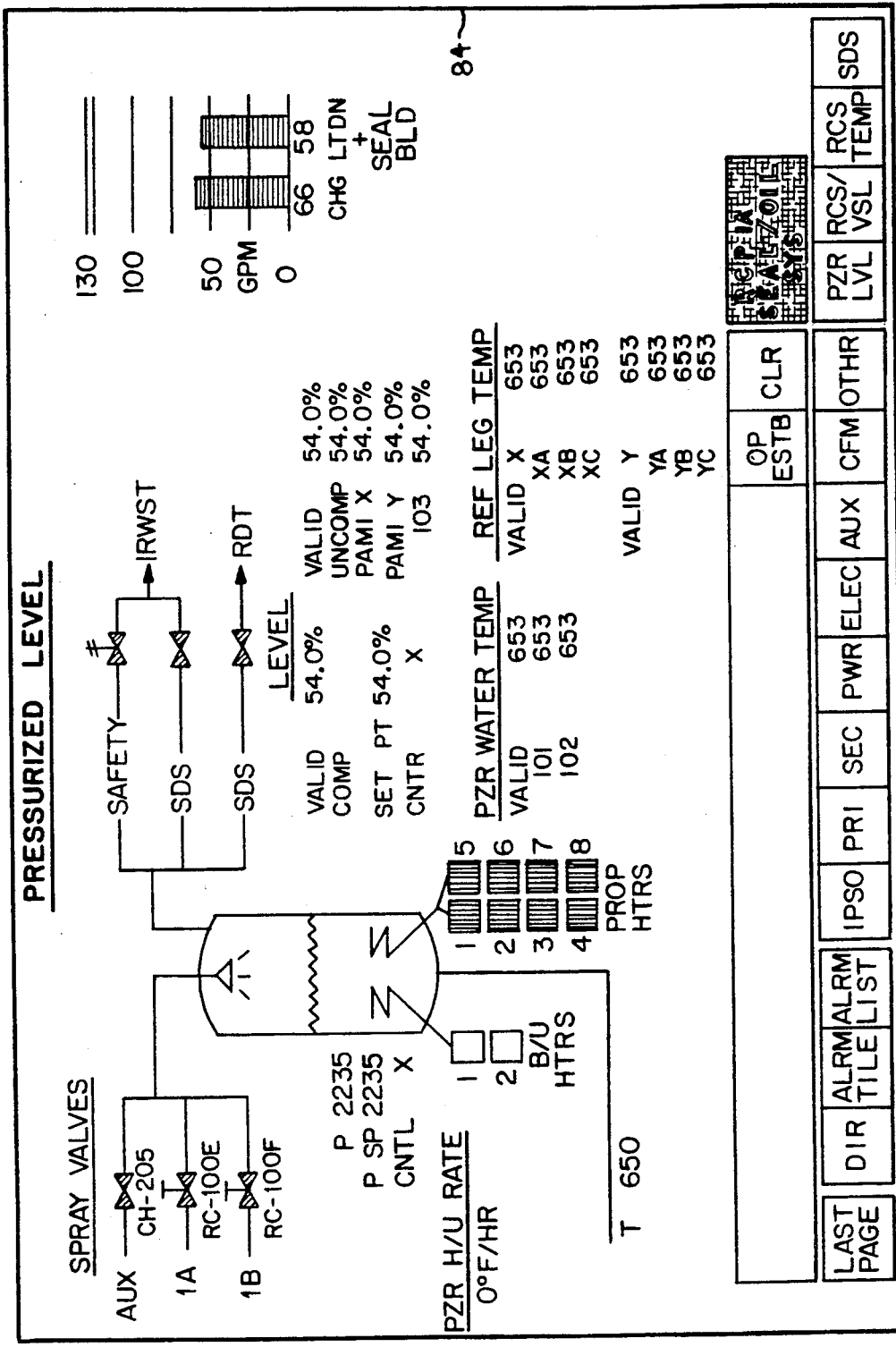
FIG. 23 is an illustration of a typical CRT display page depicting alarm tile representations.

To access a display page described by a menu option, the operator would select the menu option (a-k) by touching the desired menu option field on the monitor. The menu option is highlighted (using black letters on a white background) until the display page appears. Since the menu options provide direct access to a minimum set of display pages in the display page hierarchy, alternate means are available for quickly accessing other display pages. Three options are available to the operator:

(1) Display Page Access Using Alarm Tiles—This mechanism for display page access may be most useful for obtaining display pages associated with the workstation's process. By pressing a workstation alarm tile, from display 78, such as 80 (FIG. 15), region 4 of the workstation CRT's display page menu changes to a new menu with display page options, associated with the alarm tile's descriptor. For example, as shown in FIG. 23, an RCPIA alarm tile provides menu options associated with RCP 1A. The desired display page will then be a direct access menu option.

(2) Accessing CRT Information from the Discrete Indicators—Each discrete indicator 92 such as shown in FIG. 7, has a CRT access touch target 158. This button provides for access to supporting information for the process parameter that is presently displayed on the discrete indicator. By touching the CRT target on the discrete indicator, region 4 of the menu options on the workstation's CRT changes to menu options containing display pages with supporting and diagnostic information associated with the process parameter.

(3) Page Access Using a Display Page Directory—Any display page of the display page hierarchy can be accessed using the presently displayed menu. For example, if the operator is viewing the Feedwater System display page and wants to access the CVCS display page, the following sequence takes place (refer to FIGS. 22 and 4): The operator selects "by touch" the "DIRECTORY" menu option (option 1 in region 2 on FIG. 22) followed by the "PRIMARY" menu option (option b region 3 on FIG. 22). This accesses the primary section of the display page hierarchy from the display page library (see FIG. 4). Each display page within the primary section of the display page hierarchy is a touch target on this display page, and now the operator can select the CVCS display page. Any page in the display page hierarchy can be accessed using this feature. The "DIRECTORY" menu option is followed by the desired hierarchy associated with one of the six first level display pages, menu options b,c,d,e,f or g on FIG. 22.

In addition to the menu options described above, menu options exist for "LAST PAGE", "ALARM LIST", "ALARM TILES", "OTHER", and horizontal paging options ("Keys"). The "LAST PAGE" (option j on FIG. 22) provides direct access to the last page that was on the monitor. This is very useful to operators for comparison of information between two display pages, or retrieval of information that the operator was previously involved with.

The "ALARM LIST" (option n on FIG. 22) provides for quick access to the alarm listing display pages.

The "ALARM TILES" (option m on FIG. 22) provides for quick access to alarm tile representations of active alarm tiles in the area above Region 4(see FIG. 23) of the workstation's CRT menu. This allows an operator to access alarm information associated with specific tiles on any workstation's CRT. This method of alarm access is further described in Section 5 of this document.

The "OTHER" (option k on FIG. 22) provides access to display pages or information that does not fall into the categories of information described by the presently displayed menu options.

B. IPSO

Another part of the data processing system is the integrated process status overview (IPSO board) 24. Although the number of displays and alarms stimulating the operator at any one time can be considerably reduced using the panels having the discrete alarm, discrete display, and CRT displays described above, the number of stimuli is still relatively high and, particularly during emergency operations, may cause delay in the operator's understanding of the status and trends of the critical systems of the NSSS. A single display is needed that presents only the highest level concerns to the operator and helps guide the operator to the more detailed information as it is needed. Although some attempts have been made in the past to present a large board or display to the operator, such displays to date have not included a significant consolidation of information in the nature to be described below.

The IPSO board presents a high level overview of all high level concerns including overview of the plant state, critical safety and power functions, symbols representing key systems and processes, key plant data, and key alarms. IPSO information includes trends, deviations, numeric values of most representative critical function parameters, and the existence and system location of priority 1 alarms including availability and performance status for systems supporting the critical functions. This is otherwise known as success path monitoring. The IPSO board also can identify the existence and plant area location of other unacknowledged alarms. Thus, IPSO bridges the gap between an operator's tendency toward system thinking and a more desirable assessment of critical functions. This compensates for reduction in the dedicated displays to help operators maintain a field plant conditions. It also helps operators maintain an overview of plant performance while being involved in detailed diagnostic tasks. IPSO provides a common mental visualization of the plant process to facilitate better communication among all plant personnel.

Figure 25:
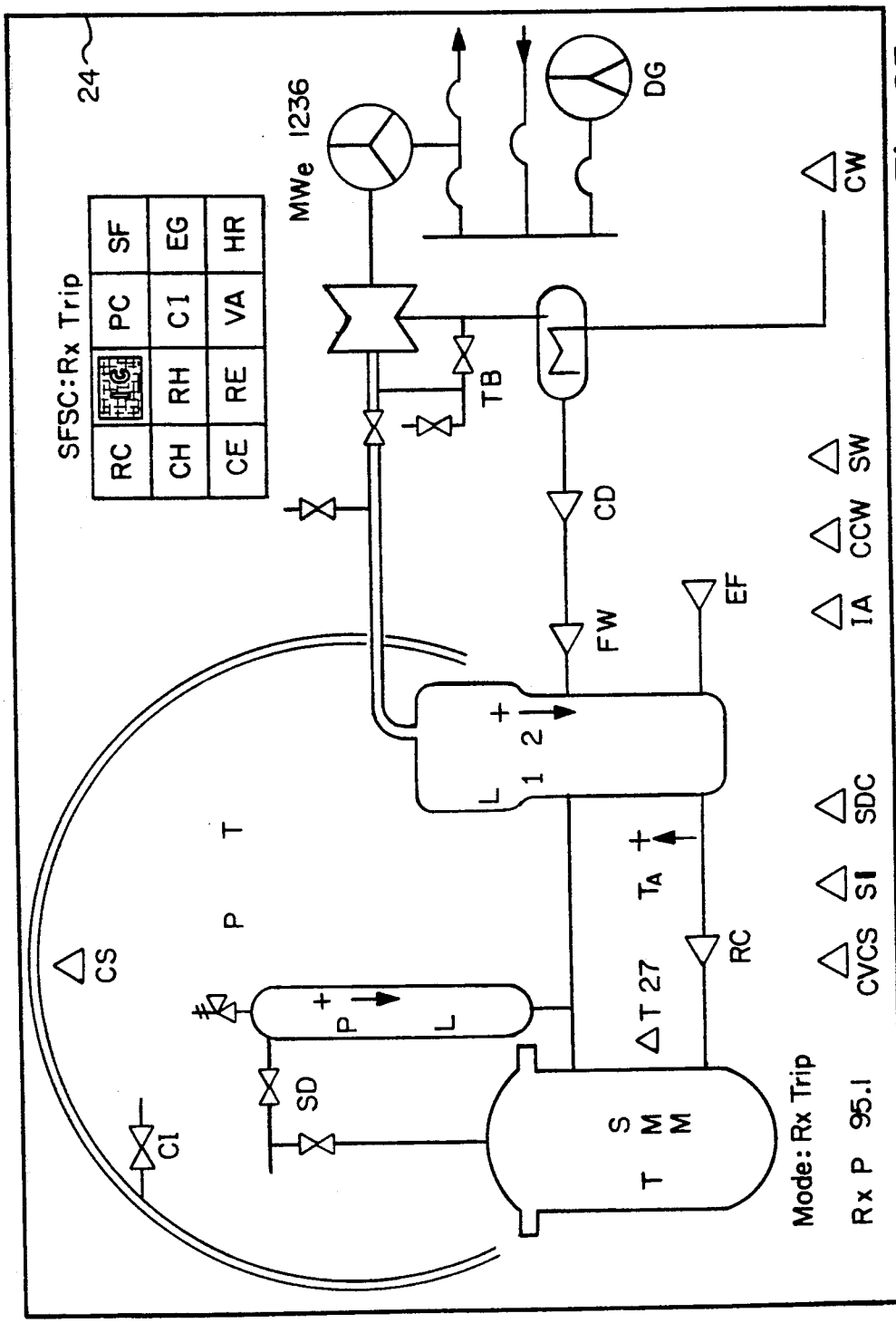
FIG. 25 is an illustration depicting the integrated process status overview.

In FIG. 25, the condition illustrated is a reactor trip. At the instance illustrated, the temperature rise in the reactor is 27° and the average temperature rise is higher than desired and rising as indicated by the arrow and "+". The pressurizer pressure is higher than desired, but it is falling. Likewise, the steam generator water level is higher than desired but falling.

Figure 24:
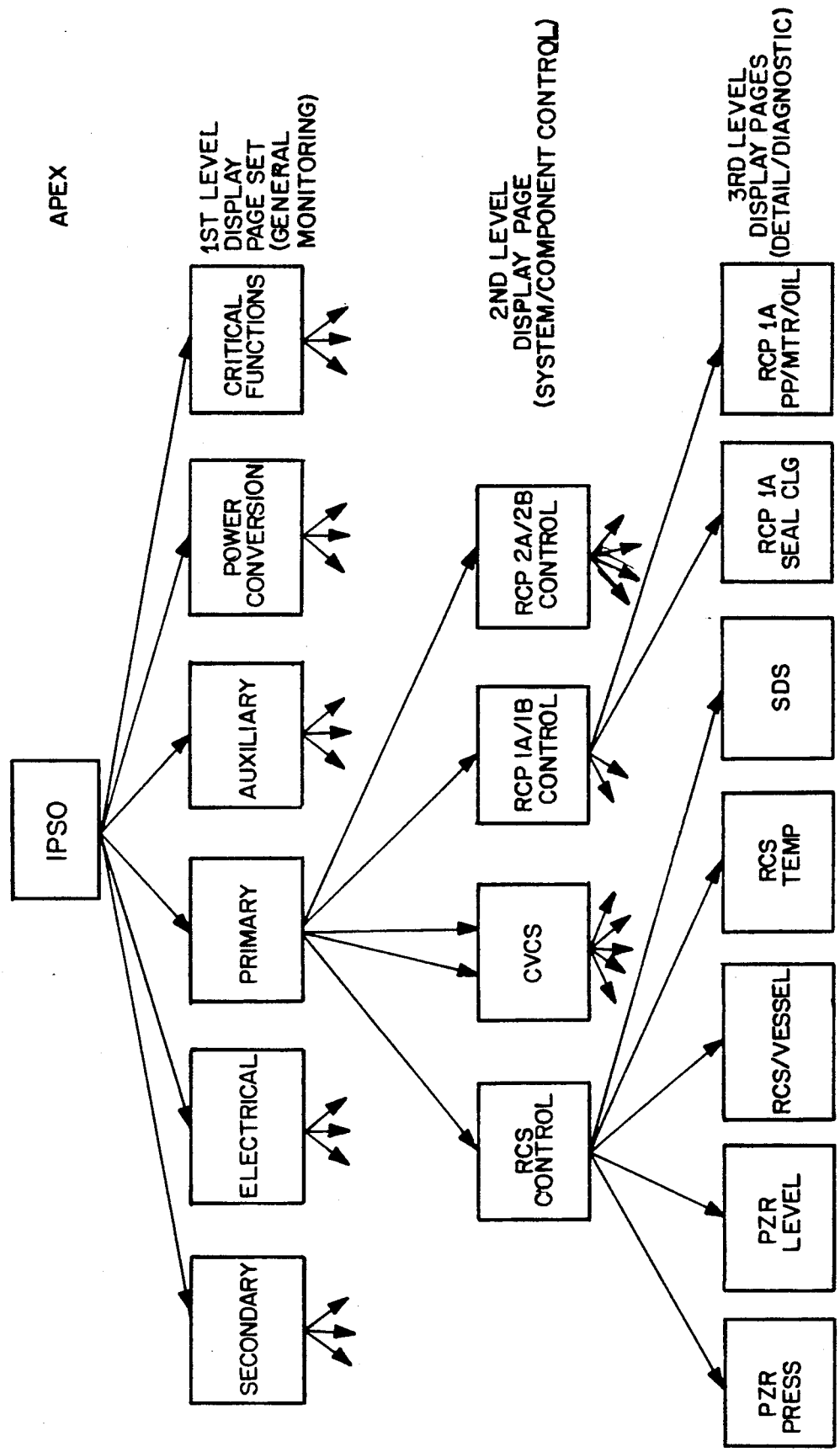
FIG. 24 is a diagram showing the relationships of the CRT display page hierarchy.

FIG. 24 shows a CRT display page hierarchy wherein the IPSO is at the apex, the first level display page set contains generic monitoring information for each of the secondary, electrical, primary, auxiliary, power conversion and critical function systems, the second level of display pages relates to system and/or component control, and the third level of display pages provides details and diagnostic information. IPSO is a continuous display visible from any control room workstation, the shift supervisor's office, and Technical Support Center. The IPSO is centrally located relative to the master control console. The IPSO also exists as a display page format that is accessible from any control room workstation CRT as well as remote facilities such as the Emergency Operations Facility.

The IPSO large panel format is 4.5 feet high by 6 feet wide. Its location, above and behind the MCC workstation, is approximately 40 feet from the shift supervisor's office (the furthest viewable point).

One of the beneficial aspects of IPSO is the use of IPSO information to support operator response to plant disturbances, particularly when a disturbance effects a number of plant functions. IPSO information supports the operator's ability to respond to challenges in plant power production as well as safety-related concerns.

IPSO supports the operator's ability to quickly assess the overall plant's process performance by providing information to allow a quick assessment of the plant's critical safety functions. The concept of monitoring plant power and safety functions allows a categorization of the power and safety-related plant processes into a manageable set of information that is representative of the various plant processes.

| Function | Critical To: Power | Safety |
|---|---|---|
| 1. Reactivity Control | X | X |
| 2. Core Heat Removal | X | X |
| 3. RCS Heat Removal | X | X |
| 4. RCS Inventory Control | X | X |
| 5. RCS Pressure Control | X | X |
| 6. Steam/Feed Conversion | X | |
| 7. Electric Generation | X | |
| 8. Heat Rejection | X | |
| 9. Containment Environment Control | | X |
| 10. Containment Isolation | | X |
| 11. Radiological Emissions Control | X | X |
| 12. Vital Auxiliaries | X | X |

Figure 10:
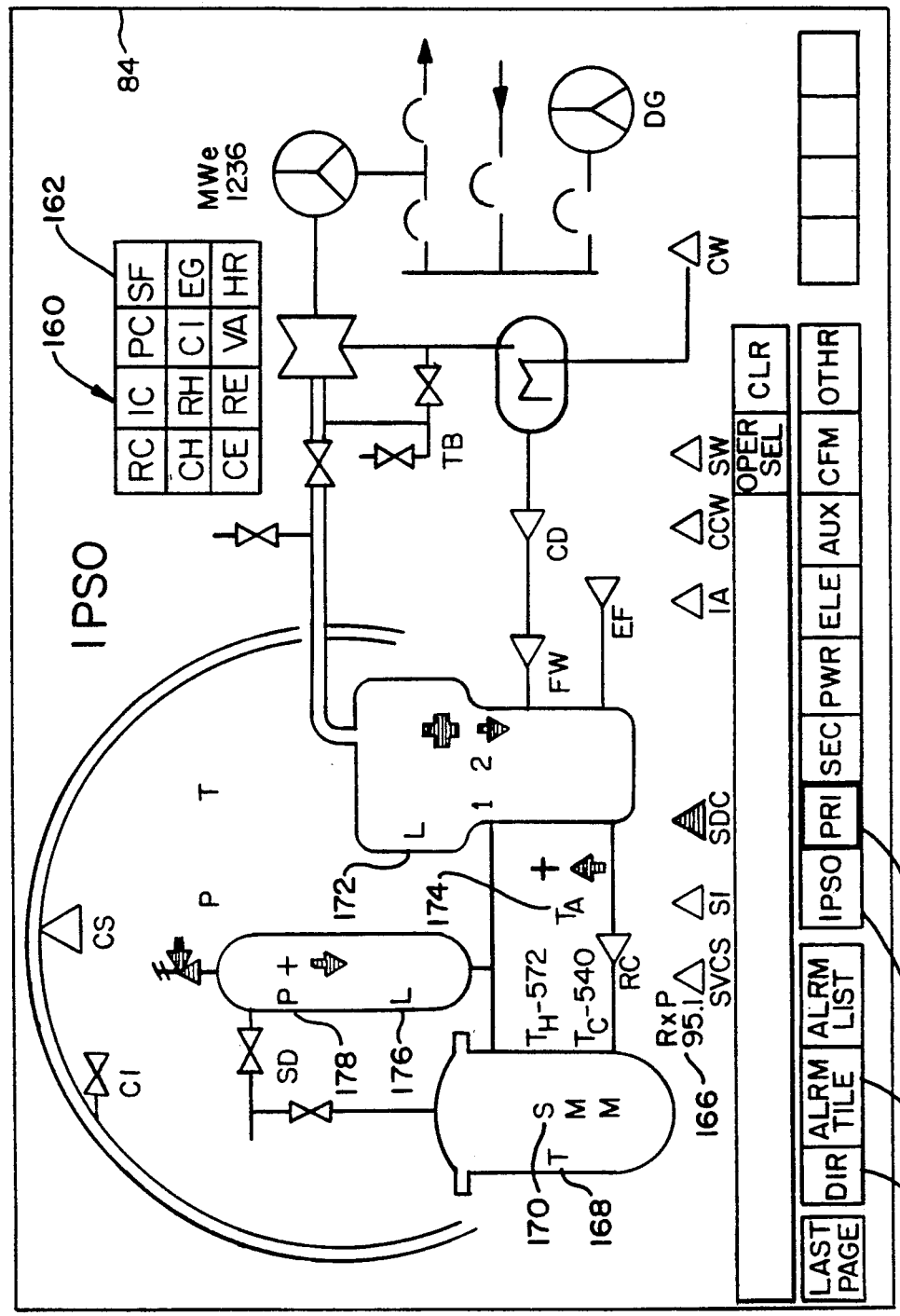
FIG. 10 is a typical display page depicting the alarm presentation on a first level display page menu option in accordance with the invention.
Figure 11:
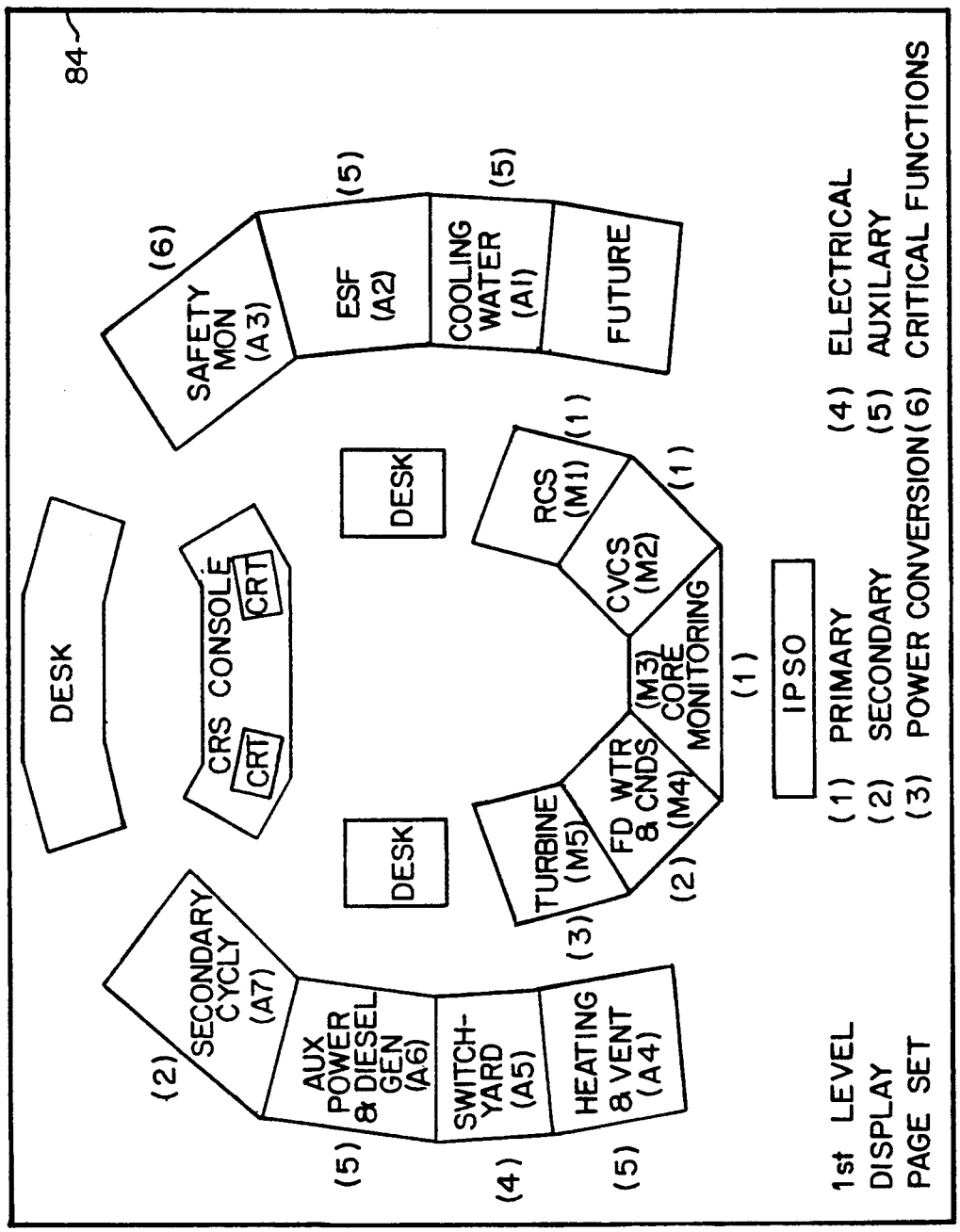
FIG. 11 is a diagrammatic summary of the work stations of the complex shown in FIG. 1, categorized by first level display page set.

A 3×4 alarm matrix block 160 containing a box 162 for each critical function exist in the upper right hand corner of IPSO (see FIG. 25 and the CRT display of IPSO in FIG. 10). The matrix provides a single location for the continuous display of critical function status. If a priority 1 alarm condition exists that relates to a critical function, the corresponding matrix box 164 will be highlighted in the priority 1 alarm presentation technique. Critical Function alarms are representative of one of the following priority 1 conditions:

Failure to satisfy the safety function status checks, (post-trip).

Poor performance of a success path/system that is being used to support a critical function.

An undesirable priority 1 deviation in a power production function (pre-trip).

Unavailability of a safety system (less than minimum availability as defined by Reg. Guide 1.47).

Figure 32:
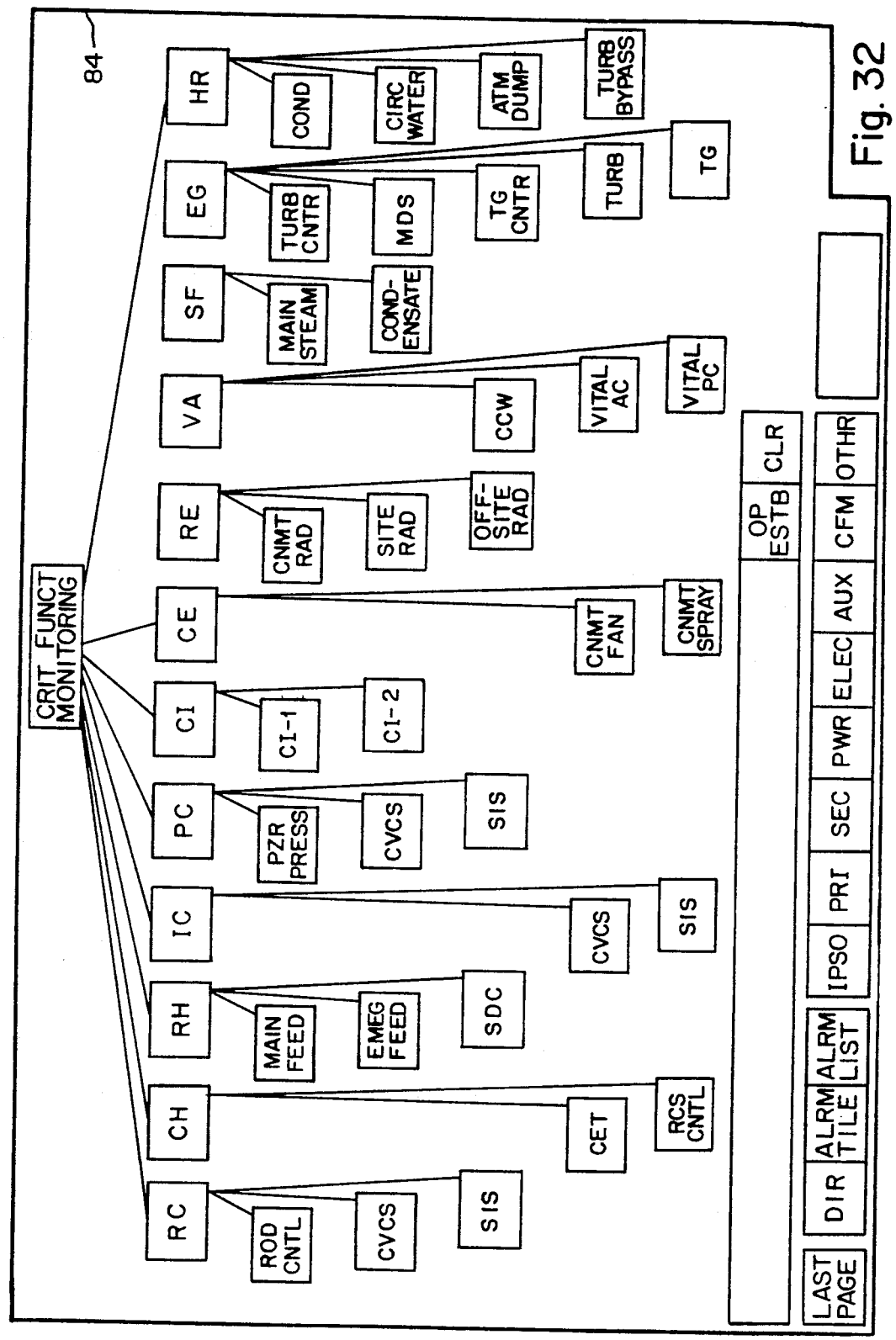
FIG. 32 is an illustration of a typical display page directory associated with the critical function monitoring available through the data processing system of the present invention.

The 3×4 matrix representation is an overview summary of the 1st level critical function display page information (FIG. 32). The operator obtains the details associated with critical function and Success path alarms in the Critical Function section of the display page.

Each critical function can be maintained by one or more plant systems. Information on IPSO is most representative of the ability of supporting systems to maintain the critical functions. For some critical functions, the overall status of the critical function can be assessed by a most representative controlled parameter(s). For these critical functions, the process parameter's relationship to the control setpoint(s) and indication of improving or degrading trends is represented on IPSO to the right of the parameter's descriptor.

Figure 26:
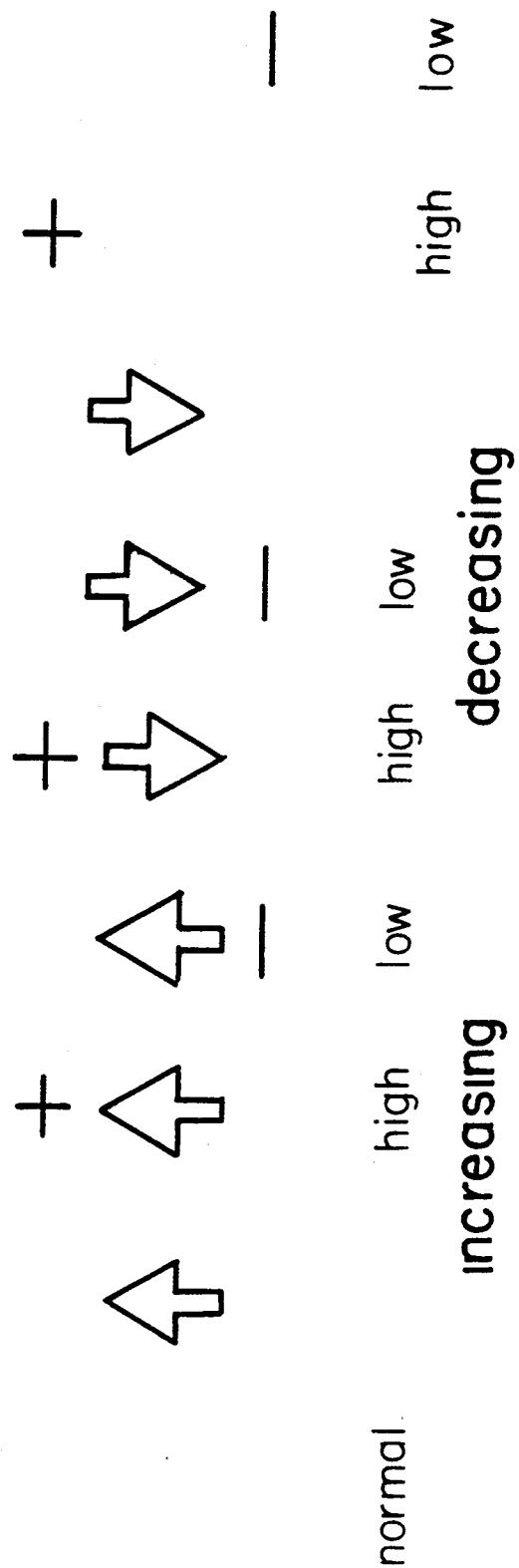
FIG. 26 is a diagrammatic description of the symbols used to convey trending information on the integrated process status overview.

An arrowhead as explained in FIG. 26 is used if the integral of the parameter's value is greater than an acceptable narrow band control value, indicating that the parameter is moving toward or away from the control setpoint. The arrowhead's direction, up or down, indicates the direction of change of the process parameter. If these parameters deviate beyond normal control bounds, a plus or minus sign is placed above or below the control setpoint representation.

The following bases were used for the selection of parameters or other indications that are used on IPSO to provide the monitoring of the overall status of the critical functions.

1. Reactivity Control

Reactor power is the only parameter displayed on the IPSO as a means of monitoring reactivity. Using Reactor Power, the operator can quickly determine if the rods have inserted. He can also use Reactor Power to determine the general rate and direction of reactivity change after shutdown. Reactor Power is displayed on IPSO with a digital representation 166 because a discrete value of this parameter is most meaningful to both operators and administrative personnel. The IPSO also provides an alarm representation on the reactor vessel if there is a priority 1 alarm condition associated with the Core Operating Limit Supervisory System.

2. Core Heat Removal

A representative Core Exit Temperature 168 and Subcooled Margin 170 are the parameters presented on IPSO for determining if Core Heat removal is adequate. If Core Exit Temperature is within limits, then the operator can be assured of maintaining fuel integrity. The Subcooling Margin is used because it gives the operator the temperature margin to bulk boiling.

Core Exit Temperature is represented on IPSO by using a dynamic representation (i.e., trending format), since there is a distinct upper bound that defines a limit to core exit temperature, and setpoints for representational characteristics can be easily defined.

Subcooled Margin is also represented on IPSO using a dynamic representation since there is a lower bound which defines an operational limit for maintaining subcooling.

3. RCS Heat Removal $T_H$, $T_C$, S/G Level 172, and $T_{ave}$ 174 are used on IPSO to provide the operator the ability to quickly assess the effectiveness of the RCS Heat Removal Function.

In order to remove heat from the Reactor Coolant, S/G Level must be sufficiently maintained so that the necessary heat transfer can take place from the RCS to the steam plant. A dynamic representation is used so the operator can observe degradations or improvements in deviant condition at a glance.

$T_H$ and $T_C$ are used on IPSO because they are needed by the operator to determine how much heat is being transferred from the reactor coolant to the secondary system. A digital value of these parameters is used since a quick comparison of these parameters is desired for observing the delta T. In addition, an indication of their actual values are used often and would be helpful to an operator in locations where the discrete indicator displaying $T_h$ and $T_c$ is not easily visible.

$T_{ave}$ is presented on IPSO using a dynamic representation to allow quick operator assessment of ether this controlled parameter is within acceptable operating bounds.

4. RCS Inventory Control

Pressurizer Level 176 is presented on the IPSO using a dynamic representational indication to allow the operator to quickly access if the RCS has the proper quantity of coolant and observe deviations in level indicative of improving or degrading conditions.

5. RCS Pressure Control

Pressurizer Pressure 178 and Subcooled Margin is used as the indications on IPSO to determine the RCS Pressure Control.

A dynamic representation is used on IPSO to notify the operator of changing pressure conditions that may indicate RCS depressurization or over pressurization.

A dynamic representation is used on IPSO for saturation margin. A saturation condition in the RCS can adversely affect the ability to control pressure by the pressurizer. Also, if pressure is dropping, the subcooled margin monitor representation on IPSO depicts a decrease in the margin to saturation.

6. Steam/Feed Conversion

The processes associated with Steam/Feed Conversion can be quickly assessed by providing the following information on IPSO:
  (a) Feedwater and Condensate System Status Information (i.e., operational status, alarm status)
  (b) Steam Generator Levels, Dynamic Representation
  (c) Steam Generator Safety Valve Status
  (d) Atmospheric Dump Valve Status
  (e) Main Steam Isolation Valve Status
  (f) Turbine Bypass System Status

7. Electric Generation

The processes associated with Electric Generation can be quickly assessed by providing the following information on IPSO:
  (a) Plant net electric output, digital value.
  (b) Alarm information for deviations in important processes associated with the main turbine and turbine generator.
  (c) Power distribution operational and alarm status to the plant busses and site grid.

8. Heat Rejection

The processes associated with heat rejection can be quickly assessed by providing the following information on IPSO:
  (a) Circulation water system status.
  (b) Alarm information for critical deviations in condenser pressure conditions.

9. Containment Environment Control

Containment Pressure and Containment Temperature are the parameters which are used on the IPSO to monitor the control of the Containment Environment. These are presented on IPSO using a dynamic representation to allow assessment of trending and relative values. The Containment Pressure variable is used on the IPSO to warn the operator about an adverse overpressure situation which could be the result of a break in the Reactor Coolant System. The Containment Temperature also helps indicate a possible break in the Reactor Coolant System; it also can indicate a combustion in the Containment Building.

10. Containment Isolation

The Containment Isolation Safety function is monitored on the IPSO with a Containment Isolation system symbol representation. This symbol will be driven by an algorithm which presents the effectiveness of the following containment isolation situations when the associated conditions warrant containment isolation:
Containment Isolation Actuation
Safety Injection Actuation
Main Steam Isolation
Containment Purge Isolation

11. Radiological Emissions Control

Radiation symbols exist on IPSO which presents notification of high radioactivity levels such as inside containment, and (2) radiation associated with radioactivity release paths to the environment. These symbols will only be presented on IPSO when high radiation levels exist. These indications are presented in the alarm color in a location relative to the sensor in any of the following situations occurs:
High Containment Airborne Radiation
High Activity Associated, with Any Release Path
High Coolant Activity

12. Vital Auxiliaries

Vital Auxiliaries are monitored on IPSO by providing the following information:
(a) Diesel Generator Status
(b) Status of Power Distribution within the Power Plant
(c) Instrument Air System Status
(d) Service Water System Status
(e) Component Cooling Water System Status The systems represented on IPSO are the transport path systems and systems that are required to support the major heat transport process, either power or safety related. These systems include systems that require availability monitoring per Reg. Guide 1.47, and all major success paths that support the plant Critical Functions.

The following systems have dynamic representations on IPSO:
CCW—Component Cooling Water
CD—Condensate
CI—Containment Isolation
CS—Containment Spray
CW—Circulating Water
EF—Emergency Feedwater
FW—Feedwater
IA—Instrument Air
SDC—Shutdown Cooling
RCS—Reactor Coolant
SI—Safety Injection
SW—Service Water
TB—Turbine Bypass System Information presented on IPSO includes systems operational status, change in operational status (i.e., active to inactive, or inactive to active) and the existence of a priority one alarm(s) associated with the system. Alarm information on systems can also help inform an operator about success path related Critical Function alarms.

Priority 1 alarm information is also presented on IPSO by alarm coding the descriptors of the representative features on IPSO as described above.

V. INTEGRATION OF CONTROL ROOM

Figure 27:
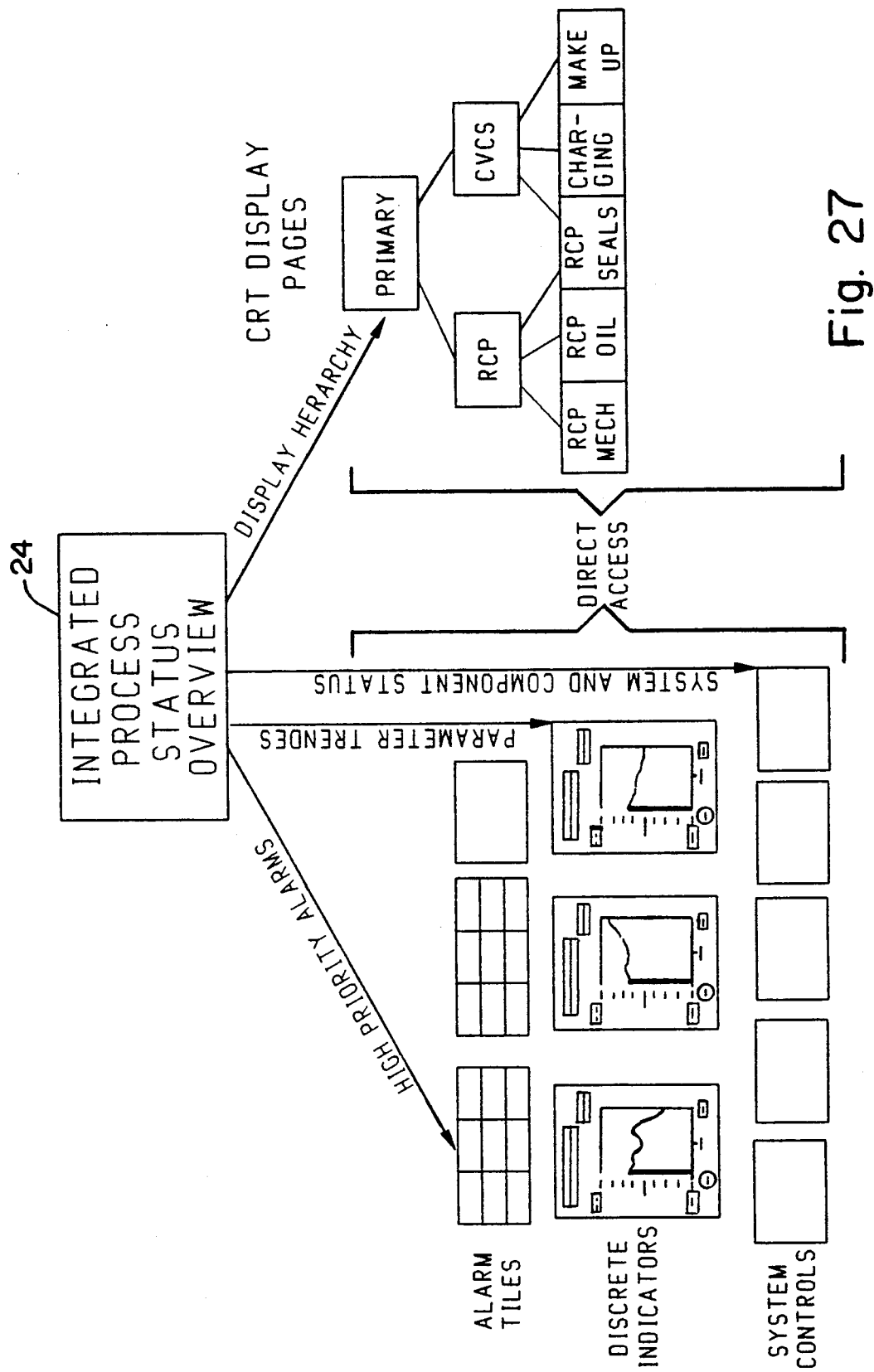
FIG. 27 is a schematic representation of the integrated information presentation available with the present invention.

FIG. 27 presents an overview of the integrated information presentation available to the operator in accordance with the invention. From the integrated process status overview or board, the operator may observe the high priority alarms. If the operator is concerned with parameter trends, he may view the discrete indicators. If he is interested in the system and component status, he may view the settings on the system controls. Thus, the IPSO information is displayed either on the board or at the panel CRT, and the other information from the operator's panel or any other panel, is available to the operator on his CRT. From the IPSO overview, the operator may navigate through the CRT or DIAS display pages. Moreover, the operator has direct access to either of these types of information from any of the control panels and when a system control is adjusted or set, the results are incorporated into the other alarm and display generators in the other panels.

As shown in FIGS. 2 and 28-31, in general overview, the integration of the system means that each panel including the main console, the safety, console, and the auxiliary console, includes a CRT 84 which is driven by the data processing system 70. The data processing system utilizes the plant main computer and, although being more powerful, it is not as reliable as the DIAS 72 computers (which may be distributed microprocessors-based or mini-computer based). Also, it is slower because it is menu driven and performs many more computations. It is used primarily for conveying the most important information to the operator and thus important alarm tiles can be viewed on each CRT and acknowledged from any CRT. Any information available on one CRT is available at every other CRT. The indicator and alarm system 72 for a given panel is related to the controls, but the discrete (i e., quick and accurate) aspects of the alarms and indicator displays 78, 82, and controls of that panel are not available at any other panel.

Basically, information is categorized in three ways. Category 1 information must be continuously displayed at all times and this is accomplished in DIAS 72. Category 2 information need not be continuously available, but it must nevertheless be available periodically and this is also the responsibility of DIAS 72. Category 3 information is not needed rapidly and is informational only, and that is provided by the DPS 70. In the event of the failure of DPS, some essential information is provided by DIAS. The DPS and DIAS are connected to the IPSO board by a display generator 180. From the IPSO, the operator can obtain detailed information either by going to the panel of concern, or paging through the CRT displays.

It should be appreciated that DIAS and DPS do not necessarily receive inputs for the same parameters, but, to the extent they do receive information from common parameters, the sensors for these parameters are the same. Moreover, the validation algorithms used in DIAS and DPS are the same. Furthermore, the algorithms used for the discrete alarm tiles and the discrete indicators include as part of the computation of the "representative" value, a comparison of the DIAS and DPS validated values.

Figure 29:
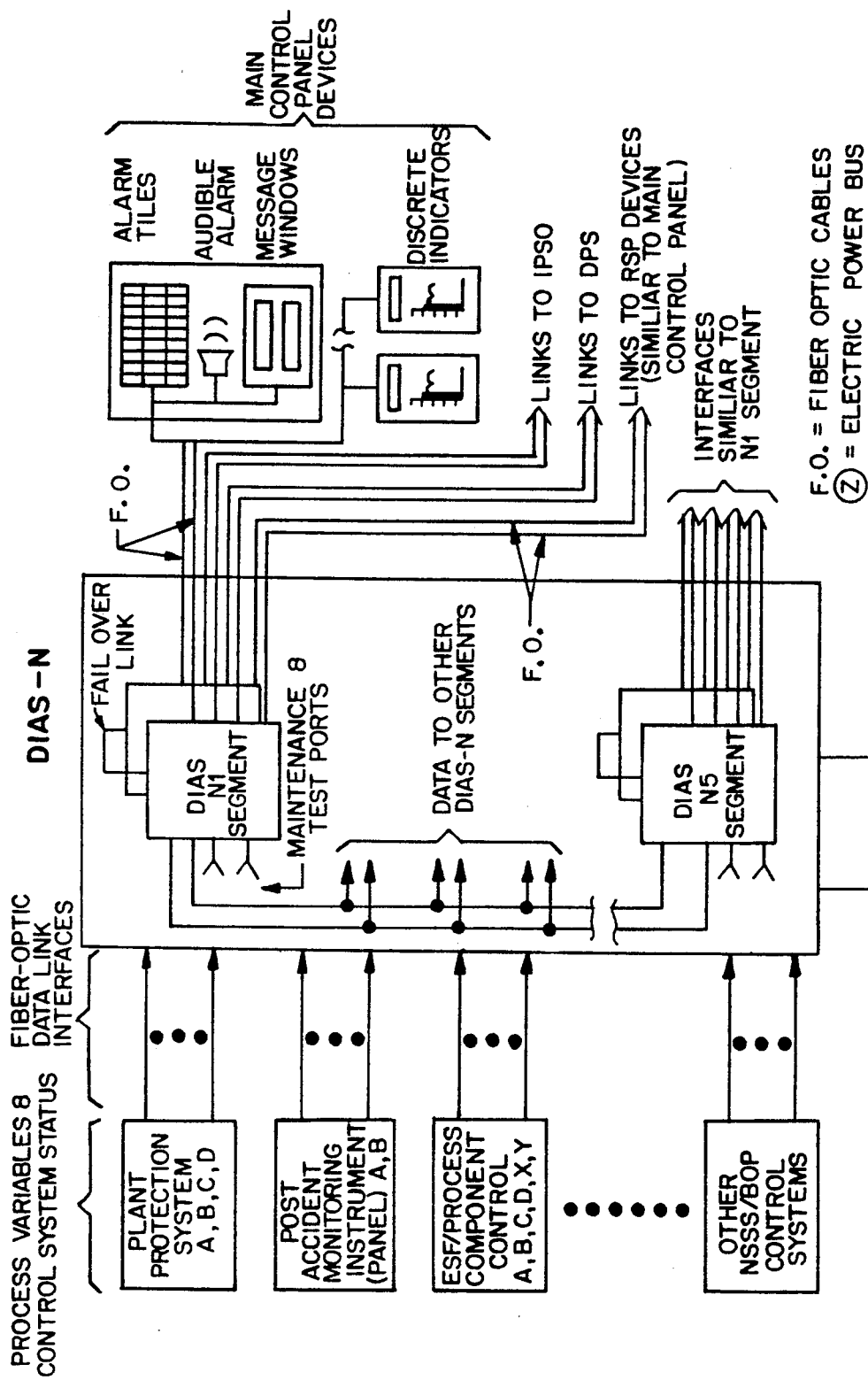
FIG. 29 is a block diagram showing the inputs and outputs associated with the discrete indicator and alarm system portion of the present invention.

FIG. 29 is a block diagram representing the discrete indicator and alarm system in relation to other parts of the control room signal processing. The DIAS system preferably is segmented so that, for example, all of the required discrete indicator and discrete alarm information for a given panel N is processed in only one segment. Each segment, however, includes a redundant processor. The information and processing in DIAS 1 is for category 1 and 2 information which is not normally displayed directly on IPSO. IPSO normally receives its input from the DPS. However, in the event of a failure of DPS, certain of the DIAS information is then sent to the IPSO display generator for presentation on the IPSO board.

It should also be appreciated that both DIAS and the DPS utilize sensor output from all sensors in the plant for measuring a given parameter, but that the number of sensors in the plant for a given parameter may differ from parameter to parameter. For example, the pressurizer pressure is obtained from 12 sensors, whereas another parameter, for example, from the balance of plant, may only be measured by two or three sensors. Some systems, such as the plant protection system, do not employ validation because they must perform their function as quickly as possible and employ, for example, a 2 out of 4 actuation logic from 4 independent channels. In the event the validation for a given parameter differs as determined within two or more systems, an alarm or other cue will be provided to the operator through the CRT.

One of the significant advantages of the present invention is that the DPS need not be nuclear qualified, yet it can be confidently used because it obtains parameter values from the same sensors as the nuclear qualified DIAS. These are validated in the same manner and a comparison is made between the validated DPS parameters and the validated DIAS parameters, before the DPS information is displayed on the CRTs or the IPSO.

The nuclear qualification of the alarm tiles and windows, and the discrete indicator displays in the DIAS are preferably implemented using a 512×256 electroluminescent display panel, power conversion circuitry, and graphics drawing controller with VT text terminal emulation, such as the M3 electroluminescent display module available from the Digital Electronics Corporation, Hayward, Calif. The control function of each panel is preferably implemented using discrete, distributed programmable controllers of the type available under the trademark "MODICON 984" from the AEG Modicon Corporation, North Andover, Mass., U.S.A. Thus, the computational basis of the DIAS is with either distributed, discrete programmable microprocessors or mini computers, whereas the computational basis of the DPS is a dedicated main frame computer.

Figure 31A:
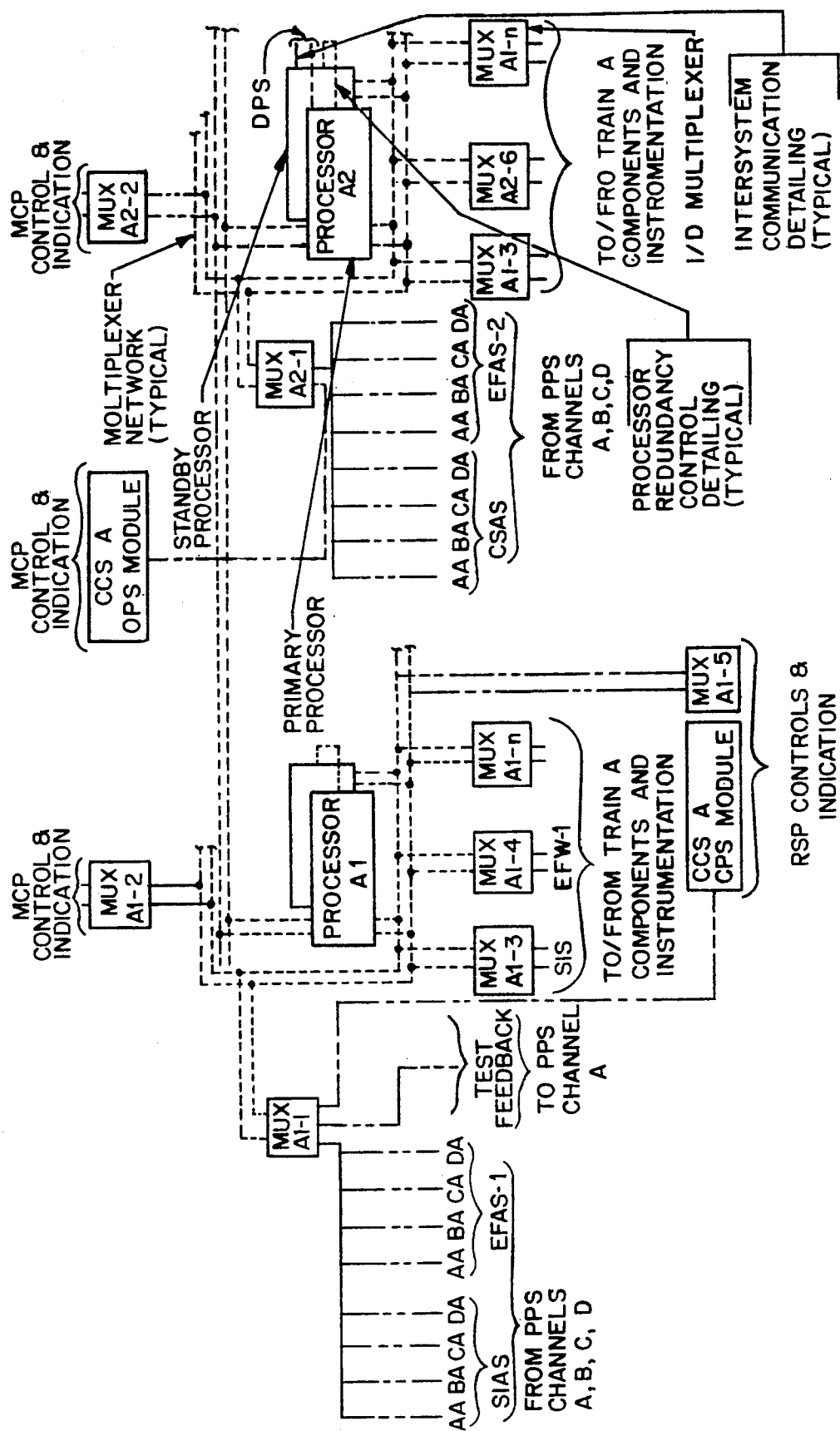
Figure 31B:
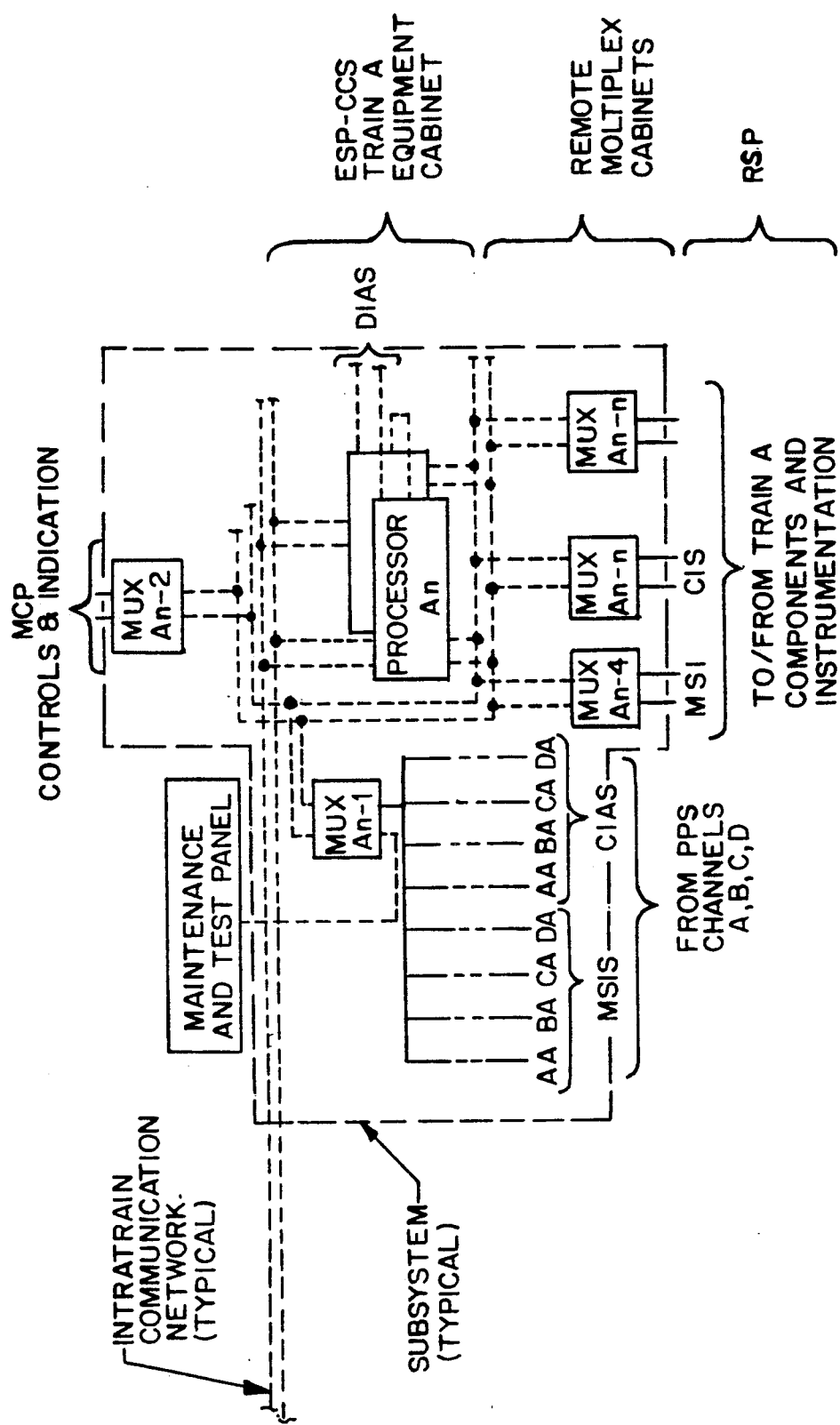

The ESF control system and the process component control system are shown schematically in FIG. 31, whereas the plant protection system is preferably of the type based on the "Core Protection Calculator" system such as described in U.S. Pat. No. 4,330,367, "System and Process for the Control of a Nuclear Power System", issued on May 18, 1982, to Combustion Engineering, Inc., the disclosure of which is hereby incorporated by reference.

Figure 33:
FIG. 33 is an illustration of a first level critical function display page associated with the hierarchy shown in FIG. 32.
Figure 34:
FIG. 34 is an illustration of a first level critical function display page after a reactor trip.
Figure 35:
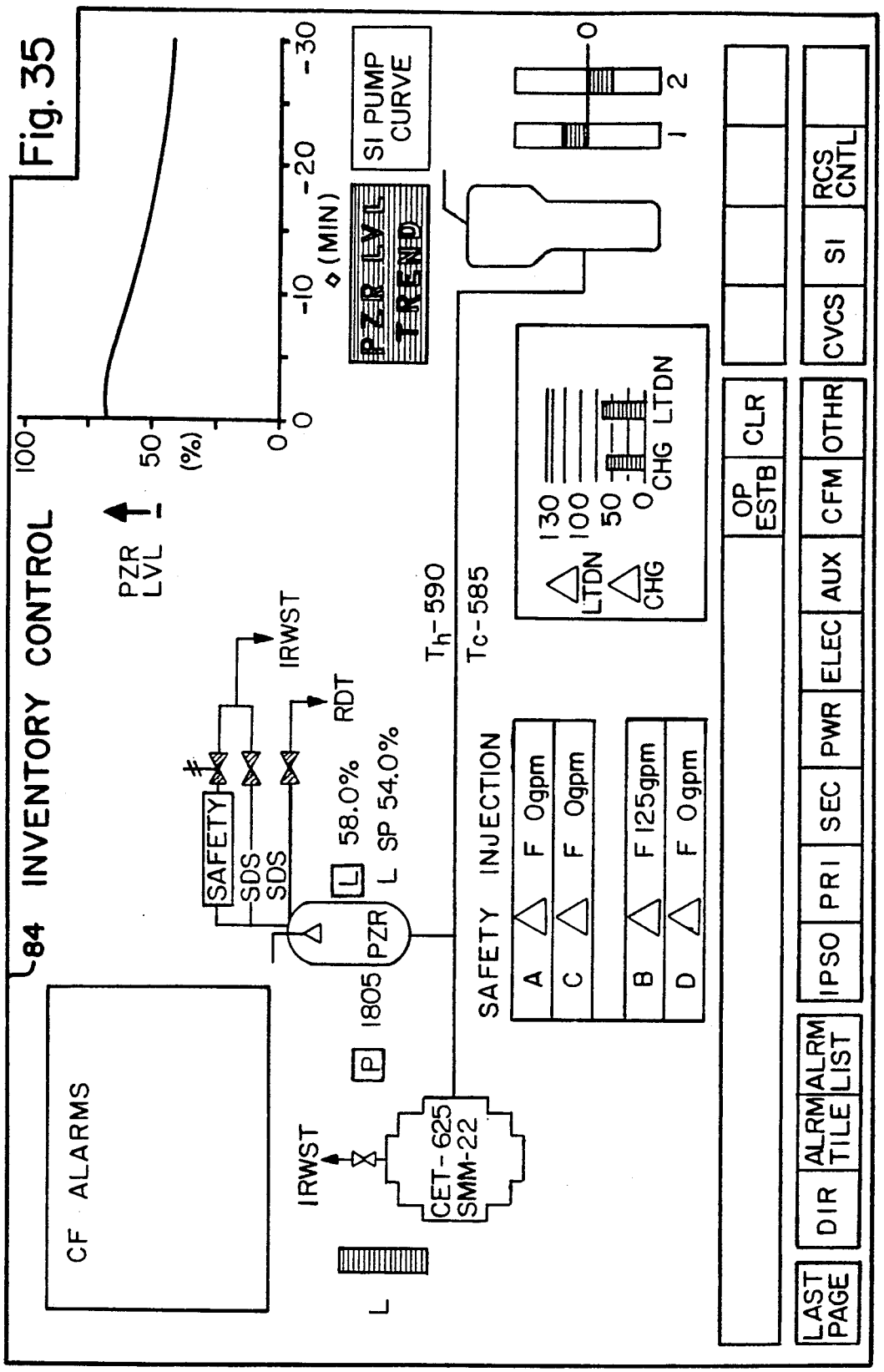
FIG. 35 is an illustration of a typical second level critical function display page associated with the inventory control system.

Another aspect of integration is the capability to display the critical functions and success path in IPSO as described above. Since the major safety and power generating signal and status generators are connected to both DIAS and DPS, the operator may page through the critical functions in accordance with the display page hierarchy shown in FIGS. 32 through 35. In FIG. 33, the operator is informed that the emergency feed is unavailable in the reactant coolant system. In FIG. 34, the operator is informed that the emergency feed is unavailable and the reactor is in a trip condition. Under these circumstances, the operator must determine an alternative for removing heat from the reactor core and by paging to the second level of the critical function page which, although shown for inventory (FIG. 35) control, would have a comparable level of detail for heat removal. This type of information with this level of detail and integration is available for all critical functions under substantially all operating conditions, not only during accidents.

VI. PANEL MODULARITY

It should be appreciated that, as mentioned above, the discrete tile and message technique significantly reduces the surface area required on the panel to perform that particular monitoring function. Similarly, the discrete display portion of the monitoring function, including the hierarchical pages, is condensed relative to conventional nuclear control room systems. The control function on a given panel can be consolidated in a similar fashion.

Thus, a feature of the present invention is the physical modularity of each panel constituting the master control console, and more generally, of each panel in the main control room. In essence, the space required for effective interface with the operator for a given panel, becomes independent of the number of alarms or displays or controls that are to be accessed by the operator. For example, as shown in FIG. 3, six locations on each side of the CRT may be allocated for alarm and indicator display purposes. Preferably, the top two on each side are dedicated to alarms 78 and the other four on each side dedicated to the indicator display 82. An identical layout is provided for each panel in the control room.

This permits significant flexibility and cost savings during the construction phase of the plant because the hardware can be installed and the terminals connected early in the construction schedule, even before all system functional requirements have been finalized. The software based systems are shipped early with representative software installed to allow preliminary checking of the control room operations. Final software installation and functional testing are conducted at a more convenient point in the construction schedule. This method can accelerate plant construction schedules for the instrumentation and control systems significantly. Since the instrumentation and control requirements for a given plant are often not finalized until late in the plant design schedule, the present invention will in almost every case significantly reduce costly delays during construction. This is in addition to the obvious cost savings in the ability to fabricate uniform panels, both in the engineering phase normally required to select the locations of and lay out the alarms and displays, and in the material savings in fabricating more compact panels. Furthermore, such modularity in the plant facilitates the training of operators and, when operators are under stress during emergencies, should reduce operator error because the functionality of each panel is spatially consistent.

Thus, each modular control panel has spatially dedicated discrete indicators and alarms, preferably at least one spatially dedicated discrete controller at 88, a CRT 84, and interconnections with at least one other modular control panel or computer for communication therewith. For example, communication via the DPS includes, among other things, the ability to acknowledge an alarm at one panel while the operator is located at another panel, and the automatic availability at every other panel of information concerning the system controlled at one panel.

Figure 36:
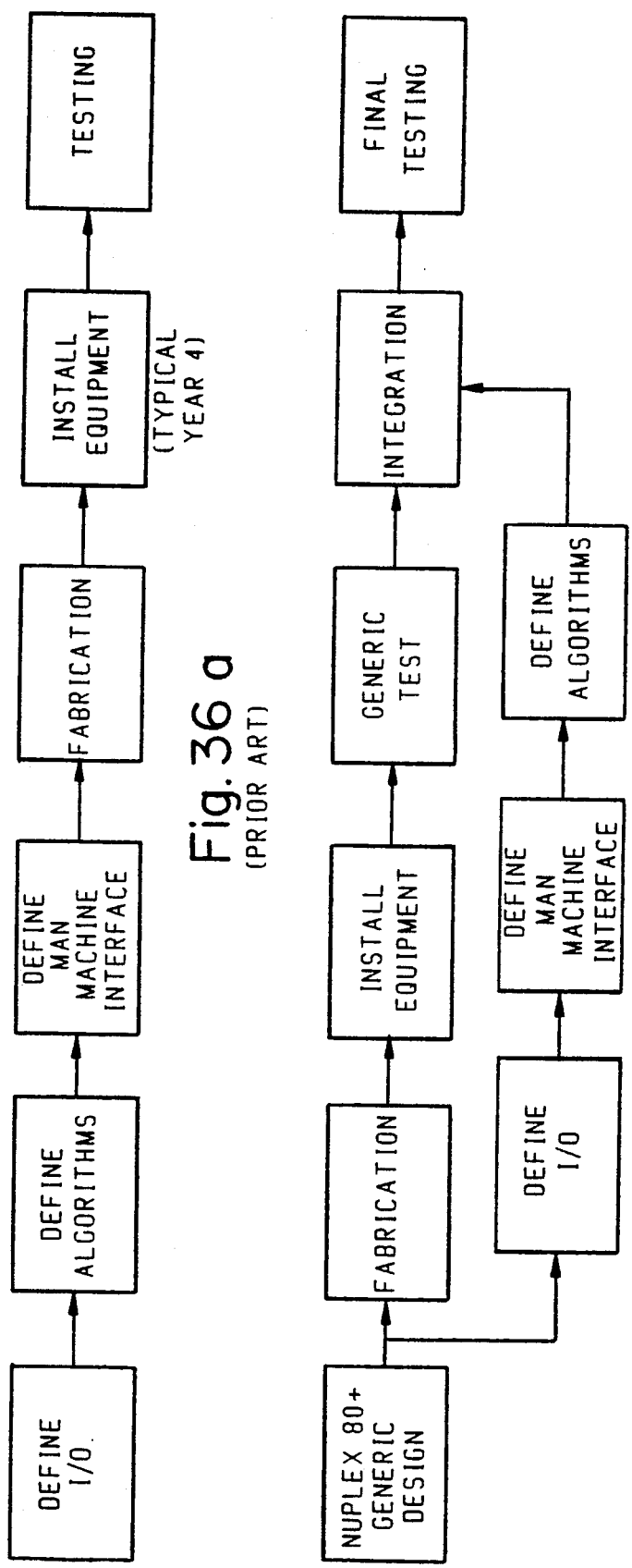
FIGS. 36(a) and 36(b) are diagrammatic representations of the typical prior art instrumentation and control design process, and the accelerated design process available in accordance with the use of modular panels in accordance with the present invention, respectively.

FIG. 36 (a) illustrates the conventional sequence for furnishing instrumentation and control to a nuclear power plant and 36(b) the sequence in accordance with the invention. Conventionally, the input and outputs are defined, the necessary algorithms are then defined, and these specify the man machine interface. Fabrication of all equipment then begins and all equipment is installed in the plant at substantially the same time before system testing can begin. In contrast, the modularity of the present invention permits fabrication of hardware to begin immediately in parallel with the definition of the input/output. Likewise, the hardware can be installed and generically tested in parallel with the definition of the man machine interface and the definition of the algorithms that are plant specific. The hardware and software are then integrated before final testing. In a conventional nuclear installation, the equipment is installed during the fourth year of the entire instrumentation and control activity, whereas with the present invention, equipment can be installed during the second or third year.

With further reference to FIG. 2, the process component control system and the engineered safety features component control system 56 use programmable logic controllers similar to the Modicon equipment mentioned above including input and output multiplexors and associated wires and cabling, all of which can be shipped to the plant before the plant specific logic and algorithms have been developed. This equipment is fault tolerant.

The data processing system 70 uses redundant plant main frame computers, along with modular software and hardware and associated data links. Such hardware can be delivered and the modular software that is specific to the plant installed, just prior to integration and system testing.

The DIAS 72 also uses input/output multiplexors and a fault tolerant arrangement, with programmable logic processors or mini-computers, with the same advantages as described with respect to the process control and engineered safety features control systems.

APPENDIX

DETAILED EXAMPLES OF VALIDATION ALGORITHM

This Appendix describes the details of the generic validation and display algorithm implemented in the DPS and DIAS.

Definition of Terms Used in Discussion

PAMI —  Post Accident Monitoring Instrumentation.

Instrument — Uncertainty  The performance accuracy of a sensor and its transmitter (i.e., if accuracy is ± 1%, the instrument uncertainly is 2%).

Expected Process Variation  The difference in temperature (or other unit of measurement) between sensors measuring the same process parameter due to expected variation in the the process temperature (or other unit of measurement) at different sensor locations.

| | |
|---|---|
| Calculated Signal - | A single signal that the algorithm calculates to represent all sensors measuring the same parameter. |
| Process Representation - | A single signal that is output for displays and alarms where a single value is needed as opposed to multiple sensor values. The "process representation" will always be the "calculated signal" unless a failure has occurred. After a failure it may be the output of a single sensor selected by the operator or algorithm. |
| Valid - | A "calculated signal" that has been verified to be accurate by successfully deviation checking all of its inputs with their average. |
| Valid PAMI - | A "valid" "process representation" that deviation checks successfully against the "PAMI" sensors. |
| Validation Fault - | A failure of the validation and display algorithm to calculate a "Valid" "Calculated Signal". |
| PAMI Fault - | A failure of the "Calculated Signal" to deviation check successfully against the "PAMI" sensors. |
| Fault Select - | The "calculated signal" that is the output of the sensor closest to the last "valid" signal at the time validation initially failed. |
| Operator Select - | A "process representation" that is the output of the sensor that the operator has selected after a "PAMI Fault" or a "Validation Fault". |

Good -  A label given to a sensor that deviation checks successfully against the "Operator Select" or "Valid" "Process Representation".

Bad -  A label given to a sensor that fails to deviation check successfully against the "Valid" "Process Representation".

Suspect -  A label given to the "good" sensor that deviates the most from the average "calculated signal" when any deviation check fails.

"Validation Fault Operator Select Permissive" -

The permissive that allows the operator to select an individual sensor as the "Process Representation" when the algorithm is unable to calculate a "valid" signal.

"PAMI Fault Operator Select Permissive -

The permissive that allows the operator to select an individual sensor as the "Process Representation" when the "valid" "calculated signal" does not deviation check successfully against "PAMI" indication.

Validation and Display Algorithm

The sensor inputs (A, B, C, D) are all read and stored at the time the algorithm begins. The algorithm uses these stored inputs to perform all steps (1-10), which comprise a scan. When the algorithm is repeated (after step 10), the sensor inputs are read and stored again, for use on the new scan.

Determination of "Calculated Signal" and Faults (steps 1,2,3,4,5)
Validation Attempt (steps 1, 2, 3)

1. The algorithm checks to see if there are 2 or more "good" sensors.

- Yes, go to step 2
    - No, go to step 5

Note: A sensor is "good" if it was not declared a "bad" sensor on the previous scan or a "suspect" sensor on a previous pass.

2. The algorithm averages all "good" sensors (A,B,C,D). Go to step 3.

3. Deviation check all good sensors against the average (within sum of 1/2 instrument uncertainty and expected process variation).

- If all deviation checks are satisfactory do the following:

a. Clear the "Validation Fault" alarm, if previously present
        b. Clear the permissive that allows the operator to select a sensor after a validation fault (i.e., "Validation Fault Operator Select Permissive"), if previously present.
        c. Declare any "suspect" sensor "bad" and output a sensor deviation alarm on that sensor.
        d. Output the average as the "valid" "calculated signal".
        e. Go to step 4

- If any deviation checks are unsatisfactory, the following occurs:

a. The sensor with the greatest deviation from the average is flagged as "suspect", then the algorithm checks to see if this the first or second pass on this scan.

* If the first pass, the algorithm is repeated, beginning at step 1.

Note: If the deviation check fails on the first pass, the algorithm has used one or more bad sensors to calculate the average. Performing a second pass eliminates the one bad sensor or determines that multiple sensors are bad.

* If it is the second pass validation fails, go to step 5.

Note: Failing to pass the deviation check on the second pass indicates that there are two or more simultaneous sensor failures. The algorithm cannot be sure to correctly eliminate only the bad sensors, therefore the algorithm must fail. This insures that the algorithm does not calculate a incorrect "valid" signal for this case. Normally without two or more simultaneous failures, the algorithm will detect multiple non-simultaneous deviations, sequentially eliminate them from the algorithm and still determine a "valid" signal.

Valid - PAMI Check (step 4)

4. (Step applicable if process has a Category 1 PAMI Sensor. If there is no PAMI sensor(s) in this process, the step is not performed, go to step 6.

Does the "valid" signal deviation check against the PAMI sensor(s)

a. Yes, Output the "PAMI" message and if not previously present, remove the "PAMI Fault Operator Select Permissive", clear the "PAMI Fault" alarm if present, go to step 6.

Note: The "PAMI Fault Operator Select Permissive" allows the operator to select any sensor for the "process representation" when the "calculated signal" (i.e. algorithm's "valid" output) does not agree with the PAMI sensor(s).

b. No, Perform the following:

- Remove the "PAMI" message
   - Generate a "PAMI Fault" alarm
   - Enable the "PAMI Fault Operator Select Permissive"
   - Go to step 6.

Failed Validation (step 5)

5. The algorithm checks to see if the "calculated signal" on the previous scan was a "Fault Select" sensor.

- If the previous scan was not "fault select", a "validation fault" has just occurred. Do the following:

a. Generate a "Validation Fault" alarm b. Declare all "suspect" sensors "good".

Note: This step insures that the algorithm will attempt to validate using all sensors not previously determined "bad" on the next validation attempt.

c. Enable the permissive for the operator to select an individual sensor output for "process representation", the ("Validation Fault Operator Select Permissive").

d. Deviation check all sensors against the last "valid" signal. Select the sensor that deviates the least from the last "valid" signal as the "fault select" sensor.

e. Output the signal from the "fault select" sensor as the "calculated signal".

f. Go to step 6.

- If the previous scan was "fault select", validation had failed previously and already picked a "fault select" sensor. Continue to output the "fault select" sensor as the "calculated signal", go to step 6.

Note: It is important that the sensor initially fault selected be retained since over time other failed sensors may erroneously appear more accurate.

"Process Representation" Selection (steps 6, 7)

6. The algorithm checks to see if there is either the "Validation Fault Operator Select Permissive" or the "PAMI Fault Operator Select Permissive".

Note: A validation fault enables one Operator Select Permissive and failure of the "valid" algorithm output to deviation check satisfactorily against "PAMI" gives the other Operator Select Permissive.

- If there is no Operator Select permissive, output the "calculated signal", as the "process representation", go to step 9.

- If there is an Operator Select permissive, go to step 7.

7. Check to see if the operator has selected a sensor as the "process representation".

Yes, output the signal from the selected sensor as the "process representation", go to step 8.

No, output the "calculated signal" as the "process representation", go to step 9.

Note: This step outputs the "calculated signal" as the "process representation" when the operator has the option to select a sensor, but does not use that option.

PAMI Check of "Operator Select" Sensor (step 8)

8. Does the "operator select" sensor deviation check against the PAMI sensor (within sum of PAMI instrument uncertainty and expected process variation).

Yes, output the "PAMI" message on the "process representation" display.

No, remove the "PAMI" message on the "process representation" display.

Bad Sensor Evaluation (step 9)

9. Is the "process representation" "valid" or "operator select".

- No, go to step 10 ("bad" sensor evaluations are not performed when the "process representation" is from a "fault select" sensor).

- Yes, Deviation check all "bad" sensors (A, B, C, D) against the "valid", or "operator select" signal by the following methods:

o  Deviation check "bad" sensors to be (within sum of instrument range uncertainty and expected process variation).

a. Remove "bad" data flags and make them "good" on all sensors passing the deviation check, if present and clear its associated sensor deviation alarm.

b. Maintain "bad" data flags on all sensors failing the deviation check.

c. Go to step 10.

Range Check (step 10)

10. The algorithm checks to see if the "process representation", is at or above the maximum numerical range, or at or below the minimum numerical range for the sensors.

- Yes, Output the message "Out-of-Range" along with the "process representation" signal. On the CRT place an asterisk (*) preceding the "process representation". Go to step 1 and repeat the algorithm.

- No, go to step 1 and repeat the algorithm.

Note: "Out-of-range" informs the operator that the actual process value may be higher or lower than the sensor is capable of measuring. In the case of process measurements with multiple ranges of sensors this check will cause the selection of sensors in a new range.

Note: On the RCS panel, RCP Differential Pressure, SG Differential Pressure and Pressurizer Level Reference Leg Temperature use this generic validation algorithm directly. The $T_{cold}$, $T_{hot}$, Pressurizer Level and Pressurizer Pressure algorithms this generic algorithm with additional steps and minor modifications to accommodate:

1. Different numbers of sensors
2. Multiple sensors ranges
3. Data reduction in related process measurements.

$T_{cold}$ Validation Algorithm (Fig. 37)

There are 12 sensors used to measure cold leg temperatures in the RCS. During most operational sequences, the operator is looking for a single "process representation" of all cold leg temperatures in the RCS. This value will be provided in the DIAS with a display labeled "RCS $T_{cold}$". For consistency, this value, which is determined by DIAS, is also used on the Integrated Process Status Overview (IPSO) board. To insure reliability, DPS compares DIAS's RCS $T_{cold}$ "process representation" with its own RCS $T_{cold}$ and alarms any deviations (DPS/DIAS RCS $T_c$ Calculation Deviation). A three step validation algorithm is used to determine this value:

1. Determine a "process representation" temperature in each of the 4 cold legs (1A, 1B, 2A, 2B) through a combination of deviation checking and averaging (the details are described later).

2. From the results in step 1, determine a $T_{cold}$ "process representation" for each RCS loop (loop 1 and loop 2) by averaging the corresponding A, B data.

3. From the results in step 2, determine a RCS $T_{cold}$ (process representation" for normal display and alarms by averaging loop 1 and 2 data.

The three step process determines "valid" "process representation" temperatures for cold legs 1A, 1B, 2A and 2B, cold loop 1 and 2 and RCS $T_c$. For situations when a "valid" cold leg "process representation" temperature cannot be calculated the algorithm will select the sensor closest to the last "valid" signal as the "fault select" "process representation" temperature. This automatic fault selection insures a continuous output of the RCS $T_{cold}$ "process representation" for display and alarms. After a failure the operator may select an individual sensor for that cold leg (1A, 1B, 2A, 2B) "process représentation". This selection will allow calculation of loop 1, loop 2 and RCS $T_{cold}$ "process representation", with "operator select" data.

The following section describes the algorithm and display processing on the DIAS and CRT displays.

1. The leg 1A, 1B, 2A, 2B, loop 1, 2 and RCS $T_{cold}$ "process representation" shall always be displayed on the applicable DIAS display and/or CRT page(s) where a single "process representation" is needed as opposed to multiple sensor values.

2. The $T_{cold}$ algorithm and display processing is identical to the generic validation algorithm with the following modifications:

a. Steps 1-5 (Determination of "Calculated Signal" and Faults) of the generic validation algorithm are modified to account for the following (steps 1-8 perform these functions):

1. Only 3 cold leg sensors

2. There are wide and narrow range temperature sensors in the same cold leg.

b. The (Determination of "Calculated Signal" and Faults) and the remainder of the generic validation algorithm (steps 6-10) are performed independently for each of the cold legs (1A, 1B, 2A, 2B).

c. Two additional algorithms were added:

1. An algorithm that averages the 2 cold leg "process representation" to get a loop $T_{cold}$ "process representation" (1A and 1B for loop 1 and 2A and 2B for loop 2)

2. An algorithm that averages the 2 cold loop "process representation" to get an RCS $T_{cold}$ "process representation" (loop 1 and loop 2).

3. Using a menu (as described in the generic validation algorithm) on DIAS or the CRT the operator may view any of the 12 sensor values or 7 "calculated signals".

These selections include the following:

| | | |
|---|---|---|
| T-112CA/122CA | 465-615°F | $T_{cold}$ Loop 1A/2A |
| T-112CB/122CB | 465-615°F | $T_{cold}$ Loop 1B/2B |
| T-112CC/122CC | 465-615°F | $T_{cold}$ Loop 1A/2A |
| T-112CD/122CD | 465-615°F | $T_{cold}$ Loop 1B/2B |
| T-111CA/111CB/ 123CA/123CB | 50-750°F | $T_{cold}$ Loop 1A/1B/2A/2B, PAMI |

| | |
|---|---|
| Loop 1A Tc | Calculated Signal |
| Loop 1B Tc | Calculated Signal |
| Loop 2A Tc | Calculated Signal |
| Loop 2B Tc | Calculated Signal |
| Loop 1 Tc | Calculated Signal |
| Loop 2 Tc | Calculated Signal |
| RCS Tc | Calculated Signal |

Validation Algorithms

Note: To simplify the discussion of sensor tag numbers, the following letters will be used to designate sensors in a cold leg.

- A - 1st narrow range sensor (safety) (465-615°F)
- B - 2nd narrow range sensor (safety) (465-615°F)
- C - wide range sensor (PAMI) (50-750°F)
- D - wide range sensor in opposite cold leg (i.e., when discussing loop 1A, this will be the wide range sensor in loop 1B, PAMI) (50-750°F)

The algorithms described below are calculated and displayed independently by both DPS and DIAS.

Method to Determine Cold Leg 1A, 1B, 2A, or 2B $T_{cold}$ "Process Representation"

The determination of the Cold Leg "Process Representation" will be performed in four parts:

1. Determination of "calculated signal" and faults, as described below (steps 1-8):

o  Cold leg 1A, 1B, 2A and 2B temperature "calculated signal" will be calculated using sensors A,B,C. A validation attempt will be made using narrow range sensors, if that is unsuccessful, the cold leg "calculated signal" will be validated using wide range sensors. In the event that validation fails using both narrow and wide range sensors, the the algorithm will select the sensor closest to the last "valid" signal as the "fault select" "calculated signal".

2. "Process Representation" selection (steps 9, 10) (similar to steps 6 and 7 of the generic validation algorithm).

3. PAMI Check of "operator select" sensor (step 11) (identical to step 8 of the generic validation algorithm).

4. Bad Sensor Evaluation and Range Check (step 12, 13) (similar to steps 9, 10 of the generic validation algorithm.

Cold Deg (1A, 1B, 2A or 2B Validation and Display Algorithm

Determination of "Calculated Signal" and Faults (steps 1-8)

Narrow Range Validation Attempt (Steps 1-5)

1. The algorithm checks to see if there two "good" narrow range sensors (A and B).

- Yes, go to step 2
    - No, go to step 5

Note: A sensor is "good" if it was not declared a "bad" sensor on the previous scan.

2. The algorithm averages A and B, go to step 3.

3. Deviation check both "good" narrow range sensors (A and B) against the average (within sum of 1/2 narrow range uncertainty and expected process variation)

- If both deviation checks are satisfactory, go to step 4 to see if the average is in range.

- If any deviation checks are unsatisfactory go to step 5.

Range Selection (Step 4)

4. The algorithm checks to see if the average or selected narrow range sensor is in-range.

- The average or selected sensor goes in-range at 96% and 4% of narrow range.

- The average or selected sensor goes out-of-range at 98% and 2% of narrow range.

Note: Hysteresis is needed to prevent frequent shifts at end-of-range. Out-of-range occurs at 98% and 2% to insure that no out-of-range sensors are used to calculate a "valid" output (i.e.: worst case sensors would read 100% or 0%).

- If in-range, clear the "Validation Fault" alarm, if present, disable the "Validation Fault Operator Select Permissive", and output the average or selected narrow range sensor as the "valid" "calculated signal". Go to step 6.

- If out-of-range, attempt the wide range validation, go to step 7.

5. The algorithm deviation checks narrow range sensors (A and B) against sensor C (within sum of wide range instrument uncertainty and expected process variation).

- If either sensor A or B passes the deviation check, the algorithm selects the sensor (A or B) that is closest to C. This sensor is selected for further checks. The sensor that deviates the most from sensor C is flagged as a "bad" sensor, if not previously "bad" and its associated sensor deviation alarm is generated if not previously generated. Go to step 4.

- If both A and B do not deviation check against C, go to step 7 and attempt wide range validation.

Valid PAMI Check (Step 6)

6. The algorithm checks to see if the "valid" average or selected sensor deviation checks satisfactorily against the PAMI sensor (C). (Within sum of 1/2 wide range uncertainty and expected process variation).

- If satisfactory, do the following:

a. Disable the "PAMI fault operator select permissive"

b. Output the "PAMI" message with the "valid" "calculated signal".

c. Clear the "PAMI Fault" alarm, if present.

d. Go to step 9.

If unsatisfactory, do the following:

a. Remove the "PAMI" message b. Enable the "PAMI Fault Operator Select Permissive".

Note: This feature allows the operator to select another sensor for the cold leg "process representation" when the algorithms's "valid" output does not correlate with postaccident monitoring indication (sensor c).

Wide Range Validation Attempt (Step 7)

7. Deviation check C against D (within sum of wide range instrument uncertainty and expected process validation).

Note: To validate the single wide range sensor in a cold leg, the algorithm deviation checks it against the wide range sensor in the other cold leg of that loop (i.e., if in loop 1, 1A wide range sensor is deviation checked against the 1B wide range sensor).

- If the deviation check is satisfactory, select C sensor as "valid", "calculated signal and do the following".

a. Clear the "Validation Fault" alarm, if present b. Disable the "Validation Fault Operator Select Permissive", if it was enabled.

c. Go to step 9.

- If the deviation check is unsatisfactory, validation fails, go to step 8.

Failed Validation (Step 8)

8. The algorithm checks to see if the "calculated signal" on the previous scan was a "fault select" sensor.

- If the previous scan was not "fault select", a validation fault has just occurred. Do the following:

a. Generate a "validation fault" alarm.

b. Enable the "Validation Fault Operator Select Permissive".

c. Deviation check all sensors (A, B, C) against the last "valid" signal. Select the sensor that deviates the least from the last "valid" signal as the "fault select" sensor.

d. Output the signal from the "fault select" sensor as the leg $T_c$ "calculated signal".

e. Go to step 9.

- If the previous scan was "fault select", validation had failed previously and the algorithm has already picked a "fault select" sensor. Continue to output the signal from the "fault select" sensor as the "calculated signal", go to step 9.

$T_c$ Leg (A or B) "Process Representation" Selection (Steps 9, 10)

9. Step 9 is identical to step 6 of the generic validation algorithm.

10. Step 10 is identical to step 7 of the generic validation algorithm except for the following. The operator may select any sensor A, B or C from that cold leg or A, B, C from the opposite cold leg (A or B) as the "process representation".

PAMI Check of "Operator Select" Sensor (Step 11)

11. This step is identical to step 8 of the generic validation algorithm.

Bad Sensor Evaluation (Step 12)

12. This step is identical to step 9 of the generic validation algorithm except that wide range instrument uncertainties are used on all deviation checks except when narrow range sensors are being deviation checked against a narrow range signal, in this case narrow range instrument certainties will be used.

Range Check (Step 13)

13. This step is identical to step 10 of the generic validation algorithm.

Method to Determine Loop 1 and 2 $T_{cold}$ "Process Representation"

- The loop 1 and 2 $T_c$ "process representation" will be calculated by averaging the "process representation" from the A and B cold legs (1A and 1B for loop 1), (2A and 2B for loop 2).

Note: To simplify the discussion of the cold leg (1A,1B,2A or 2B) "process representation" inputs to the loop 1 or loop 2 algorithm, A will designate the input from leg 1A or 2A and B will designate the input from leg 1B or 2B leg $T_c$.

1. The algorithm averages the "process representation" inputs from the A and B cold legs and outputs the average as the loop (1 or 2) $T_c$ "process representation"..

2. The algorithm checks to see if A and B are "valid"

- Yes, output average as "valid", go to step 5.

- No, go to step 3.

3. The algorithm checks to see if A or B is "operator select".

- Yes, go to step 4.

- No, output the average as "fault select", go to step 5.

4. The algorithm checks to see if A or B is "fault select".

- Yes, output the average as "fault select", go to step 5.

- No, output the average as "operator select", go to step 5.

5. Deviation check A and B against the average. (Within sum of 1/2 wide range instrument uncertainty and expected process variation).

- If the deviation checks are satisfactory, clear the "$T_c$ Cold Leg (1A/1B or 2A/2B) Temp Deviation" alarm, if present, go to step 6.

- If either deviation check is unsatisfactory, generate the "$T_c$ Cold Leg (1A/1B or 2A/2B) Temp Deviation" alarm, go to step 6.

6. The algorithm checks to see if A and B are narrow range.

- Yes, output the average as narrow range, go to step 7.

- No, output the average as wide range, go to step 7.

7. The algorithm checks to see if either or both inputs is out-of-range.

- If either or both are out-of-range, output this $T_c$ loop "process representation" signal with the message "out-of-range", go to step 8.

- If both are in-range, this $T_c$ loop "process representation" is <u>not</u> output with the message, "out-of-range, go to step 8.

8. The algorithm checks to see if A and B inputs are PAMI.

- Yes, output the "PAMI" message with the loop (1 or 2) $T_c$ "process representation", the loop $T_c$ algorithm is repeated, go to step 1.

- No, do not output the "PAMI" message with the loop (1 or 2) $T_c$ "process representation", the loop $T_c$ algorithm is repeated, go to step 1.

Method to Determine RCS $T_{cold}$

- The RCS $T_{cold}$ "process representation" will be calculated by averaging the "process representation" inputs from loop 1 and 2 $T_{cold}$.

- No, output the "process representation" from step 2 as "fault select", go to step 6.

5. The algorithm checks to see if signal 1 or 2 is "fault select".

- Yes, output the "process representation" from step 2 as "fault select", go to step 6.

- No, output the "process representation" from step 2 as "operator select", go to step 6.

Range Check

6. This step is identical to step 10 of the generic validation algorithm. Go to step 1 and repeat the algorithm.

Pressurizer Pressure Validation Algorithm (Fig. 38)

There are 12 sensors used to measure pressurizer and RCS pressure. During most operational sequences, the operator is looking for a single "process representation" of all pressurizer/RCS pressure readings. This value will be provided in DIAS with a display labeled "PRESS". For consistency, this value, which is determined by DIAS, is also used on the IPSO board. To insure reliability, DPS compares DIAS's Press "process representation" with its own Press "process representation" and alarms any deviations (DPS/DIAS Press Calculation Deviation).

The algorithm determines a "valid" "process representation" for pressurizer/RCS pressure. For situations when a "valid" pressure "process representation" cannot be calculated, the algorithm will select the sensor closest to the last "valid" signal as the "fault select" "process representation" pressure. This automatic fault selection insures continuous output of the pressurizer/RCS "process representation" pressure for displays and alarms. After a failure the operator may select an individual sensor for the pressure "process representation" as the "fault select" "process representation".

The following section describes the algorithm and display processing on the DIAS and CRT displays.

1. The "process representation" pressure shall always be displayed on the applicable DIAS display and/or the CRT page(s) where a single "process representation" is needed as opposed to multiple sensor values.

2. The pressure algorithm and display processing is identical to the generic validation algorithm with the following modifications:

a. Steps 1-5 (Determination of "Calculated Signal" and Faults) of the generic validation algorithm are modified to account for the following.

1. Three sensor ranges (0-1600 psig), (1500-2500 psig) and (0-4000 psig).

b. The remainder of the generic algorithm (steps 6-10) are renumbered to account for additional steps in the (Determination of "Calculated Signal" and Faults). They are almost identical with the minor modifications described with each step.

3. Using a menu (as described in the generic validation algorithm) the operator may view any of the 12 sensors values or single "calculated signal".

These selections include the following:

| | | |
    |---|---|---|
    | P-103, 104, 105, 106 | 0-1600 psig | Pressurizer Pressure |
    | P-101A, 101B, 101C, 101D, 100X, 100Y | 1500-2500 psig | Pressurizer Pressure |
    | P-190A, 190B | 0-4000 psig | RCS Pressure, PAMI |
    | CALC PRESS | Calculated Signal | |

Validation Algorithm

To simplify the discussion of sensor tag numbers, the following letters will be used to designate pressure sensors:

P - 101A - A
    P - 101B - B

P - 101C - C
P - 101D - D
P - 100X - E
P - 100Y - F
P - 103 - G
P - 104 - H
P - 105 - I
P - 106 - J
P - 190A - K
P - 190B - L

The algorithm described below is calculated and displayed independently by both DPS and DIAS.

The pressurizer pressure "calculated signal" will be calculated using sensors A, B, C, D, E, F, G, H, I, J, K and L. An attempt will be made to use the narrow 1500 - 2500 psig range sensors (A, B, C, D, E and F) (pressure is normally in this range). If pressure is outside the 1500 - 2500 psig range, the 0 - 1600 psig range sensors (G, H, I and J) will be used. If pressure cannot be calculated using these sensors, the 0 - 4000 psig range sensors (K and L) will be used. In the event that the validation fails all of these three ranges, the algorithm will select the sensor closest to the last "valid" signal as the "fault select" "calculated signal".

This "fault select" "calculated signal will be used as the "process representation" until the operator selects an "operator select" sensor to replace it or the algorithm is able to validate data.

Pressurizer Pressure Validation and Display Algorithm

Determination of Calculated Signal and Faults (steps 1-13)

1500 - 2500 psig Range Validation Attempt (steps 1-4)

1. The algorithm checks to see if there are 2 or more "good" (1500 - 2500 psig narrow range) sensors.

- Yes, go to step 2
    - No, go to step 5 and attempt (0-1600 psig range validation)

Note: A sensor is "good" it was not declared a "bad" sensor on the previous pass or a suspect sensor on a previous pass.

2. The algorithm averages all "good" (1500-2500) range sensors (A, B, C, D, E and F). Go to step 3.

3. Deviation check all "good" (1500-2500) range sensors against the average (within sum of 1/2 narrow range uncertainty and expected process variation).

- If all deviation checks are satisfactory, go to step 4 to see if the average is in range.

- If any deviation checks are unsatisfactory, the following occurs:

The sensor with the greatest deviation from the average is flagged as a "suspect" sensor, then the algorithm checks to see if this the first or second pass on this scan.

* If the first pass, the algorithm is repeated, beginning at step 1.

Note: If the deviation check fails on the first pass, the algorithm has used one or more bad sensors to calculate the average. Performing a second pass eliminates the one bad sensor or determines that multiple sensors are bad.

* If it is the second pass, the (1500-2500) range validation fails, go to step 5 to attempt 0 - 1600 psig range validation.

Note: Failing to pass the deviation check on the second pass indicates that there are two or more simultaneous (1500-2500) range sensor failures. The algorithm cannot be sure to correctly eliminate only the bad sensors, therefore the (1500-2500) range validation must fail. The 0 - 1600 psig range validation is attempted. This insures that the algorithm does not calculate an incorrect signal for this case. Normally without two or more simultaneous failures, the algorithm will detect multiple non-simultaneous deviations, sequentially eliminate them from the algorithm and still determine a "valid" signal.

Range Selection (step 4)

4. The algorithm checks to see if the average is in-range.

- The average goes in-range at 96% and 4% of narrow range.

- The average goes out-of-range at 98% and 2% of narrow range.

Note: Hysteresis prevents frequent range shifts. Out-of-range occurs at 98% and 2% to insure that no out-of-range sensors are used to calculate a "valid" output (i.e., worst case sensors would read 100% and 0%).

- If in-range, do the following:

a. Clear the "Validation Fault" alarm, if previously present.

b. Remove the "Validation Fault Operator Select Permissive".

c. Output the average as the "valid" "calculated signal".

d. Go to step 12.

- If out-of-range, attempt the (0 - 1600 psig) range validation, go to step 5.

0 - 1600 psig Range Validation Attempt (steps 5-8)

5. The algorithm checks to see if there are 2 or more "good" 0 - 1600 psig range sensors (G, H, I and J).

- Yes, go to step 6
    - No, go to step 9 and attempt (0-4,000 range validation)

6. The algorithm averages all "good" 0 - 1600 psig range sensors (G, H, I and J). Go to step 7.

7. Deviation check all "good" 0 - 1600 psig range sensors against the average (within sum of 1/2 of the 0 - 1600 psig range uncertainty and expected process variation).

- If all deviation checks are satisfactory, go to step 8 to see if the average is in range.

- If any deviation checks are unsatisfactory, the following occurs:

The sensor with the greatest deviation from the average is flagged as a "suspect" sensor, then the algorithm checks to see if this is the first or second pass on this scan.

* If the first pass, the 0 - 1600 psig range algorithm is repeated, beginning at step 5.

Note: If the deviation check fails on the first pass, the algorithm has used one or more bad sensors to calculate the average. Performing a second pass eliminates the one bad sensor or determines that multiple sensors are bad.

* If it is the second pass, the 0 - 1600 psig range validation fails, go to step 9 to attempt 0 - 4000 psig range validation.

Note: Failing to pass the deviation check on the second pass indicates that there are two or more simultaneous 0 - 1600 psig range sensor failures. The algorithm cannot be sure to correctly eliminate only the bad sensors, therefore the 0 - 1600 psig range validation must fail. The 0 - 4000 psig range validation is attempted. This insures that the algorithm does not calculate an incorrect signal for this case. Normally without two or more simultaneous failures, the algorithm will detect multiple non-simultaneous deviations, sequentially eliminate them from the algorithm and still determine a "valid" signal.

Range Selection (step 8)

8. The algorithm checks to see if the average is in-range.

- The average goes in-range at 96% and 4% of the 0 - 1600 psig range.

- The average goes out-of-range at 98% and 2% of the 0 - 1600 psig range.

Hysteresis prevents frequent range shifts. Out-of-range occurs at 98% and 2% to insure that no out-of-range sensors are used to calculate a "valid" output (i.e., worst case sensors would read 100% or 0%).

- If in-range, do the following:

a. Clear the "Validation Fault" alarm, if previously present.

b. Remove the "Validation Fault Operator Select Permissive".

c. Output the average as the "valid" "calculated signal".

d. Go to step 12.

- If out-of-range, attempt the 0 - 4000 psig range validation, go to step 9.

0 - 4000 psig Range Validation Attempt (steps 9, 10, 11)

9. The algorithm checks to see if both of the 0 - 4000 psig range sensors (K and L) are "good".

- Yes, go to step 10.
    - No, (0-4000 psig) range validation is not possible, go to step 13.

10. The algorithm averages K and L, the 0 - 4000 psig range sensors. Go to step 11.

11. Deviation check K and L against the average (within sum of 1/2 0 - 4000 psig range uncertainty and expected process variation).

- If both deviation checks are satisfactory, do the following:

a. Clear the "validation fault" alarm, if previously present.

b. Remove the "Validation Fault Operator Select Permissive", if previously present.

c. Go to step 12.

- If either deviation check is unsatisfactory, go to step 13.

Valid-PAMI Check (step 12)

12. Does the "valid" "calculated signal" deviation check against the PAMI sensors. Use method a if the "valid" "calculated signal" is in the 1500-2500 psig or 0-1600 psig range, and method b if in the 0-4000 psig range.

Method (a) (within sum of 1/2 0-4000 psig range instrument uncertainty, plus process variation, plus instrument position constant).

Method (b) (within sum of 1/2 0-4000 psig range instrument uncertainty, plus process variation).

- Yes, do the following:

a. Output the "PAMI" message, if not previously present.

b. Remove the "PAMI Fault Operator Select Permissive", if previously present.

c. Go to step 14.

- No, do the following:

a. Remove the "PAMI" message, if previously present.

b. Generate a "PAMI Fault" alarm, if not previously present.

c. Enable the "PAMI Fault Operator Select Permissive"

d. Go to step 14.

Note: The (0 - 4000 psig) wide range sensors (K and L) are <u>not</u> located on the pressurizer, as are the other pressure sensors. The K and L sensors are positioned at the discharge of the reactor coolant pumps (RCPs) where they measure RCS pressure. During normal operation the pressure at this location is much higher (approximately 110 psi for a System 80 plant) than at the pressurizer, where sensors (A, B, C, D, E, F, G, H, I and J) are located. An additional deviation acceptance criteria (called instrument position constant) will be used when deviation checks are made with or against the K and L (0 – 4000 psig range) sensors.

Failed Validation (step 13)

13. The algorithm checks to see if the "calculated signal" output of the previous scan was a "fault select" sensor.

- If the previous scan was not "fault select", a validation fault has just occurred, do the following:

a. Generate a "Validation Fault" alarm.

b. Deviation check all sensors (A,B,C,D,E,F,G,H,I,J,K or L) against the last "valid" signal. Select the sensor that deviates the least from the last "valid" signal as the "fault select" sensor.

c. Output the signal from the "fault select" sensor as the pressurizer pressure "calculated signal".

d. Enable the "Validation Fault Operator Select Permissive".

e. Go to step 14.

Pressurizer Pressure "Process Representation" Selection (steps 14, 15)

14. Step 14 is identical to step 6 of the generic validation algorithm.

15. Step 15 is identical to step 7 of the generic validation algorithm.

PAMI Check of "Operator Select" Sensor (step 16)

16. Step 16 is identical to step 8 of the generic validation, except that the deviation criteria are the same as those specified in step 12 of this pressurizer pressure validation and display algorithm.

Bad Sensor Evaluation (step 17)

17. This step is identical to step 9 of the generic validation algorithm, except that the deviation criteria checks are the same as those specified in step 12 of this pressurizer pressure validation and display algorithm.

Range Check (step 18)

18. The algorithm checks to see if the "process representation" is at or above the maximum numerical range (1600 psig for the 0 - 1600 psig sensors, 2500 psig for the 1500 - 2500 psig sensors and 4000 psig for the 0 - 4000 psig sensors) or at or below the minimum numerical range (0 psig for the 0 - 1600 psig and 15 - 4000 psig sensors and 1500 psig for the 1500 - 2500 psig sensors).

Yes, Output the message "Out-of-Range" along with the "process representation" signal. On the CRT place an asterisk (*) preceding the "process representation". Go to step 1 and repeat the algorithm.

No, go to step 1 and repeat the algorithm.

Note: "Out-of-range" informs the operator that the actual pressure may be higher or lower than the sensor is capable of measuring.

We claim:

1. An indicator system for displaying a representative value (90) of a plant operating parameter to an operator in a control room of a nuclear power plant, the plant including a plant protection system (50) responsive to a plurality of process parameter sensors each of which generates one of a first set of respective signals (P1, P2, ... Pi, ... Pn) commensurate with the sensed value of the same process parameter and a plant control system (56, 64) responsive to a plurality of process parameter sensors (48, 66, 68) each of which generates one of a second set of respective signals (C1, C2, ... Ci, ... Cm) commensurate with the value of said same process parameter, and means for transmitting said first and second sets of signals in digital form to said indicator system in the control room, wherein the indicator system comprises:

digital processor means (72) located in the control room for receiving and processing said first and second set of signals and generating a third set of signals commensurate with the signal generated by each sensor, respectively, and a fourth signal composed from at least two signals in said third set of signals and having a value representative of the actual value (90) of the parameter; and an operator interface coupled to the digital processor means including display means for selectively generating images of numeric values commensurate with said third set of signals and commensurate with said fourth signal.

2. The indicator system of claim 1, wherein the digital processor means includes logic means for composing said fourth signal from all signals in said third set of signals but discarding any of the signals in said third set of signals that deviates from the average value of the third set by more than a predetermined amount.

3. The indicator system of claim 1, wherein the operator interface includes a display screen and wherein said means for generating images generates a first screen page image including a numeric value commensurate with the fourth signal and a second page screen image including numeric values commensurate with each signal in the third set of signals.

4. The indicator system of claim 1, wherein said display means includes means for selectively displaying images of only each signal in the third set of signals, only the fourth signal, or both the third set of signals and the fourth signal.

5. The indicator system of claim 1, wherein the digital processor means includes means for storing values of the fourth signal during a previous period of time the plant was operating, and the means for generating a display includes a screen for displaying the fourth signal and a trend graph of the fourth signal during said period of time.

6. The indicator system of claim 1, wherein the second set of signals includes one plurality of signals from a respective plurality of wide range sensors and another plurality of signals from a respective plurality of narrow range sensors, the digital processor means includes logic means for determining one weighted average subset of the values of the sensor signals from the first set of signals with the wide range signals from the second set, and another weighted average subset with the narrow range signals from the second set, and selecting the subset having the most accurate weighted average, and the fourth display signal is composed only from the signals of the subset having the most accurate weighted average.

7. The indicator system of claim 6, wherein the logic means includes validation means for first averaging the sensor signals within each subset, and then discarding any of the signals that deviates from said average signal of the subset by more than a predetermined amount.

8. A method for generating in a control room, a representative value of a process parameter in a nuclear power plant, the plant including a first plant system responsive to a first plurality of process parameter sensors from each of which the first system generates a first set of respective measurement value signals (P1, P2, ... Pi, ... Pn) for the same process parameter and a second plant system responsive to a second plurality of process parameter sensors from each of which the second system generates a second set of respective measurement value signals (C1, C2, ... Cj, ... Cm) for said same process parameter, wherein the method comprises the steps of:

conveying all said measurement value signals in digital form to a digital processor;

associating a tolerance with each sensor, each tolerance being dependent on the measurement uncertainties for each sensor and an acceptance range of expected variation of the process parameter;

in the digital processor, computing a weighted average of all value signals (P1, P2, Pi, ... Pn) and (C1, C2, Ci, ... Cm);

comparing each of the value signals with the sum of said weighted average and the respective tolerance for each sensor;

determining whether one or more value signals Pi, Ci, falls outside said acceptance range;

recomputing the weighted average excluding any value signals that fall outside said acceptance range, to obtain a validated average; and displaying the validated average in the control room as a representative value of the parameter.

9. The method of claim 8, wherein the step of displaying includes selectively displaying the validated average on one display screen and each of the value signals (P1, P2, Pi, ... Pn) and (C1, C2, Ci, ... Cm) on another display screen.

10. A method for generating in a control room, a representative value of a process parameter in a nuclear power plant, the plant including a first plant system responsive to a plurality of process parameter sensors from each of which the first system generates a first set of respective measurement value signals (P1, P2, ... Pi ... Pn) for the same process parameter and a second plant system responsive to a plurality of process parameter sensors from each of which the second system generates a second set of respective measurement value signals (C1, C2, ... Cj, ... Cm) for said same process parameter, wherein the method comprises the steps of:

transmitting all said measurement value signals in digital form to a digital processor;

in the digital processor, associating a tolerance with each sensor, each tolerance being dependent on the measurement uncertainty for each sensor and the range of expected variation of said process parameter;

in the digital processor, computing a first weighted average, of all value signals (P1, P2, Pi ... Pn), and a second weighted average, of all value signals C1, C2, Ci . . . Cn);

comparing each of the value signals Pi with a first range equal to the sum of said first weighted average and said tolerance, for each of the respective sensors in the first plant system;

determining whether one or more value signals Pi is outside said first range and if so, recomputing said first weighted average excluding the value signal that falls outside the first range;

after the step of determining, storing the first weighted average as the validated average of the first set of signals;

comparing each of the value signals Ci with a second range equal to the sum of said second weighted average and said tolerance, for each of the respective sensors in the second plant system;

determining whether one or more of the value signals Ci is outside said second range and if so, recomputing said second weighted average excluding the value signal that falls outside the second range;

after the immediately preceding step of determining, storing the second weighted average as the validated average of the second set of signals; and displaying one of the validated averages in the control room, as the representative value of the parameter.

* * * * *